US007739482B2

(12) United States Patent
Nguyen et al.

(10) Patent No.: US 7,739,482 B2
(45) Date of Patent: *Jun. 15, 2010

(54) HIGH-PERFORMANCE, SUPERSCALAR-BASED COMPUTER SYSTEM WITH OUT-OF-ORDER INSTRUCTION EXECUTION

(75) Inventors: Le Trong Nguyen, Monte Sereno, CA (US); Derek J. Lentz, Los Gatos, CA (US); Yoshiyuki Miyayama, Santa Clara, CA (US); Sanjiv Garg, Freemont, CA (US); Yasuaki Hagiwara, Santa Clara, CA (US); Johannes Wang, Redwood City, CA (US); Te-Li Lau, Palo Alto, CA (US); Sze-Shun Wang, San Diego, CA (US); Quang H. Trang, San Jose, CA (US)

(73) Assignee: Seiko Epson Corporation (JP)

( * ) Notice: Subject to any disclaimer, the term of this patent is extended or adjusted under 35 U.S.C. 154(b) by 429 days.

This patent is subject to a terminal disclaimer.

(21) Appl. No.: 11/642,599

(22) Filed: Dec. 21, 2006

(65) Prior Publication Data

US 2007/0106878 A1 May 10, 2007

Related U.S. Application Data

(63) Continuation of application No. 10/660,671, filed on Sep. 12, 2003, now Pat. No. 7,162,610, which is a continuation of application No. 09/852,293, filed on May 10, 2001, now Pat. No. 6,647,485, which is a continuation of application No. 09/436,986, filed on Nov. 9, 1999, now Pat. No. 6,256,720, which is a continuation of application No. 09/338,563, filed on Jun. 23, 1999, now Pat. No. 6,038,654, which is a continuation of application No. 08/946,078, filed on Oct. 7, 1997, now Pat. No. 6,092,181, which is a continuation of application No. 08/602,021, filed on Feb. 15, 1996, now Pat. No. 5,689,720, which is a continuation of application No. 07/817,810, filed on Jan. 8, 1992, now Pat. No. 5,539,911, which is a continuation of application No. 07/727,006, filed on Jul. 8, 1991, now abandoned.

(51) Int. Cl.
*G06F 15/76* (2006.01)
(52) U.S. Cl. ........................................ 712/23; 712/220
(58) Field of Classification Search .................. 712/23, 712/41, 205, 214, 215, 216, 217, 220
See application file for complete search history.

(56) References Cited

U.S. PATENT DOCUMENTS 3,346,851 A 10/1967 Thornton et al.
(Continued)

FOREIGN PATENT DOCUMENTS

EP 0 136 179 A2 9/1984
(Continued)

OTHER PUBLICATIONS

Complaint, 7 pages, dated Oct. 11, 2006, in *Transmeta Corporation v. Intel Corporation*, in the U.S. District Court for the District of Delaware, Case No. 1:06-cv-00633.
(Continued)

*Primary Examiner*—Aimee J Li
(74) *Attorney, Agent, or Firm*—Sterne, Kessler, Goldstein and Fox P.L.L.C.

(57) ABSTRACT

A high-performance, superscalar-based computer system with out-of-order instruction execution for enhanced resource utilization and performance throughput. The computer system fetches a plurality of fixed length instructions with a specified, sequential program order (in-order). The computer system includes an instruction execution unit including a register file, a plurality of functional units, and an instruction control unit for examining the instructions and scheduling the instructions for out-of-order execution by the functional units. The register file includes a set of temporary data registers that are utilized by the instruction execution control unit to receive data results generated by the functional units. The data results of each executed instruction are stored in the temporary data registers until all prior instructions have been executed, thereby retiring the executed instruction in-order.

18 Claims, 14 Drawing Sheets

U.S. PATENT DOCUMENTS

| | | | |
|---|---|---|---|
| 3,718,912 A | 2/1973 | Hasbrouck et al. | |
| 3,771,138 A | 11/1973 | Celtruda et al. | |
| 3,789,365 A | 1/1974 | Jen et al. | |
| 3,913,074 A | 10/1975 | Homberg et al. | |
| 4,034,349 A | 7/1977 | Monaco et al. | |
| 4,041,461 A * | 8/1977 | Kratz et al. | 712/10 |
| 4,128,880 A | 12/1978 | Cray, Jr. | |
| 4,199,811 A * | 4/1980 | Borgerson et al. | 712/23 |
| 4,200,927 A | 4/1980 | Hughes et al. | |
| 4,210,960 A * | 7/1980 | Borgerson et al. | 712/230 |
| 4,212,076 A | 7/1980 | Conners | |
| 4,228,495 A | 10/1980 | Bernhard et al. | |
| 4,237,532 A * | 12/1980 | Borgerson et al. | 712/236 |
| 4,296,465 A * | 10/1981 | Lemak | 710/316 |
| 4,296,470 A | 10/1981 | Fairchild et al. | |
| 4,315,308 A | 2/1982 | Jackson | |
| 4,315,314 A | 2/1982 | Russo | |
| 4,410,939 A | 10/1983 | Kawakami | |
| 4,434,461 A | 2/1984 | Puhl | |
| 4,459,657 A | 7/1984 | Murao | |
| 4,476,525 A | 10/1984 | Ishii | |
| 4,482,950 A | 11/1984 | Dshkhunian et al. | |
| 4,484,272 A * | 11/1984 | Green | 717/149 |
| 4,498,134 A | 2/1985 | Hansen et al. | |
| 4,500,963 A | 2/1985 | Smith et al. | |
| 4,507,728 A * | 3/1985 | Sakamoto et al. | 712/1 |
| 4,532,598 A | 7/1985 | Shibayama et al. | |
| 4,561,051 A | 12/1985 | Rodman et al. | |
| 4,574,349 A | 3/1986 | Rechtschaffen | |
| 4,594,655 A | 6/1986 | Hao et al. | |
| 4,597,054 A | 6/1986 | Lockwood et al. | |
| 4,613,941 A | 9/1986 | Smith et al. | |
| 4,626,989 A | 12/1986 | Torii | |
| 4,644,466 A | 2/1987 | Saito | |
| 4,648,045 A | 3/1987 | Demetrescu | |
| 4,675,806 A | 6/1987 | Uchida | |
| 4,714,994 A | 12/1987 | Oklobdzija et al. | |
| 4,719,569 A | 1/1988 | Ludemann et al. | |
| 4,722,049 A | 1/1988 | Lahti | |
| 4,734,852 A * | 3/1988 | Johnson et al. | 712/41 |
| 4,752,873 A | 6/1988 | Shonai et al. | |
| 4,758,948 A | 7/1988 | May et al. | |
| 4,766,566 A | 8/1988 | Chuang | |
| 4,775,927 A | 10/1988 | Hester et al. | |
| 4,791,607 A | 12/1988 | Igarashi et al. | |
| 4,807,115 A | 2/1989 | Torng | |
| 4,809,169 A * | 2/1989 | Sfarti et al. | 712/20 |
| 4,811,208 A | 3/1989 | Myers et al. | |
| 4,814,978 A | 3/1989 | Dennis | |
| 4,823,201 A | 4/1989 | Simon et al. | |
| 4,829,467 A | 5/1989 | Ogata | |
| 4,833,599 A | 5/1989 | Colwell et al. | |
| 4,841,453 A | 6/1989 | Finlay et al. | |
| 4,858,105 A | 8/1989 | Kuriyama et al. | |
| 4,858,116 A | 8/1989 | Gillett, Jr. et al. | |
| 4,881,167 A | 11/1989 | Sasaki et al. | |
| 4,897,810 A | 1/1990 | Nix | |
| 4,901,228 A | 2/1990 | Kodama | |
| 4,901,233 A | 2/1990 | Liptay | |
| 4,903,196 A | 2/1990 | Pomerene et al. | |
| 4,916,604 A | 4/1990 | Yamamoto et al. | |
| 4,924,376 A | 5/1990 | Ooi | |
| 4,926,323 A | 5/1990 | Baror et al. | |
| 4,928,226 A | 5/1990 | Kamada et al. | |
| 4,942,525 A | 7/1990 | Shintani et al. | |
| 4,945,479 A | 7/1990 | Rusterholz et al. | |
| 4,964,057 A | 10/1990 | Yabe | |
| 4,974,154 A | 11/1990 | Matsuo | |
| 4,974,155 A | 11/1990 | Dulong et al. | |
| 4,980,817 A | 12/1990 | Fossum et al. | |
| 4,985,825 A | 1/1991 | Webb, Jr. et al. | |
| 4,991,078 A | 2/1991 | Wilhelm et al. | |
| 4,991,081 A | 2/1991 | Bosshart | |
| 4,992,938 A | 2/1991 | Cocke et al. | |
| 5,003,462 A | 3/1991 | Blaner et al. | |
| 5,032,985 A | 7/1991 | Curran et al. | |
| 5,051,925 A | 9/1991 | Kadono et al. | |
| 5,051,940 A * | 9/1991 | Vassiliadis et al. | 708/524 |
| 5,067,069 A | 11/1991 | Fite et al. | |
| 5,070,451 A * | 12/1991 | Moore et al. | 712/32 |
| 5,072,364 A | 12/1991 | Jardine et al. | |
| 5,073,970 A * | 12/1991 | Aoyama et al. | 712/7 |
| 5,089,951 A | 2/1992 | Iijima | |
| 5,093,783 A | 3/1992 | Kitada | |
| 5,097,409 A | 3/1992 | Schwartz et al. | |
| 5,101,341 A | 3/1992 | Circello et al. | |
| 5,109,495 A | 4/1992 | Fite et al. | |
| 5,119,485 A | 6/1992 | Ledbetter, Jr. et al. | |
| 5,120,083 A | 6/1992 | Stine | |
| 5,125,083 A | 6/1992 | Fite et al. | |
| 5,125,092 A | 6/1992 | Prener | |
| 5,127,091 A | 6/1992 | Boufarah et al. | |
| 5,129,067 A | 7/1992 | Johnson | |
| 5,133,074 A | 7/1992 | Chou | |
| 5,133,077 A | 7/1992 | Karne et al. | |
| 5,134,561 A | 7/1992 | Liptay | |
| 5,136,697 A | 8/1992 | Johnson | |
| 5,140,682 A | 8/1992 | Okura et al. | |
| 5,142,633 A | 8/1992 | Murray et al. | |
| 5,142,634 A | 8/1992 | Fite et al. | |
| 5,148,533 A | 9/1992 | Joyce et al. | |
| 5,148,536 A | 9/1992 | Witek et al. | |
| 5,150,309 A | 9/1992 | Shaw et al. | |
| 5,155,843 A | 10/1992 | Stamm et al. | |
| 5,167,026 A | 11/1992 | Murray et al. | |
| 5,167,035 A | 11/1992 | Mann et al. | |
| 5,179,530 A | 1/1993 | Genusov et al. | |
| 5,179,673 A | 1/1993 | Steely, Jr. et al. | |
| 5,179,689 A | 1/1993 | Leach et al. | |
| 5,185,872 A | 2/1993 | Arnold et al. | |
| 5,185,878 A | 2/1993 | Baror et al. | |
| 5,187,796 A | 2/1993 | Wang et al. | |
| 5,193,157 A | 3/1993 | Barbour et al. | |
| 5,197,132 A | 3/1993 | Steely, Jr. et al. | |
| 5,197,136 A | 3/1993 | Kimura et al. | |
| 5,201,056 A | 4/1993 | Daniel et al. | |
| 5,214,763 A | 5/1993 | Blaner et al. | |
| 5,214,786 A | 5/1993 | Watanabe et al. | |
| 5,222,223 A | 6/1993 | Webb, Jr. et al. | |
| 5,222,240 A | 6/1993 | Patel | |
| 5,222,244 A | 6/1993 | Carbine et al. | |
| 5,226,125 A | 7/1993 | Balmer et al. | |
| 5,226,126 A * | 7/1993 | McFarland et al. | 712/218 |
| 5,226,166 A | 7/1993 | Ishida et al. | |
| 5,226,170 A | 7/1993 | Rubinfeld | |
| 5,228,136 A | 7/1993 | Shimizu et al. | |
| 5,230,068 A | 7/1993 | Van Dyke et al. | |
| 5,233,694 A | 8/1993 | Hotta et al. | |
| 5,237,666 A | 8/1993 | Suzuki et al. | |
| 5,239,633 A * | 8/1993 | Terayama et al. | 712/217 |
| 5,241,636 A | 8/1993 | Kohn | |
| 5,249,286 A | 9/1993 | Alpert et al. | |
| 5,251,306 A | 10/1993 | Tran | |
| 5,255,384 A | 10/1993 | Sachs et al. | |
| 5,261,057 A | 11/1993 | Coyle et al. | |
| 5,261,071 A | 11/1993 | Lyon | |
| 5,276,899 A | 1/1994 | Neches | |
| 5,278,963 A | 1/1994 | Hattersley et al. | |
| H1291 H | 2/1994 | Hinton et al. | |
| 5,283,903 A | 2/1994 | Uehara | |
| 5,285,527 A | 2/1994 | Crick et al. | |
| 5,287,465 A | 2/1994 | Kurosawa et al. | |
| 5,287,467 A | 2/1994 | Blaner et al. | |
| 5,291,615 A | 3/1994 | Okamoto | |

| Patent | Type | Date | Inventor |
|---|---|---|---|
| 5,293,500 | A | 3/1994 | Ishida et al. |
| 5,301,278 | A | 4/1994 | Bowater et al. |
| 5,301,340 | A * | 4/1994 | Cook .......................... 712/24 |
| 5,303,362 | A | 4/1994 | Butts, Jr. et al. |
| 5,303,382 | A | 4/1994 | Buch et al. |
| 5,317,720 | A | 5/1994 | Stamm et al. |
| 5,317,734 | A * | 5/1994 | Gupta ......................... 717/161 |
| 5,317,743 | A * | 5/1994 | Imai et al. .................. 717/160 |
| 5,333,280 | A * | 7/1994 | Ishikawa et al. ............ 712/241 |
| 5,345,569 | A | 9/1994 | Tran |
| 5,355,457 | A | 10/1994 | Shebanow et al. |
| 5,355,460 | A | 10/1994 | Eickemeyer et al. |
| 5,367,660 | A | 11/1994 | Gat et al. |
| 5,371,684 | A | 12/1994 | Iadonato et al. |
| 5,377,339 | A | 12/1994 | Saito et al. |
| 5,388,215 | A | 2/1995 | Baker et al. |
| 5,390,355 | A | 2/1995 | Horst |
| 5,394,351 | A | 2/1995 | Widigen et al. |
| 5,394,515 | A | 2/1995 | Lentz et al. |
| 5,394,529 | A | 2/1995 | Brown et al. |
| 5,398,330 | A | 3/1995 | Johnson |
| 5,404,470 | A | 4/1995 | Miyake |
| 5,404,472 | A | 4/1995 | Kurosawa et al. |
| 5,430,884 | A | 7/1995 | Beard et al. |
| 5,430,888 | A | 7/1995 | Witek et al. |
| 5,436,869 | A | 7/1995 | Yoshida |
| 5,440,752 | A | 8/1995 | Lentz et al. |
| 5,442,757 | A | 8/1995 | McFarland et al. |
| 5,446,912 | A | 8/1995 | Colwell et al. |
| 5,448,705 | A | 9/1995 | Nguyen et al. |
| 5,452,426 | A | 9/1995 | Papworth et al. |
| 5,461,715 | A | 10/1995 | Matsuo et al. |
| 5,471,592 | A | 11/1995 | Gove et al. |
| 5,473,764 | A | 12/1995 | Chi |
| 5,481,685 | A | 1/1996 | Nguyen et al. |
| 5,481,734 | A | 1/1996 | Yoshida |
| 5,487,156 | A | 1/1996 | Popescu et al. |
| 5,488,729 | A | 1/1996 | Vegesna et al. |
| 5,490,280 | A | 2/1996 | Gupta et al. |
| 5,493,687 | A | 2/1996 | Garg et al. |
| 5,497,499 | A | 3/1996 | Garg et al. |
| 5,524,225 | A | 6/1996 | Kranich |
| 5,539,911 | A | 7/1996 | Nguyen et al. |
| 5,559,951 | A | 9/1996 | Lentz et al. |
| 5,560,032 | A | 9/1996 | Nguyen et al. |
| 5,560,035 | A | 9/1996 | Garg et al. |
| 5,561,775 | A | 10/1996 | Kurosawa et al. |
| 5,561,776 | A | 10/1996 | Popescu et al. |
| 5,564,056 | A | 10/1996 | Fetterman et al. |
| 5,564,117 | A | 10/1996 | Lentz et al. |
| 5,566,385 | A | 10/1996 | Iadonato et al. |
| 5,568,624 | A | 10/1996 | Sites et al. |
| 5,574,927 | A | 11/1996 | Scantlin |
| 5,574,935 | A | 11/1996 | Vidwans et al. |
| 5,574,941 | A | 11/1996 | Horst |
| 5,577,200 | A | 11/1996 | Abramson et al. |
| 5,577,217 | A | 11/1996 | Hoyt et al. |
| 5,584,001 | A | 12/1996 | Hoyt et al. |
| 5,586,278 | A | 12/1996 | Papworth et al. |
| 5,590,295 | A | 12/1996 | Deosaran et al. |
| 5,592,636 | A | 1/1997 | Popescu et al. |
| 5,604,865 | A | 2/1997 | Lentz et al. |
| 5,604,877 | A | 2/1997 | Hoyt et al. |
| 5,604,912 | A | 2/1997 | Iadonato et al. |
| 5,606,676 | A | 2/1997 | Grochowski et al. |
| 5,608,885 | A | 3/1997 | Gupta et al. |
| 5,613,132 | A | 3/1997 | Clift et al. |
| 5,615,126 | A | 3/1997 | Deeley et al. |
| 5,615,385 | A | 3/1997 | Fetterman et al. |
| 5,617,554 | A | 4/1997 | Alpert et al. |
| 5,619,664 | A | 4/1997 | Glew |
| 5,619,668 | A | 4/1997 | Zaidi |
| 5,623,628 | A | 4/1997 | Brayton et al. |
| 5,625,788 | A | 4/1997 | Boggs et al. |
| 5,625,837 | A | 4/1997 | Popescu et al. |
| 5,627,983 | A | 5/1997 | Popescu et al. |
| 5,627,984 | A | 5/1997 | Gupta et al. |
| 5,627,985 | A | 5/1997 | Fetterman et al. |
| 5,628,021 | A | 5/1997 | Iadonato et al. |
| 5,630,075 | A | 5/1997 | Joshi et al. |
| 5,630,083 | A | 5/1997 | Carbine et al. |
| 5,630,149 | A | 5/1997 | Bluhm |
| 5,630,157 | A | 5/1997 | Dwyer, III |
| 5,640,588 | A | 6/1997 | Vegesna et al. |
| 5,651,125 | A | 7/1997 | Witt et al. |
| 5,655,098 | A | 8/1997 | Witt et al. |
| 5,664,136 | A | 9/1997 | Witt et al. |
| 5,666,494 | A | 9/1997 | Mote, Jr. |
| 5,682,546 | A | 10/1997 | Garg et al. |
| 5,689,672 | A | 11/1997 | Witt et al. |
| 5,689,720 | A | 11/1997 | Nguyen et al. |
| 5,708,841 | A | 1/1998 | Popescu et al. |
| 5,734,584 | A | 3/1998 | Iadonato et al. |
| 5,737,624 | A | 4/1998 | Garg et al. |
| 5,745,375 | A | 4/1998 | Reinhardt et al. |
| 5,754,800 | A | 5/1998 | Lentz et al. |
| 5,768,575 | A | 6/1998 | McFarland et al. |
| 5,778,210 | A | 7/1998 | Henstrom et al. |
| 5,797,025 | A | 8/1998 | Popescu et al. |
| 5,802,605 | A | 9/1998 | Alpert et al. |
| 5,809,276 | A | 9/1998 | Deosaran et al. |
| 5,819,101 | A | 10/1998 | Peleg et al. |
| 5,826,055 | A | 10/1998 | Wang et al. |
| 5,831,871 | A | 11/1998 | Iadonato et al. |
| 5,832,205 | A | 11/1998 | Kelly et al. |
| 5,832,292 | A | 11/1998 | Nguyen et al. |
| 5,832,293 | A | 11/1998 | Popescu et al. |
| 5,838,986 | A | 11/1998 | Garg et al. |
| 5,881,275 | A | 3/1999 | Peleg et al. |
| 5,892,963 | A | 4/1999 | Iadonato et al. |
| 5,896,542 | A | 4/1999 | Iadonato et al. |
| 5,941,979 | A | 8/1999 | Lentz et al. |
| 5,961,629 | A | 10/1999 | Nguyen et al. |
| 5,974,526 | A | 10/1999 | Garg et al. |
| 6,038,653 | A | 3/2000 | Nguyen et al. |
| 6,038,654 | A | 3/2000 | Nguyen et al. |
| 6,044,449 | A | 3/2000 | Garg et al. |
| 6,047,348 | A | 4/2000 | Lentz et al. |
| 6,083,274 | A | 7/2000 | Iadonato et al. |
| 6,092,176 | A | 7/2000 | Iadonato et al. |
| 6,092,181 | A | 7/2000 | Nguyen et al. |
| 6,101,594 | A | 8/2000 | Nguyen et al. |
| 6,128,723 | A | 10/2000 | Nguyen et al. |
| 6,131,157 | A | 10/2000 | Wang et al. |
| 6,138,231 | A | 10/2000 | Deosaran et al. |
| 6,219,763 | B1 | 4/2001 | Lentz et al. |
| 6,249,856 | B1 | 6/2001 | Garg et al. |
| 6,256,720 | B1 | 7/2001 | Nguyen et al. |
| 6,272,579 | B1 | 8/2001 | Lentz et al. |
| 6,272,617 | B1 | 8/2001 | Deosaran et al. |
| 6,272,619 | B1 | 8/2001 | Nguyen et al. |
| 6,282,630 | B1 | 8/2001 | Nguyen et al. |
| 6,289,433 | B1 | 9/2001 | Garg et al. |
| 6,360,309 | B1 | 3/2002 | Iadonato et al. |
| 6,385,634 | B1 | 5/2002 | Peleg et al. |
| 6,401,232 | B1 | 6/2002 | Iadonato et al. |
| 6,408,375 | B2 | 6/2002 | Deosaran et al. |
| 6,412,064 | B1 | 6/2002 | Wang et al. |
| 6,418,529 | B1 | 7/2002 | Roussel |
| 6,611,908 | B2 | 8/2003 | Lentz et al. |
| 6,647,485 | B2 | 11/2003 | Nguyen et al. |
| 6,735,685 | B1 | 5/2004 | Senter et al. |
| 6,757,808 | B2 | 6/2004 | Iadonato et al. |
| 6,775,761 | B2 | 8/2004 | Wang et al. |
| 6,782,521 | B2 | 8/2004 | Iadonato et al. |
| 6,915,412 | B2 | 7/2005 | Nguyen et al. |

| | | | |
|---|---|---|---|
| 6,920,548 B2 | 7/2005 | Wang et al. | |
| 6,922,772 B2 | 7/2005 | Deosaran et al. | |
| 6,934,829 B2 | 8/2005 | Nguyen et al. | |
| 6,941,447 B2 | 9/2005 | Nguyen et al. | |
| 6,948,052 B2 | 9/2005 | Nguyen et al. | |
| 6,954,844 B2 | 10/2005 | Lentz et al. | |
| 6,959,375 B2 | 10/2005 | Nguyen et al. | |
| 6,970,995 B2 | 11/2005 | Deosaran et al. | |
| 6,986,024 B2 | 1/2006 | Nguyen et al. | |
| 7,028,161 B2 | 4/2006 | Nguyen et al. | |
| 7,043,624 B2 | 5/2006 | Iadonato et al. | |
| 7,051,187 B2 | 5/2006 | Garg et al. | |
| 7,162,610 B2 | 1/2007 | Nguyen et al. | |
| 7,174,525 B2 | 2/2007 | Iadonato et al. | |
| 2001/0034823 A1 | 10/2001 | Garg et al. | |
| 2002/0059508 A1 | 5/2002 | Lentz et al. | |
| 2002/0083300 A1 | 6/2002 | Deosaran et al. | |
| 2002/0129324 A1 | 9/2002 | Iadonato et al. | |
| 2002/0194456 A1 | 12/2002 | Deosaran et al. | |
| 2003/0056086 A1 | 3/2003 | Nguyen et al. | |
| 2003/0056087 A1 | 3/2003 | Nguyen et al. | |
| 2003/0070060 A1 | 4/2003 | Nguyen et al. | |
| 2003/0079113 A1 | 4/2003 | Nguyen et al. | |
| 2003/0115440 A1 | 6/2003 | Garg et al. | |
| 2004/0024987 A1 | 2/2004 | Lentz et al. | |
| 2004/0054872 A1 | 3/2004 | Nguyen et al. | |
| 2004/0093482 A1 | 5/2004 | Nguyen et al. | |
| 2004/0093483 A1 | 5/2004 | Nguyen et al. | |
| 2004/0093485 A1 | 5/2004 | Nguyen et al. | |
| 2005/0228973 A1 | 10/2005 | Wang et al. | |
| 2006/0020773 A1 | 1/2006 | Deosaran et al. | |
| 2006/0041736 A1 | 2/2006 | Garg et al. | |
| 2006/0064569 A1 | 3/2006 | Lentz et al. | |
| 2006/0123218 A1 | 6/2006 | Iadonato et al. | |
| 2006/0149925 A1 | 7/2006 | Nguyen et al. | |
| 2007/0101103 A1 | 5/2007 | Nguyen et al. | |
| 2007/0106880 A1 | 5/2007 | Wang et al. | |
| 2007/0113047 A1 | 5/2007 | Garg et al. | |
| 2007/0113214 A1 | 5/2007 | Iadonato et al. | |
| 2008/0059770 A1 | 3/2008 | Garg et al. | |

FOREIGN PATENT DOCUMENTS

| | | | |
|---|---|---|---|
| EP | 0 155 211 | | 9/1985 |
| EP | 0 170 284 | | 2/1986 |
| EP | 0 171 595 | A2 | 2/1986 |
| EP | 0 213 843 | | 3/1987 |
| EP | 0 241 909 | | 10/1987 |
| EP | 0 331 191 | | 9/1989 |
| EP | 0 372 751 | A2 | 11/1989 |
| EP | 0 377 991 | A3 | 12/1989 |
| EP | 0 354 585 | A2 | 2/1990 |
| EP | 0 368 332 | A2 | 5/1990 |
| EP | 0 378 195 | | 7/1990 |
| EP | 0 419 105 | A2 | 10/1990 |
| EP | 0 402 856 | | 12/1990 |
| EP | 0 426 393 | | 8/1991 |
| EP | 0 454 636 | | 10/1991 |
| EP | 0 479 390 | A2 | 8/1992 |
| EP | 0 515 166 | | 11/1992 |
| EP | 0 533 337 | | 3/1993 |
| FR | 2 575 564 | | 12/1985 |
| GB | 2 011 682 | | 11/1979 |
| GB | 2 190 521 | | 11/1987 |
| JP | 51-10746 | | 1/1976 |
| JP | 57-57345 | | 4/1982 |
| JP | 57-150040 | | 9/1982 |
| JP | 60-144830 | | 7/1985 |
| JP | 61-40650 | | 2/1986 |
| JP | 61-107434 | | 5/1986 |
| JP | 61-95447 | | 6/1986 |
| JP | 61-133439 | | 6/1986 |
| JP | 62-242243 | | 10/1987 |
| JP | 63-192135 | | 8/1988 |
| JP | 64 36336 | | 2/1989 |
| JP | 64-36366 | | 2/1989 |
| JP | 1-142831 | | 6/1989 |
| JP | 1-199233 | | 8/1989 |
| JP | 2-22736 | | 1/1990 |
| JP | 2-048732 | | 2/1990 |
| JP | 2-87229 | | 3/1990 |
| JP | 2-118757 | | 5/1990 |
| JP | 2-130634 | | 5/1990 |
| JP | 2-130635 | | 5/1990 |
| JP | HEI2-130635 | | 5/1990 |
| JP | 2-211534 | | 8/1990 |
| JP | 2-224025 | | 9/1990 |
| JP | 2-226342 | | 9/1990 |
| JP | 2-278337 | | 11/1990 |
| JP | 3-35322 | | 2/1991 |
| JP | 3-137729 | | 6/1991 |
| JP | 3-147134 | | 6/1991 |
| JP | 3-218524 | | 9/1991 |
| JP | 4-54638 | | 2/1992 |
| JP | 4-96132 | | 3/1992 |
| JP | 4-503582 | | 6/1992 |
| JP | 5-197544 | | 8/1993 |
| JP | 6-19707 | | 1/1994 |
| JP | 2000-339159 | A | 12/2000 |
| JP | 2000-339160 | A | 12/2000 |
| JP | 2000-353090 | A | 12/2000 |
| JP | 2000-357091 | A | 12/2000 |
| WO | WO 88/09035 | | 11/1988 |
| WO | WO 91/20031 | | 12/1991 |

OTHER PUBLICATIONS

First Amended Complaint, 8 pages, dated Dec. 12, 2006, in *Transmeta Corporation v. Intel Corporation*, in the U.S. District Court for the District of Delaware, Case No. 1:06-cv-00633.

Intel Corporation's Answer, Affirmative Defenses, and Counterclaims to Transmeta's First Amended Complaint, 27 pages, dated Jan. 9, 2007, in *Transmeta Corporation v. Intel Corporation*, in the U.S. District Court for the District of Delaware, Case No. 1:06-cv-00633.

Intel Corporation's Responses to Transmeta's First Set of Interrogatories to Intel Corporation (Nos. 1-24)—Redacted Public Version, 132 pages, dated May 18, 2007, in *Transmeta Corporation v. Intel Corporation*, in the U.S. District Court for the District of Delaware, Case No. 1:06-cv-00633.

Intel Corporation's Supplemental Responses to Transmeta Interrogatory Nos. 8, 9, 12, 19, and 21-23—Redacted Public Version, 27 pages, dated Aug. 23, 2007, in *Transmeta Corporation v. Intel Corporation*, in the U.S. District Court for the District of Delaware, Case No. 1:06-cv-00633.

Intel Corporation's Opening Claim Construction Brief, 76 pages, dated Oct. 19, 2007, in *Transmeta Corporation v. Intel Corporation*, in the U.S. District Court for the District of Delaware, Case No. 1:06-cv-00633.

Transmeta Corporation's Opening Claim Construction Brief, 66 pages, dated Oct. 19, 2007, in *Transmeta Corporation v. Intel Corporation*, in the U.S. District Court for the District of Delaware, Case No. 1:06-cv-00633.

Stipulation of Dismissal, 1 page, dated Jan. 31, 2008, in *Transmeta Corporation v. Intel Corporation*, in the U.S. District Court for the District of Delaware, Case No. 1:06-cv-00633.

Order Granting Request for Ex Parte Reexamination, mailed Jun. 12, 2007 in Control No. 90/008,585, 19 pages.

Order Granting Request for Ex Parte Reexamination, mailed Aug. 13, 2007 in Control No. 90/008,691, 20 pages.

Order Granting Request for Ex Parte Reexamination, mailed Aug. 29, 2007 in Control No. 90/008,712, 16 pages.

Order Granting Request for Ex Parte Reexamination, mailed May 11, 2007 in Control No. 90/008,569, 27 pages.

Order Granting Request for Ex Parte Reexamination, mailed May 11, 2007 in Control No. 90/008,573, 17 pages.

Order Granting Request for Ex Parte Reexamination, mailed Jun. 26, 2007 in Control No. 90/008,644, 35 pages.

Adams et al., "Utilizing low level parallelism in general purpose code: the HARP project," Microprocessors and Microsystems, vol. 29, No. 3 (Oct. 1990).

Albert, AJ, "User Configurable Local Storage Registers," IBM Technical Disclosure Bulletin, pp. 3971-3975 (1976).

Baker, T., "Headroom and Legroom in the 80960 Architecture," COMPCON Spring '90: Thirty-Fifth IEEE Computer Society International Conference, IEEE Computer Society, 1990, pp. 299-306.

Birman, M. et al., "Design of a High-Speed Arithmetic Datapath," Proceedings 1988 IEEE International Conference on Computer Design: VLSI in Computers & Processors, IEEE, Oct. 3-5, 1988, pp. 214-216.

Butler, M. and Patt, Y., "An Improved Area-Efficient Register Alias Table for Implementing HPS," University of Michigan, Ann Arbor, Michigan, 24 pages (Jan. 1990).

Butler, M. and Patt, Y., "An Investigation of the Performance of Various Dynamic Scheduling Techniques," Proceedings from MICRO 25, pp. 1-9 (Dec. 1 4, 1992).

Butler, M. et al., "Single Instruction Stream Parallelism Is Greater than Two," Proceedings of the 18$^{th}$ Annual International Symposium on Computer Architecture, ACM, pp. 276-286 (May 1991).

Colwell, R. et al., "Architecture and implementation of a VLIW supercomputer," Proc. Of the 1990 Conf. on Supercomputing (1990).

Convex Architecture Handbook, Version 1, Convex Computer Corporation (1984).

Dwyer, H, A Multiple, Out-of-Order Instruction Issuing System for Superscalar Processors, UMI, pp. 1-249 (Aug. 1991).

Fairchild Semiconductor "Clipper 32-Bit Microprocessor—User's Manual," Prentice-Hall, Inc. (1987).

Gee, J. et al., "The Implementation of Prolog via VAX 8600 Microcode," Proceedings of Micro 19, IEEE, Oct. 1986, pp. 68-74.

Groves, R.D. and Oehler, R., "An IBM Second Generation RISC Processor Architecture," COMPCON 90: 35th IEEE Computer Society International Conference, IEEE, Feb. 26, 1990, pp. 166-172.

Hara et al., "Branch Pipeline of DSNS Superscalar Processor Prototype", Computer Architecture, 86-3, Jan. 24, 1991, pp. 1-8 in Japanese language (with English language translation, 20 pages).

Huang, J.W. et al., "Dynamically Reconfigurable Vectors," IBM Technical Disclosure Bulletin, pp. 3480-3483 (Dec. 1980).

Hunter, C., Series 32000 Programmer's Reference Manual, Prentice-Hall Inc., Englewood Cliffs, NJ, 1987, pp. 2-4, 2-21, 2-23, 6-14 and 6-126.

Hwang, K. et al., "Computer Architecture and Parallel Processing," Pipeline Computers and Vectorization Methods, McGraw Hill, Inc., 1984, pp. 264-280.

Hwu, W. and Patt, Y., "Design Choices for the HPSm Microprocessor Chip," Proceedings of the Twentieth Annual Hawaii International Conference on System Sciences, pp. 330-336 (1987).

Hwu, W. et al., "An HPS Implementation of VAX: Initial Design and Analysis," Proceedings of the Nineteenth Annual Hawaii International Conference on System Sciences, pp. 282-291 (1986).

Hwu, W. and Patt, Y., "HPSm2: A Refined Single-Chip Microengine," HICSS '88, IEEE,pp. 30-40 (1988).

Intrater et al., "A Superscalar Microprocessor," IEEE Proceedings of the 17th Convention of Electrical & Electronics Engineers In Israel, pp. 267-270 (Mar. 1991).

Johnson, M. Superscalar Microprocessor Design, Prentice-Hall, pp. vii-xi and 87-125 (1991).

Kanai, T. et al., "A 16-bit Microcomputer μPD70423 for Serial Communication," NEC Research & Development, NEC, vol. 32, No. 3, Jul. 1991, pp. 350-360.

Kateveris, Hardware Support "Thesis," p. 138-145 (1984).

Kogge, P.M., "The Architecture of Pipelined Computers," Static Pipelined Systems Vector Processors, Hemisphere Publishing Corporation, 1981, pp. 167-172.

Lightner, B.D. and Hill, G., "The Metaflow Lightning Chipset", Compcon Spring 91, IEEE, pp. 13-18 (Feb. 25-Mar. 1, 1991).

Maejima et al., "A 16-bit Microprocessor with Multi-Register Band Architecture," Proc. Fall Joint Computer Conference, pp. 1014-1019 (Nov. 2-6, 1986).

Maly et al., "Memory Chip for 24-Port Global Register File," Custom Integrated Circuits Conference, Proceedings of the IEEE, (May 12, 1991).

Margulis, N., "i860 microprocessor internal architecture," Microprocessors and Microsystems, Butterworth & Co. Ltd., vol. 14, No. 2, pp. 89-96 (Mar. 1990).

Melvin, S. and Patt, Y., "Exploiting Fine Grained Parallelism Through a Combination of Hardware and Software Techniques," The 18th Annual International Symposium on Computer Architecture, ACM SIGARCH, vol. 19, No. 3, pp. 287-296 (May 1991).

Miller et al., "Exploiting Large Register Sets," Microprocessors and Microsystems, Butterworth-Heinemann Ltd., vol. 14, No. 6, Jul. 1990, pp. 333-340.

Molnar, K. et al., "A 40 MHz 64-Bit Floating-Point Co-Processor," 1989 IEEE International Solid-State Circuits Conference, IEEE, Feb. 1989, pp. 48, 49 and 287.

Myers et al., The 80960 Microprocessor Architecture, John Wiley & Sons, Inc (1988).

Paper No. 28 (Office Action dated Jun. 19, 1996) from U.S. Appl. No. 08/481,146.

Paper No. 32 (Office Action dated Nov. 18, 1996) from U.S. Appl. No. 08/481,146.

Patt, Y.N. et al., "Experiments with HPS, a Restricted Data Flow Microarchitecture for High Performance Computers," COMPCON 86, IEEE, pp. 254-258 (1986).

Patt, Y.N. et al., "Run-Time Generation of HPS Microinstructions From a VAX Instruction Stream," Proceedings of MICRO 19 Workshop, New York, pp. 75-81 (Oct. 1986).

Patterson, D. A. and Séquin, C.H., "A VLSI RISC," Computer, IEEE, vol. 15, No. 9, Sep. 1982, pp. 8-18 and 20-21.

Peleg, A. and Weiser, U., "Future Trends in Microprocessors: Out-of-Order Execution, Speculative Branching and their CISC Performance Potential", IEEE, pp. 263-266 (1991).

Pleszkun, A.R. et al., "WISQ: A Restartable Architecture Using Queues," Proceedings of the 14th International Symposium on Computer Architecture, ACM, pp. 290-299 (Jun. 1987).

Russell, R. M., "The CRAY-1 Computer System," Association for Computing Machinery, Inc., vol. 21, No. 1, Jan. 1978, pp. 63-72.

Steven, G.B. et al., "HARP: A parallel pipelined RISC processor," Microprocessors and Microsystems, Butterworth & Co. Ltd., vol. 13, No. 9,Nov. 1989, pp. 579-586.

Swensen, J.A. and Patt, Y.N., "Hierarchical Registers for Scientific Computers," Conference Proceedings: 1988 International Conference on Supercomputing, ICS, Jul. 4-8, 1988.

Third-Generation TMS320 User's Guide, Texas Instruments (1988).

Uvieghara, G.A. et al., "An Experimental Single-Chip Data Flow CPU," IEEE Journal of Solid-State Circuits, IEEE, vol. 27, No. 1, pp. 17-28 (Jan. 1992).

Uvieghara, G.A. et al., "An Experimental Single-Chip Data Flow CPU," Symposium on ULSI Circuits Design Digest of Technical Papers, 2 pages (May 1990).

Vin et al., "Instruction Scheduling in High-Performance Architectures—MIDR Algorithm," CIPS Edmonton '88, Chaos Into Order, Proceedings, Edmonton, Alta., Canada, pp. 69-75 (Nov. 7, 1988).

Wilson, J.E. et al., "On Tuning the Microarchitecture of an HPS Implementation of the VAX," Proceedings of the 20th Annual Workshop on Microprogramming, IEEE Computer Society, pp. 162-167 (Dec. 1-4, 1987).

8-Bit Embedded controller Handbook, Intel, 1989, pp. 1-1-1-19 and 3-1-3-37.

Acosta, Raymond D. et al., "An Instruction Issuing Approach to Enhancing Performance in Multiple Functional Unit Processors," IEEE Transactions on Computers, vol. C-35, No. 9, Sep. 1986, pp. 815-828.

Agerwala et al., "High Performance Reduced Instruction Set Processors," IBM Research Division, Mar. 31, 1987, pp. 1-61.

Andrews, Distinctions Blur Between DSP Solutions, Computer Design, vol. 28, No. 9, May 1, 1989, Littleton, Mass., pp. 86-99.

Charlesworth, A.E., "An Approach to Scientific Array Processing: The Architectural Design of the AP-120B/FPS-164 Family," Computer, vol. 14, Sep. 1981, pp. 18-27.

Colwell et al., "A VLIW Architecture for a Trace Scheduling Compiler," Proceedings of the 2nd International Conference on Architectural Support for Programming Languages and Operating Systems, Oct. 1987, pp. 180-192.

Foster et al., "Percolation of Code to Enhance Parallel Dispatching and Execution," IEEE Trans. On Computers, Dec. 1971, pp. 1411-1415.

Goodman, J.R. and Hsu, W., "Code Scheduling and Register Allocation in Large Basic Blocks," ACM, 1988, pp. 442-452.

Gross et al., "Optimizing Delayed Branches," Proceedings of the 5th Annual Workshop on Microprogramming, Oct. 5-7, 1982, pp. 114-120.

Groves, R.D. and Oehler, R., "An IBM Second Generation RISC Processor Architecture," IEEE, 1989, pp. 134-137.

Bakoglu et al., "IBM Second-Generation RISC Machine Organization," 1990, IEEE, pp. 173-178.

H. Nakano et al., "A 80 Mflops 64-bit Microprocessor for Parallel Computer," 1991, IEEE, pp. 15.2.1-15.2.4.

Horst, R.W. et al., "Multiple Instruction Issue in the NonStop Cyclone Processor," IEEE, 1990, pp. 216-226.

Hwu et al., "HPSm, a High Performance Restricted Data Flow Architecture Having Minimal Functionality," Proceedings from ISCA-13, Tokyo, Japan, Jun. 2-5, 1986, pp. 297-306.

Hwu et al., "Checkpoint Repair for High-Performance Out-of-Order Execution Machines," IEEE Trans. On Computers, vol. C-36, No. 12, Dec. 1987, pp. 1496-1514.

Hwu et al., "Exploiting Parallel Microprocessor Microarchitectures with a Compiler Code Generator," Proceedings of the 15th Annual Symposium on Computer Architecture, Jun. 1988, pp. 45-53.

IBM Journal of Research and Development, vol. 34, No. 1, Jan. 1990, pp. 1-70.

IBM Technical Disclosure Bulletin, Overlap of Store Multiple Operation With Succeeding Operations through Second Set of General Purpose Registers, Voll 28, No. 6, Nov. 1989, New York, NY, pp. 2727-2728.

Jelemensky, New Microcomputer Features Advanced Hardware For Real-Time Control Applications, Electro Conference Record, vol. 14, Apr. 11, 1989, Los Angeles, CA, pp. 511-519.

Johnson, William M., Super-Scalar Process Design, (Dissertation), copyright 1989, 134 pages.

Johnson, William M., Super-Scalar Processor Design, Prentice-Hall, Inc., 1991 (in its entirety).

Jouppi, N.H., "Integration and Packaging Plateaus of Processor Performance," IEEE, 1989, pp. 229-232.

Jouppi, N.P., "The Nonuniform Distribution of Instruction-Level and Machine Parallelism and Its Effect on Performance," IEEE Transactions on Computers, vol. 38, No. 12, Dec. 1989, pp. 1645-1658.

Jouppi et al., "Available Instruction-Level Parallelism for Superscalar and Superpipelined Machines," Proceedings of the 3rd International Conference on Architectural Support for Programming Languages and Operating Systems, Apr. 1989, pp. 272-282.

Keller, R.M., "Look-Ahead Processors," Computing Surveys, vol. 7, No. 4, Dec. 1975, pp. 177-195.

Lam, M.S., "Instruction Scheduling For Superscalar Architectures," Annu. Rev. Comput. Sci., vol. 4, 1990, pp. 173-201.

Lee, Ruby B., "Precision Architecture," Computer, Jan. 1989, pp. 78-91.

Melear, C., Motorola, Inc., The Design of the 88000 RISC Family, IEEE Micro, vol. 9, No. 2, Apr. 1989, Los Alamitos, CA, pp. 26-38.

Murakami, K. et al., "SIMP (Single Instruction Stream/Multiple Instruction Pipelining): A Novel High-Speed Single-Processor Architecture," ACM, 1989, pp. 78-85.

Odnert, D. et al., "Architecture and Compiler Enhancements for PA-RISC Workstations," Proceedings from IEEE Compcon, Feb. 25-Mar. 1, 1991, San Francisco, CA, pp. 214-218.

Patent Abstracts of Japan, vol. 010, No. 089, Apr. 1986, & JP, A, 60 225 943 (Hitachi Seisakusho K K) Nov. 11, 1985.

Patt et al., "Critical Issues Regarding HPS, A High Performance Microarchitecture," Proceedings of the 18th Annual Workshop on Microprogramming, Dec. 1985, pp. 109-116.

Patt et al., "HPS, A New Microarchitecture: Rationale and Introduction," Proceedings of the 18th Annual Workshop on Microprogramming, Dec. 1985, pp. 103-108.

Pleszkun et al., "The Performance Potential of Multiple Functional Unit Processors," Proceedings of the 15th Annual Symposium on Computer Architecture, Jun. 1988, pp. 37-44.

Pleszkun et al., "WISQ: A Restartable Architecture Using Queues," Proceedings of the 14th International Symposium on Computer Architecture, Jun. 1987, pp. 290-299.

Popescu et al., The Metaflow Architecture, Metaflow Technologies, Inc., Jun. 1991(in its entirety).

S. McGeady, "The i960A Superscalar Implementation of the 80960 Architecture," IEEE, 1990, pp. 232-240.

Smith et al., Implementation Precise Interrupts in Pipelined Processors, IEEE Transactions on Computers, vol. 37, No. 5, May 1988, New York, NY, p. 562, 573.

Smith et al., "Implementation of Precise Interrupts in Pipelined Process," Proceedings of the 12th Annual International Symposium on Computer Architecture, Jun. 1985, pp. 36-44.

Smith et al., "Limits on Multiple Instruction Issue," Proceedings of the 3rd International Conference on Architectural Support for Programming Languages and Operating Systems, Apr. 1989, pp. 290-302.

Smith, M.D. et al., "Boosting Beyond Static Scheduling in a Superscalar Processor," IEEE, 1990, pp. 344-354.

Sohl, Gurindar S. and Sriram Vajapeyam, "Instruction Issue Logic for High-Performance, Interruptable Pipelined Processors," Conference Proceedings of the 14th Annual International Symposium on Computer Architecture, Jun. 2-5, 1987, pp. 27-34.

Thornton, J.E., Design of a Computer: The Control Data 6600, Control Data Corporation, 1970, pp. 58-140.

Tjaden et al., "Detection and Parallel Execution of Independent Instructions," IEEE Trans. On Computers, vol. C-19, No. 10, Oct. 1970, pp. 889-895.

Tjaden et al., "Representation of Concurrency with Ordering Matrices," IEEE Trans. On Computers, vol. C-22, No. 8, Aug. 1973, pp. 752-761.

Tjaden, Representation and Detection of Concurrency Using Ordering Matrices, (Dissertation), 1972, pp. 1-199.

Tomasulo, R.M., "An Efficient Algorithm for Exploiting Multiple Arithmetic Units," IBM Journal, vol. 11, Jan. 1967, pp. 25-33.

Uht, A.K., "An Efficient Hardware Algorithm to Extract Concurrency From General-Purpose Code," Proceedings of the 19th Annual Hawaii International Conference on System Sciences, 1986, pp. 41-50.

Wedig, R.G., Detection of Concurrency in Directly Executed Language Instruction Streams, (Dissertation), Jun. 1982, pp. 1-179.

Weiss, R., Third-Generation Risc Processors, On Special Report, Mar. 30, 1992, pp. 96-108.

Weiss et al., "Instruction Issue Logic in Pipelined Supercomputers," Reprinted from IEEE Trans. On Computers, vol. C-33, No. 11, Nov. 1984, pp. 1013-1022.

English Language Translation of Japanese Patent Appl. No. 61-95447, published May 14, 1986, 15 pages.

English Language Translation of Japanese Patent Appl. No. 2-278337, published Nov. 14, 1990, 20 pages.

English Language Translation of Japanese Patent Appl. No. 3-137729, published Jun. 12, 1991, 7 pages.

English Language Translation of Japanese Patent Appl. No. 3-147134, published Jun. 24, 1991, 18 pages.

Kuga Morio et al., "Performance Evaluation of the Superscalar Processor "SIMP" based on the SIMP (Single Instruction Stream/Multiple Instruction Pipeline) Architecture," Interdisciplinary Graduate School of Engineering Sciences, Kyushu University, 1990, pp. 337-344.

English Language Translation, Kuga Morio et al., "Performance Evaluation of the Superscalar Processor "SIMP" based on the SIMP (Single Instruction Stream/Multiple Instruction Pipeline) Architecture," Interdisciplinary Graduate School of Engineering Sciences, Kyushu University, 1990, pp. 337-344, (Document AR20).

Kuga Morihiro et al., "Low-Level Parallel Processing Algorithm for the SIMP Processor Prototype," Department of Information Systems, Interdisciplinary Graduate School of Engineering Sciences, Kyushu University, vol. 30, No. 12, Dec. 1989, pp. 1603-1611.
English Language Translation, Kuga Morihiro et al., "Low-Level Parallel Processing Algorithm for the SIMP Processor Prototype," Department of Information Systems, Interdisciplinary Graduate School of Engineering Sciences, Kyushu University, vol. 30, No. 12, Dec. 1989, pp. 1603-1611, (Document AT20).
U.S. Appl. No. 09/336,589, Senter Cheryl et al., filed Jun. 21, 1999.
Colwell et al., "A VLIW Architecture for a Trace Scheduling Compiler," Proceedings of the 2nd International Conference on Architectural Support for Programming Languages and Operating Systems, Oct. 5-8, 1987, California.
Notification of Reason for Refusal for Japanese Patent Application No. 2000-145123, mailed Jun. 26, 2002, 2 pages.
Notification of Reason for Refusal for Japanese Patent Application No. 2000-145124, mailed Jun. 26, 2002, 2 pages.
Notification of Reason for Refusal for Japanese Patent Application No. 2000-145125, mailed Jun. 26, 2002, 2 pages.
Notification of Reason for Refusal for Japanese Patent Application No. 2000-145126, mailed Jul. 3, 2002, 2 pages.
Notification of Reason for Refusal for Japanese Patent Application No. 2000-146442, mailed Jul. 3, 2002, 2 pages.
Notification of Reason for Refusal for Japanese Patent Application No. 2000-146443, mailed Jul. 3, 2002, 2 pages.
English-language translation of Japanese Laid-Open Patent Application No. H02-22736, (Jan. 25, 1990—date of publication), 10 pages.
English-language translation of Japanese Laid-Open Patent Application No. H02-87229, (Mar. 28, 1990—date of publication), 5 pages.
English-language translation of Notification of Reason for Refusal for Japanese Patent Application No. 2000-145123, mailed Jun. 26, 2002, 3 pages.
English-language translation for Notification of Refusal for Japanese Patent Application No. 2000-145124, mailed Jun. 26, 2002, 3 pages.
English-language translation for Notification of Refusal for Japanese Patent Application No. 2000-145125, mailed Jun. 26, 2002, 4 pages.
English-language translation for Notification of Refusal for Japanese Patent Application No. 2000-145126, mailed Jul. 3, 2002, 3 pages.
English-language translation for Notification of Reason for Refusal for Japanese Patent Application No. 2000-146442, mailed Jul. 3, 2002, 4 pages.
English-language translation for Notification of Reason for Refusal for Japanese Patent Application No. 2000-146443, mailed Jul. 3, 2002, 4 pages.
Kuga Morihiro et al., Low-Level Parallel Processing Algorithms for the "Shinpu" Processor Based on the SIMP (Single Instruction Stream / Multiple Instruction Pipelining) Method, Department of Information System, Interdisciplinary Graduate School of Engineering Sciences, Kyushu University, vol. 30, No. 12, Dec. 1989, pp. 1603-1611.
English-language translation, Kuga Morihiro et al., Low-Level Parallel Processing Algorithms for the "Shinpu" Processor Based on the SIMP (Single Instruction Stream / Multiple Instruction Pipelining) Method, Department of Information System, Interdisciplinary Graduate School of Engineering Sciences, Kyushu University, vol. 30, No. 12, Dec. 1989, pp. 1603-1624.
Final Rejection from Japanese Patent Appl. No. 502150, 1 page, (Jul. 16, 2002).
English translation of Final Rejection from Japanese Patent Appl. No. 502150, 1 page, (Jul. 16, 2002).
English translation of Japanese Laid Open Patent Appl. No. H02-130634, (May 18, 1990—date of publication), 56 pages.
Notice of Grounds For Rejection, dated Oct. 2, 2003, for Japanese Patent Application No. 2000-145123 (2 pages) with English translation (2 pages).
Notice of Grounds For Rejection, dated Oct. 2, 2003, for Japanese Patent Application No. 2000-145124 (2 pages) with English translation (2 pages).
Notice of Grounds for Rejection, dated Oct. 3, 2003, for Japanese Patent Application No. 2000-145125 (3 pages) with English translation (4 pages).
Notice of Grounds for Rejection, dated Oct. 3, 2003, for Japanese Patent Application No. 2000-145126 (3 pages) with English translation (4 pages).
European Search Report issued Dec. 9, 2003 in EP application No. 03 02 4585, 3 pages.
Notice of Reason of Rejection, mailed Oct. 24, 2003, for Japanese Appln. No. 2000-146441, 2 pages, accompanied by translation of 2 pages.
Notice of Reason of Rejection, mailed Oct. 24, 2003, for Japanese Appln. No. 2000-146442, 2 pages, accompanied by translation of 4 pages.
Notice of Reason of Rejection, mailed Oct. 24, 2003, for Japanese Appln. No. 2000-146443, 2 pages, accompanied by translation of 4 pages.
English language translation of Japanese Application No. 2-130635, dated May 18, 1990, 19 pages.
Final Rejection, mailed Jan. 30, 2004, for Japanese Appl. No. 2000-146443 and English language translation of same, 3 pages.
Findlay, et al., "HARP: A VLIW RISC Processor", *Proceeding of 5th Annual European Computer Conference on Advanced Computer Technology, Reliable Systems and Applications*, May 16, 1991, pp. 368-372.
Kuga et al., "DSNS (Dynamically-hazard-resolved, Statically-code-scheduled, Nonuniform Superscalar): Yet Another Superscalar Processor Architecture", Dept. of Information Systems, Interdisciplinary Graduate School of Engineering Sciences, Kyushu University, Fukuoka, Japan, pp. 14-29, Jun. 1991.
Colwell et al., "A VLIW Architecture For A Trace Scheduling Compiler", Association For Computing Machinery (ACM), 1987, pp. 180-192.

* cited by examiner

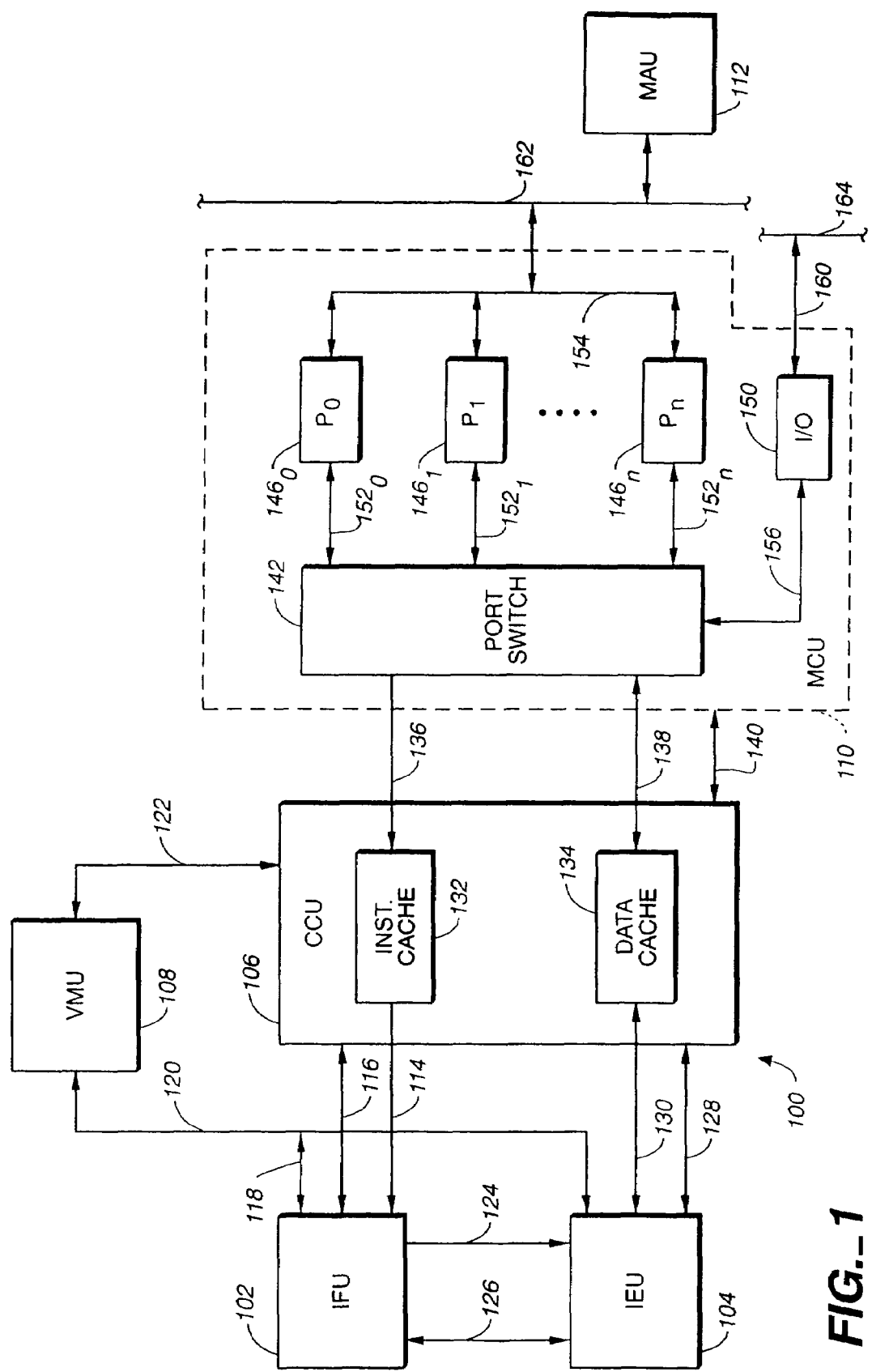
FIG._1

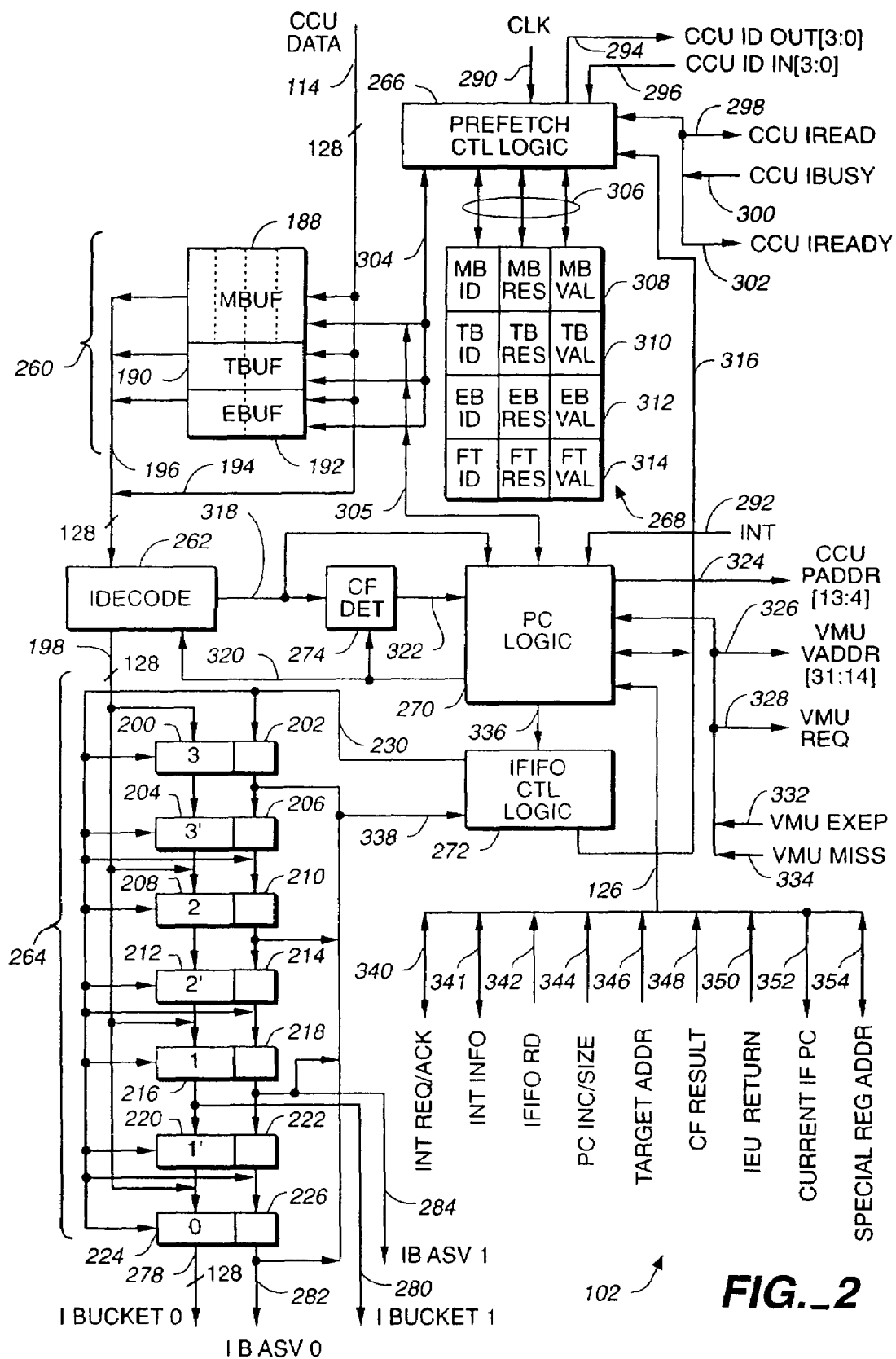
FIG._2

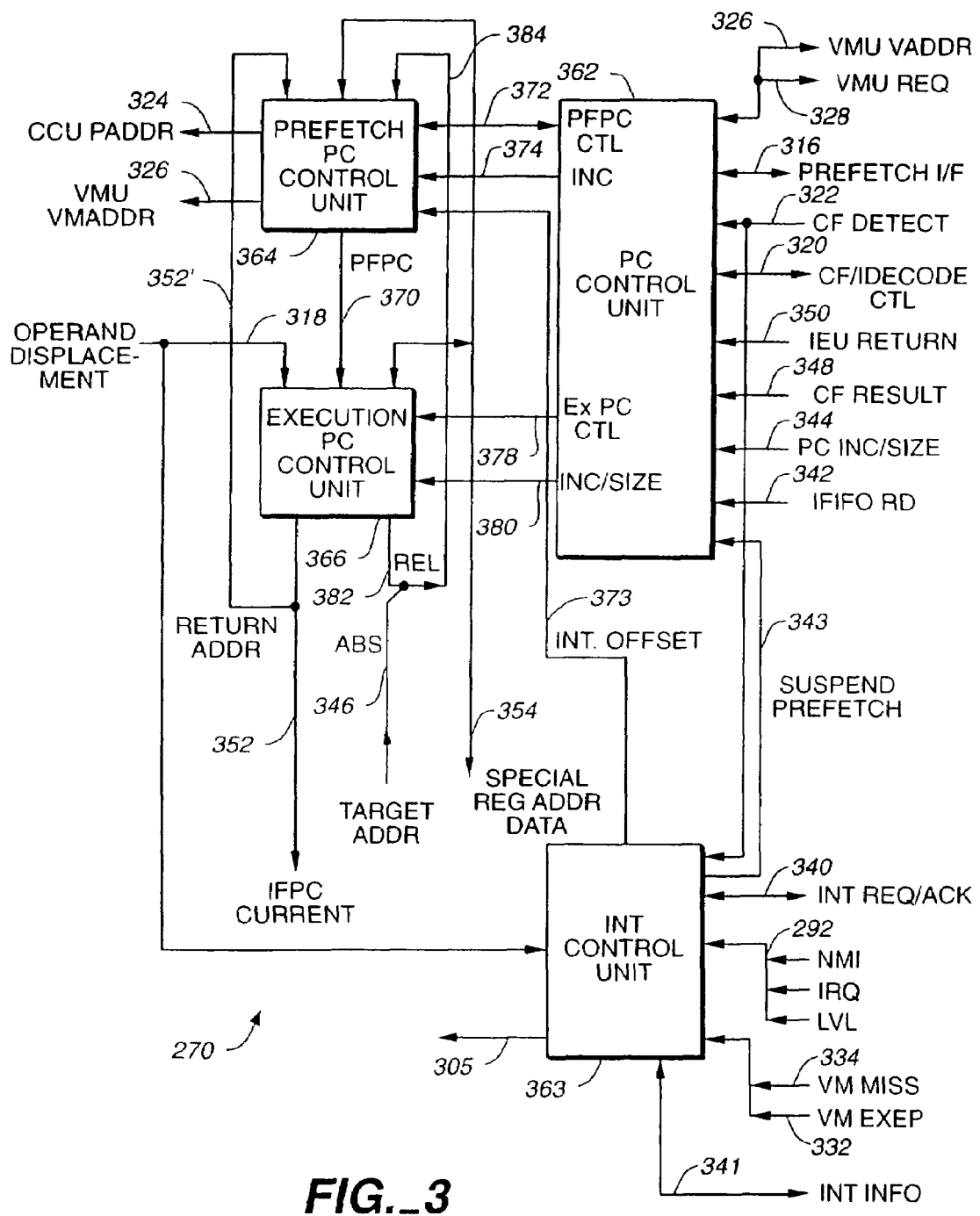
FIG._3

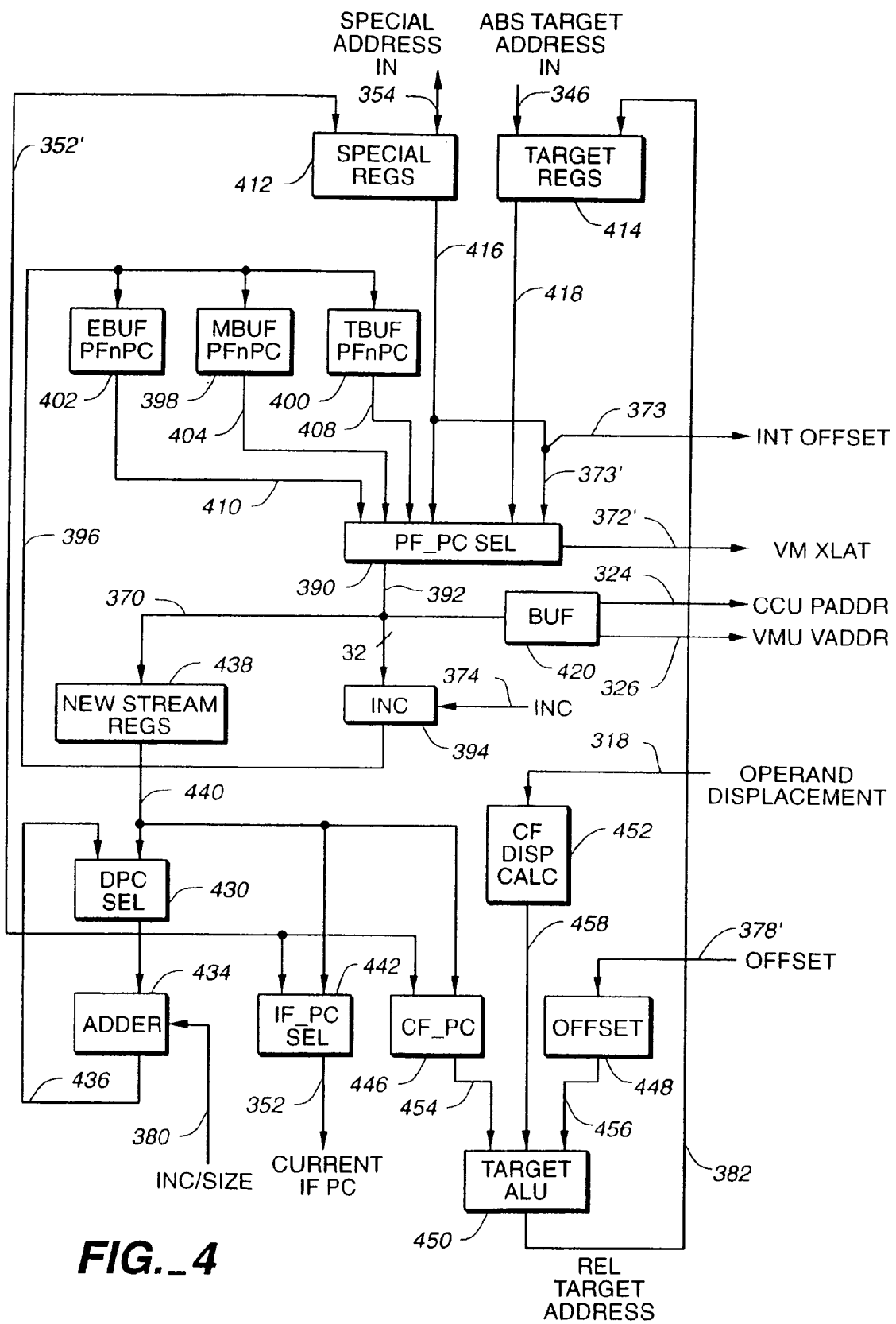
FIG._4

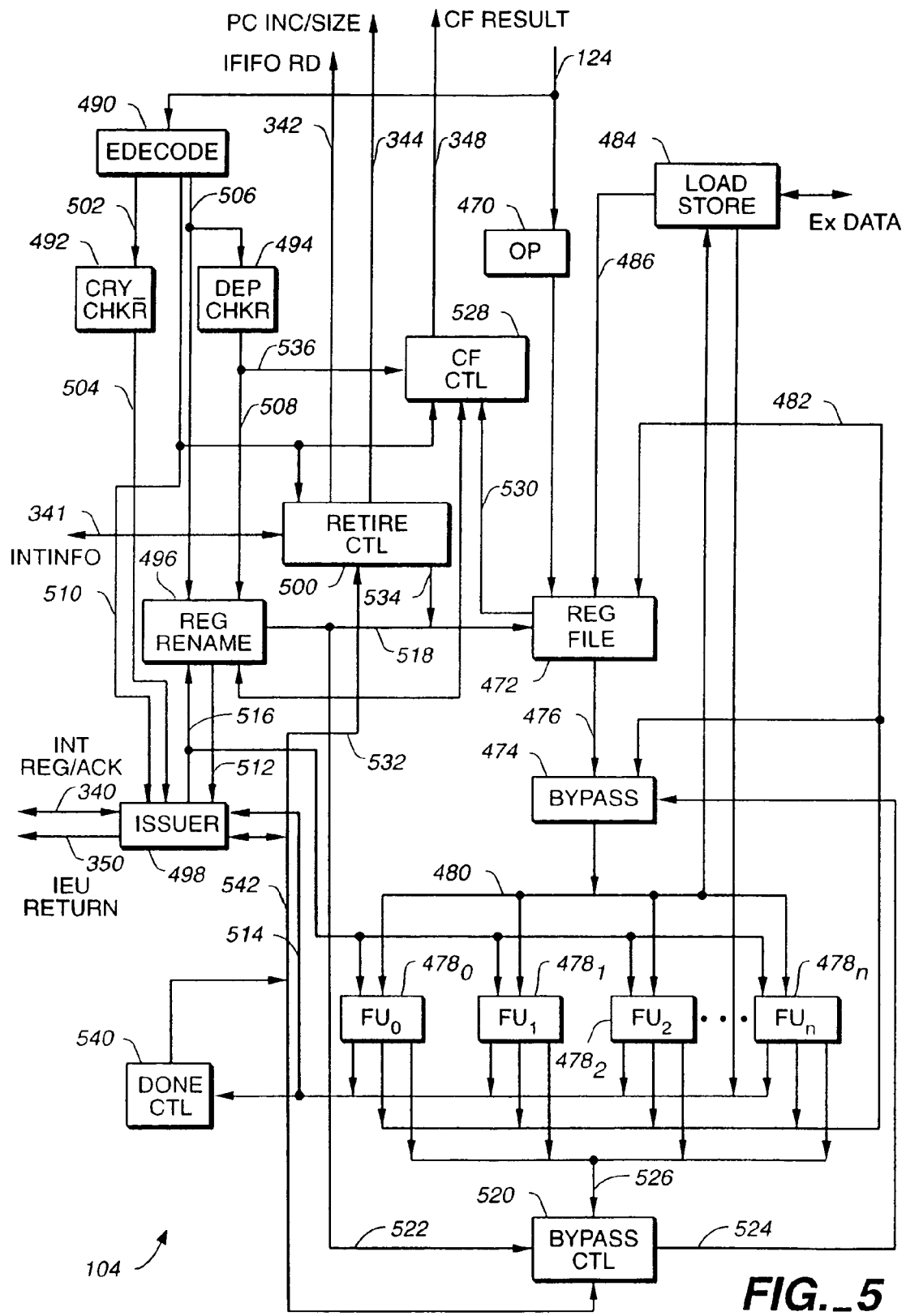
FIG._5

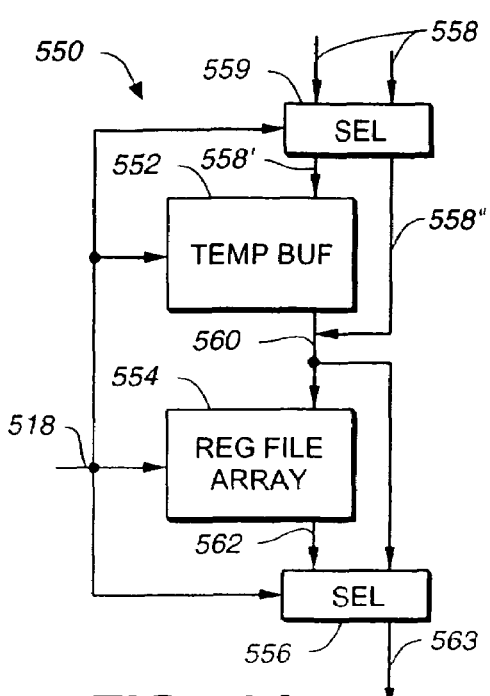
FIG._6A
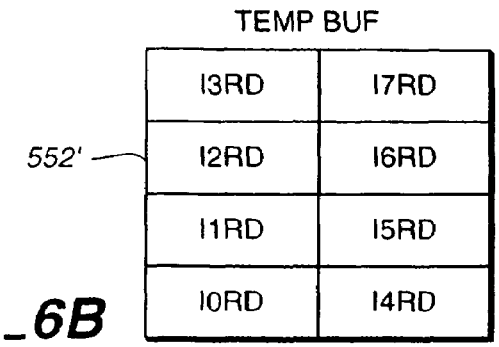
FIG._6B
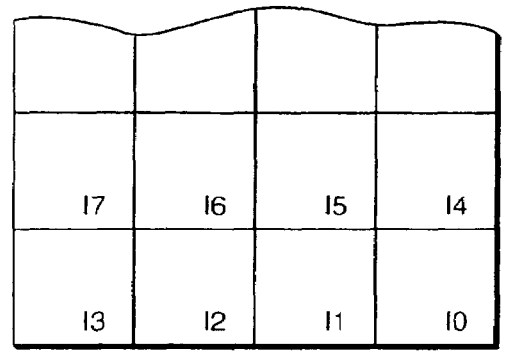
FIG._6C
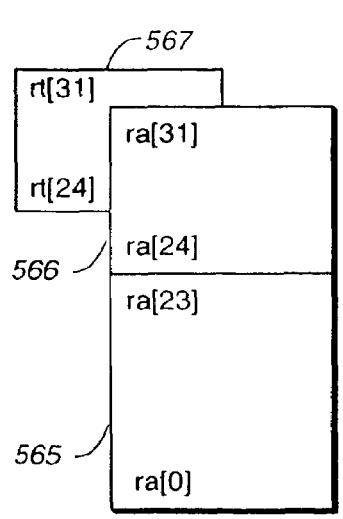
FIG._7A
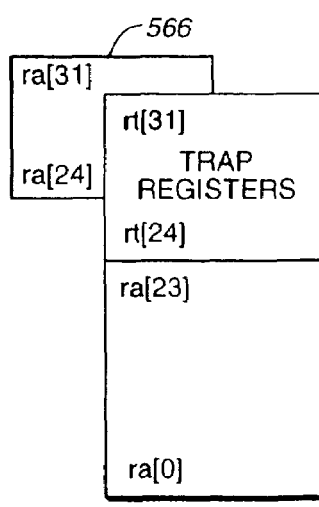
FIG._7B
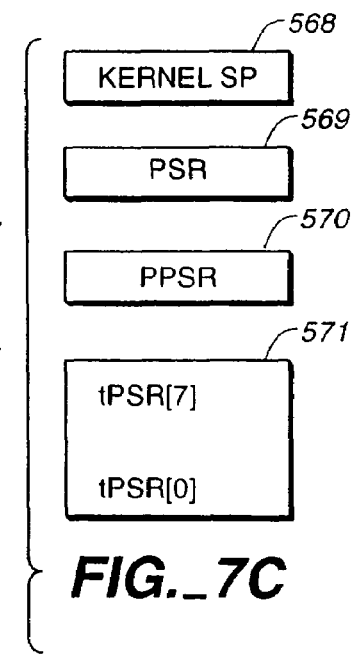
FIG._7C

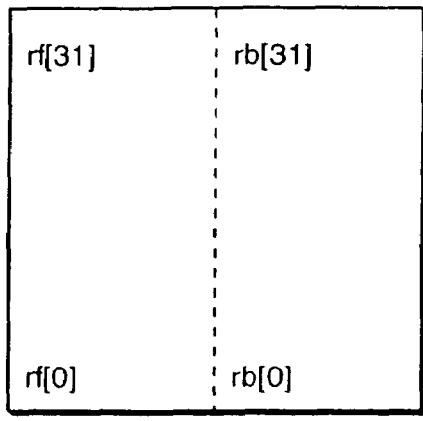
FIG._8
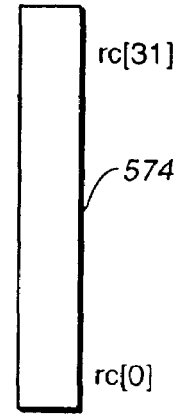
FIG._9
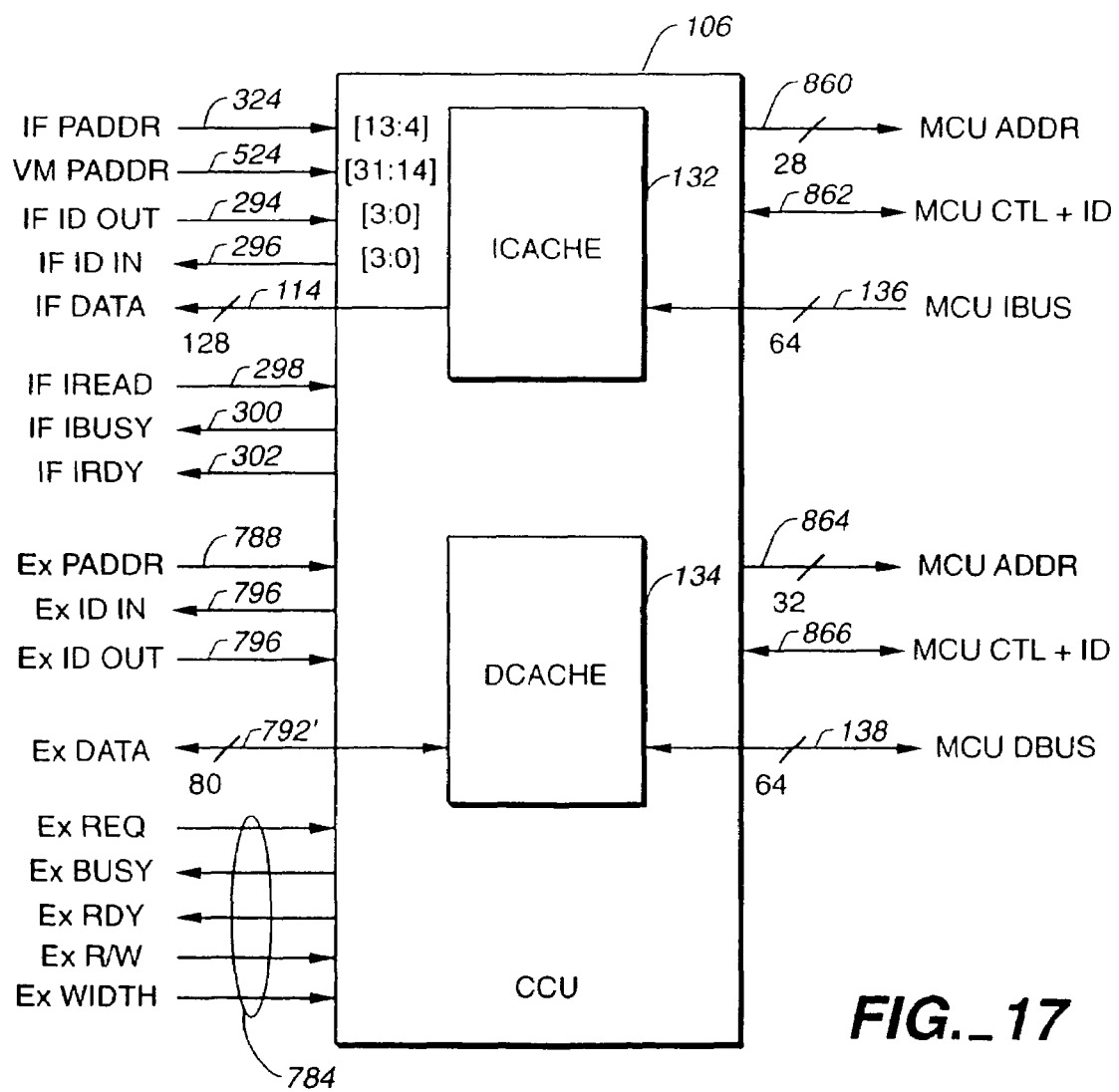
FIG._17

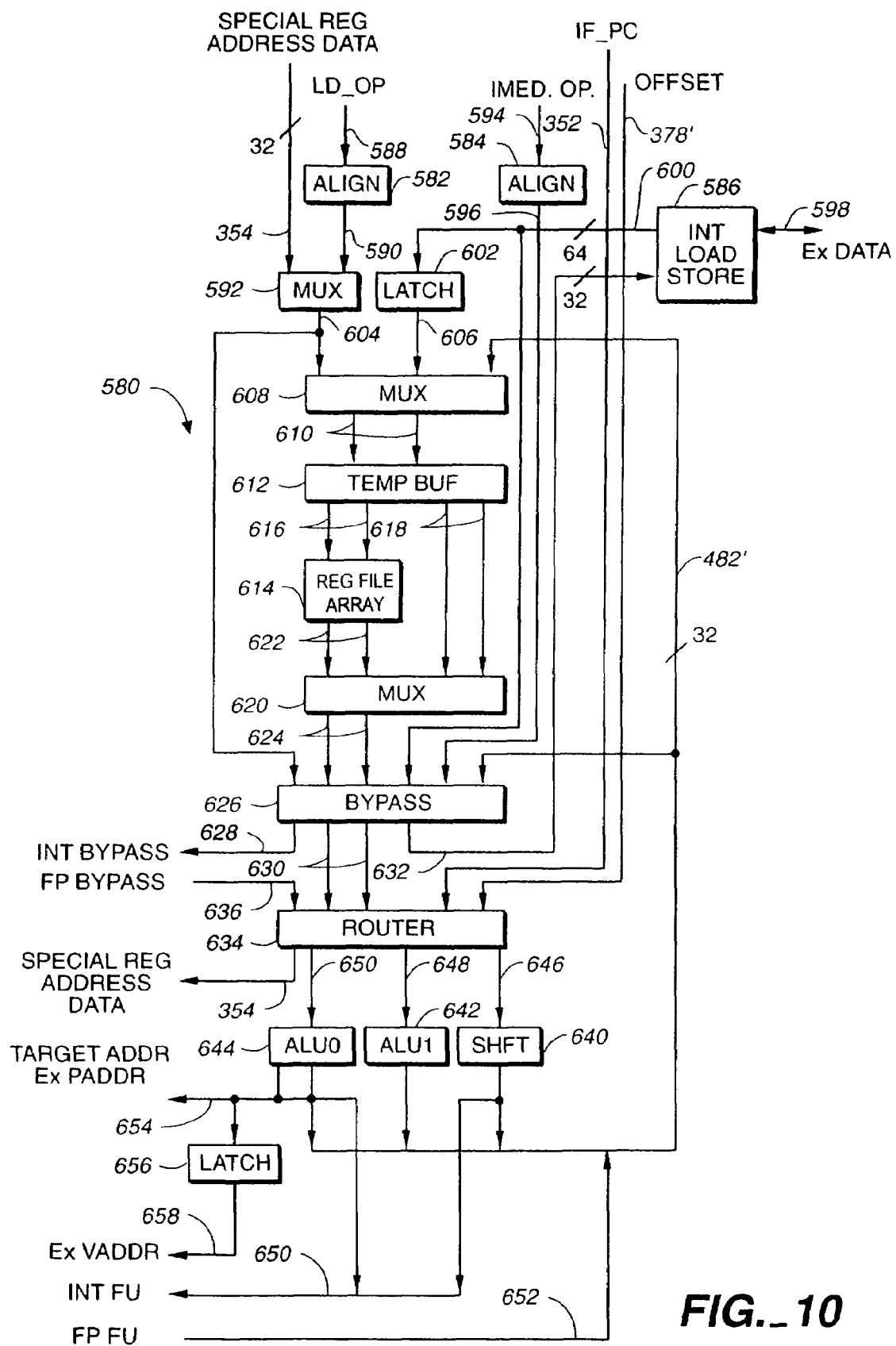
FIG._10

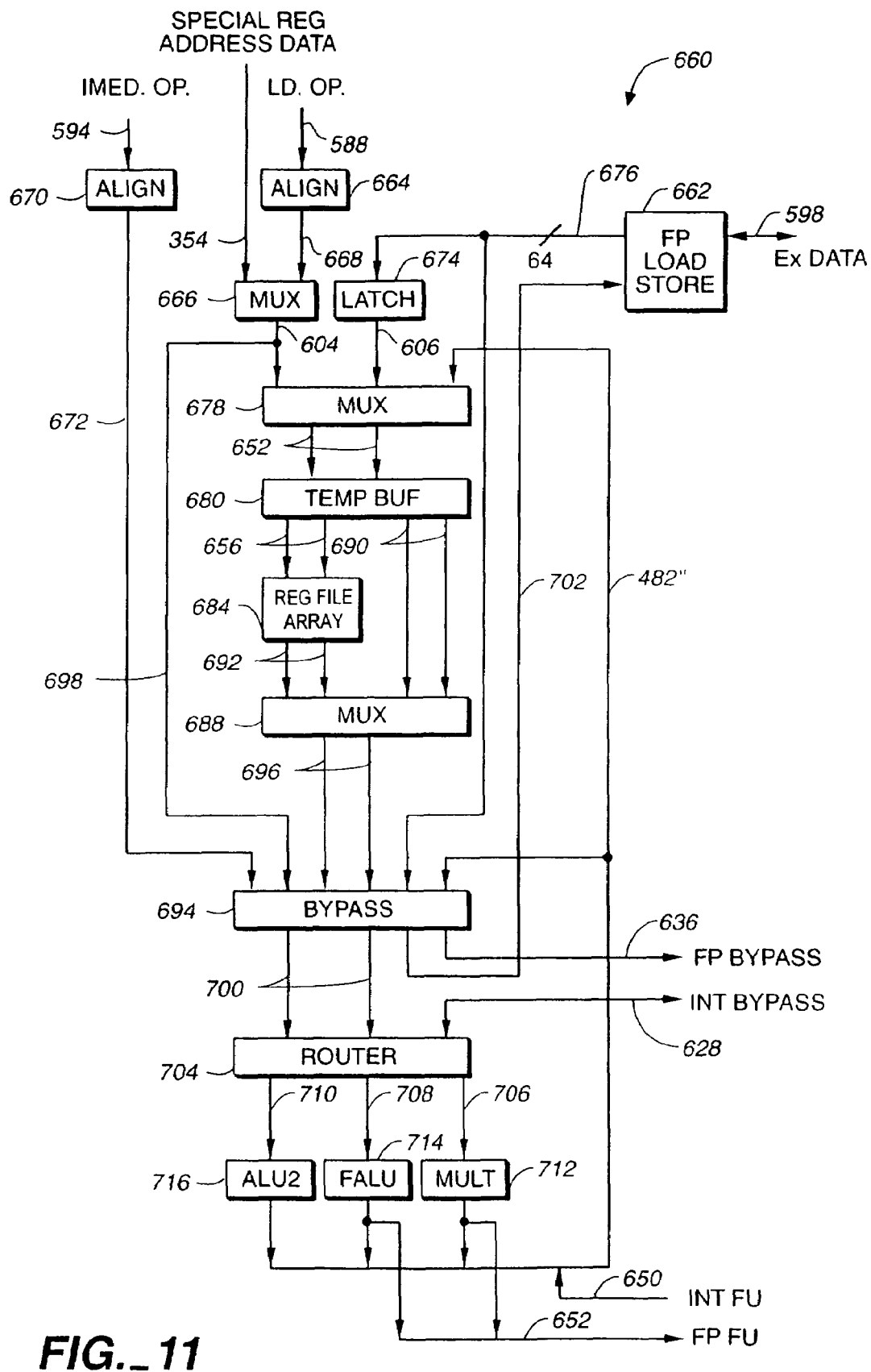
FIG._11

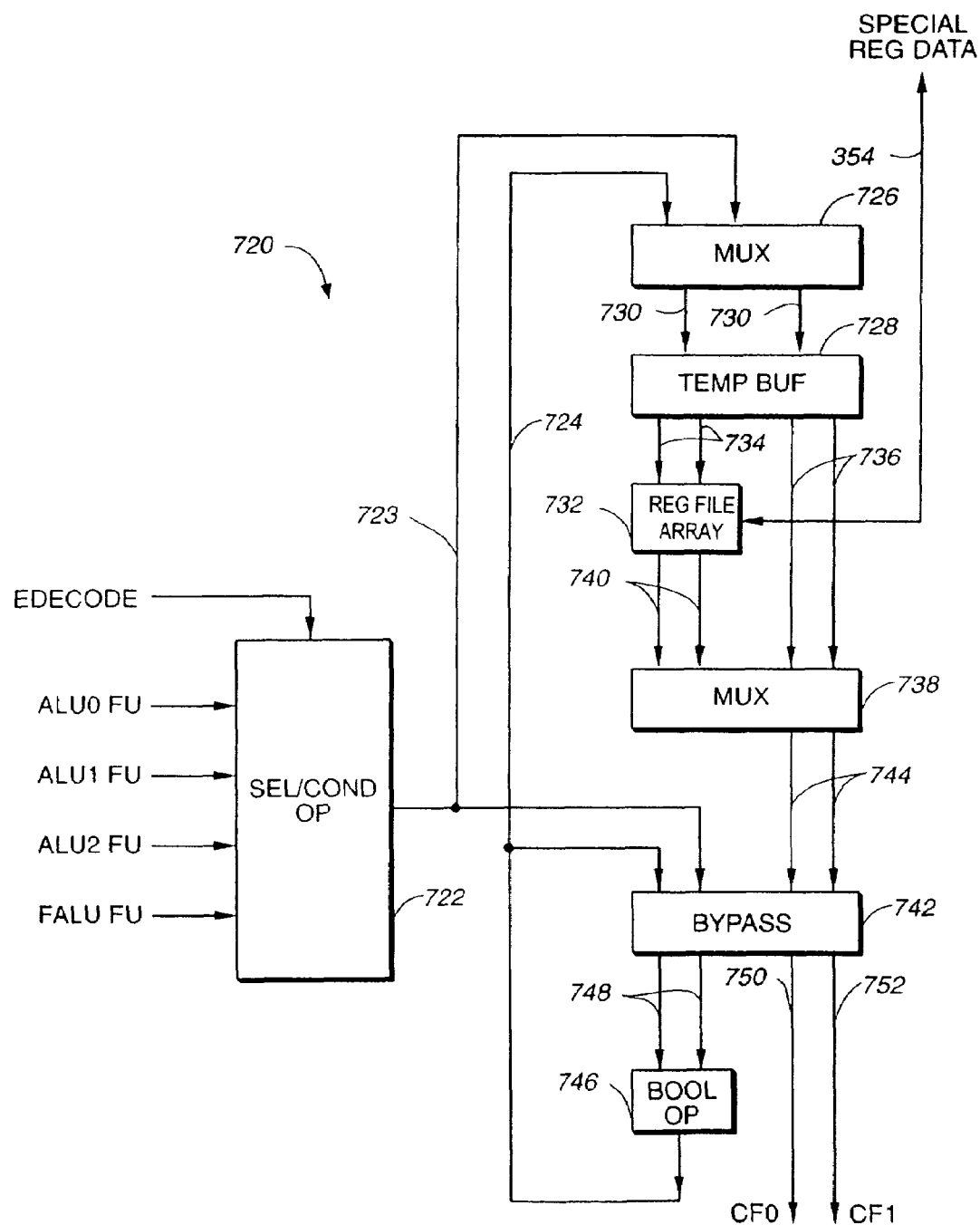
FIG._12

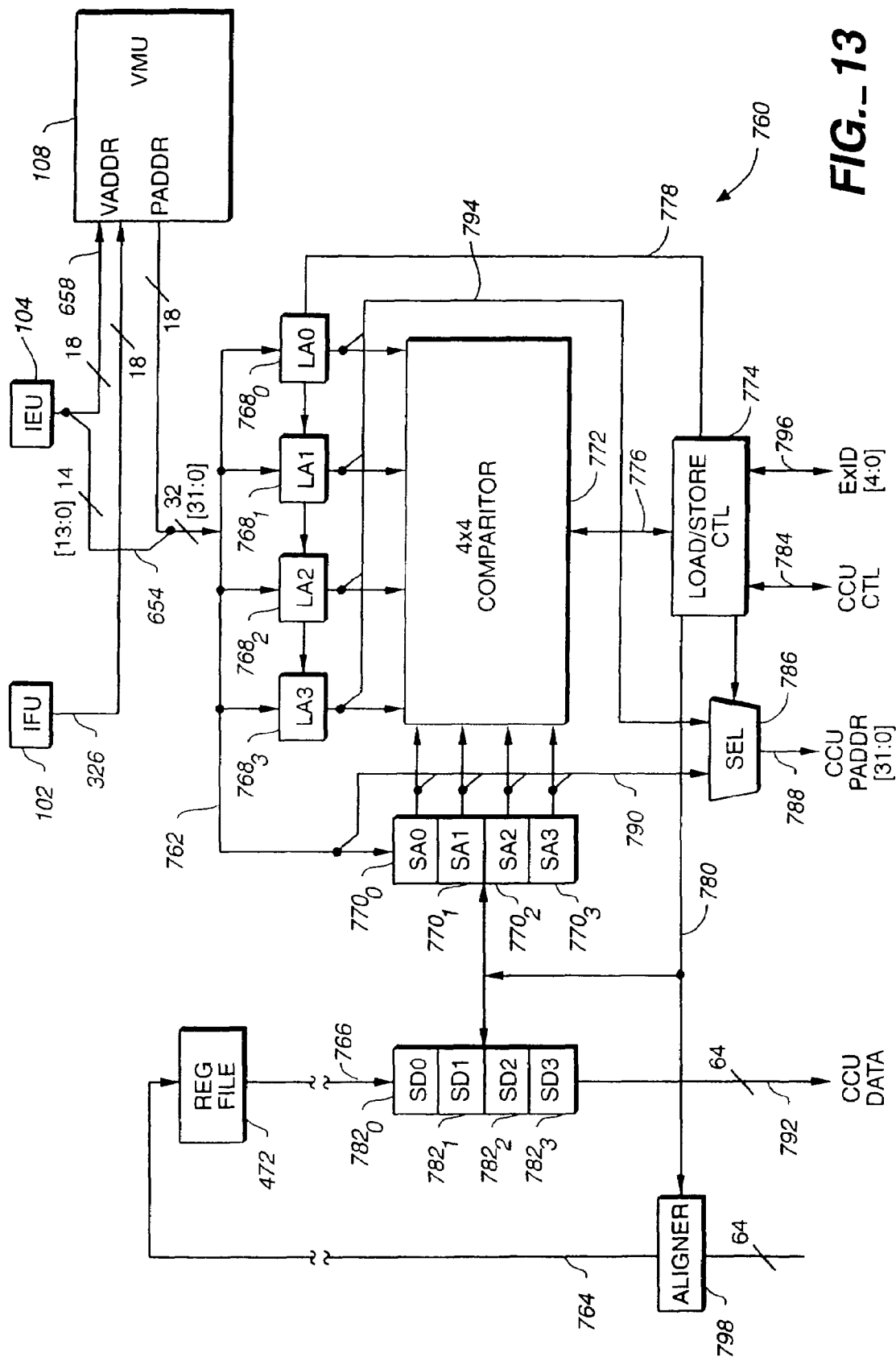
FIG._13

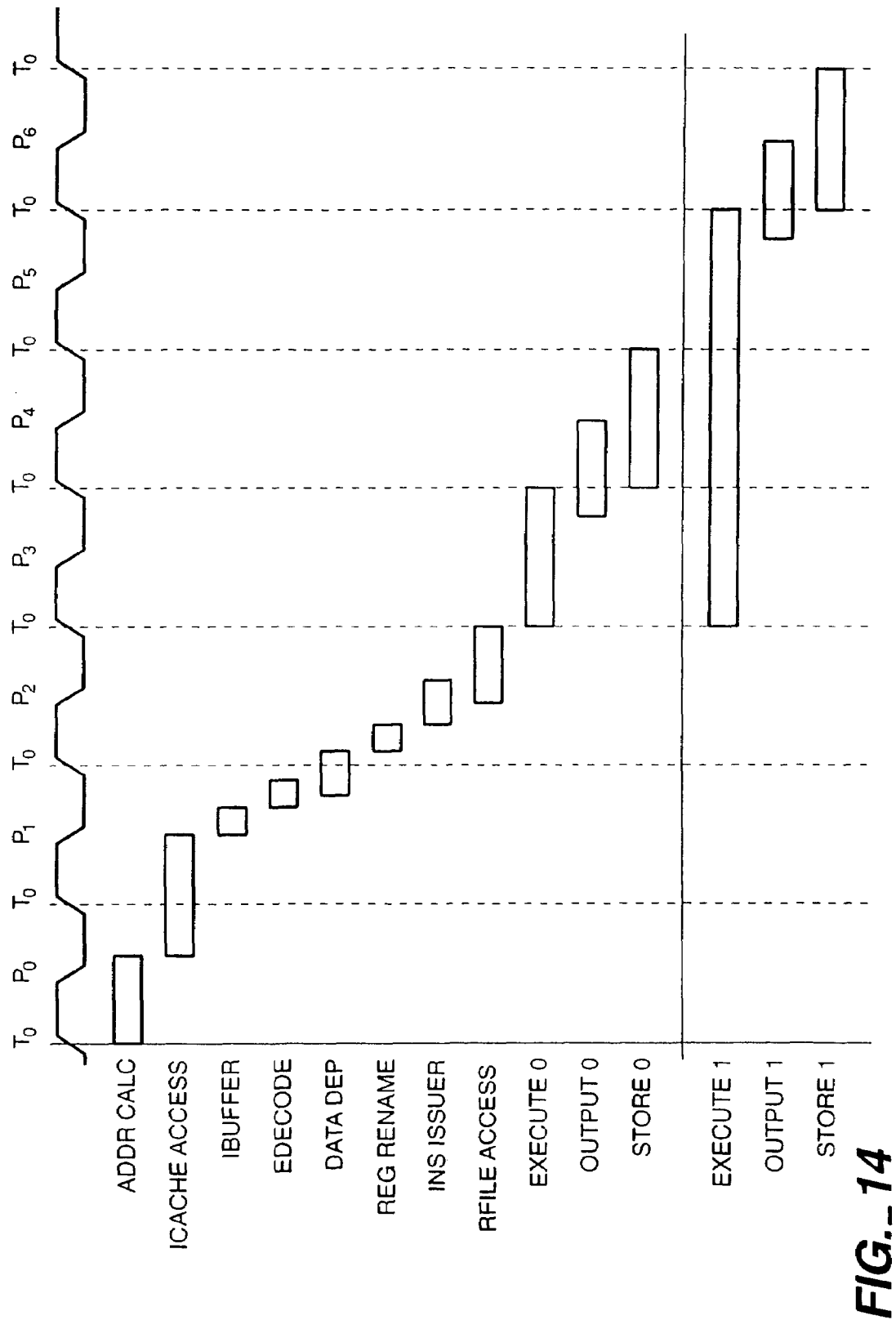
FIG._14

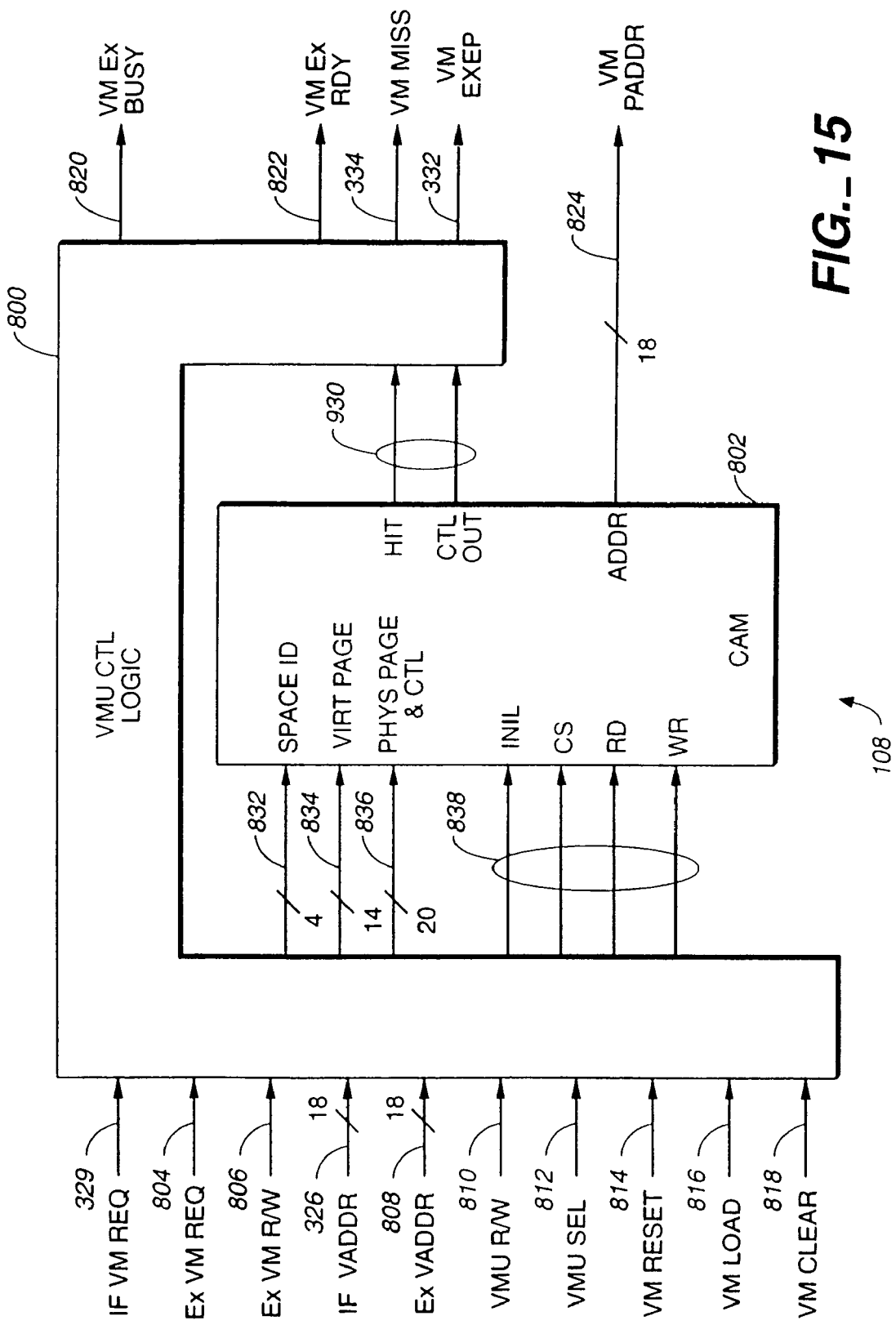
FIG._15

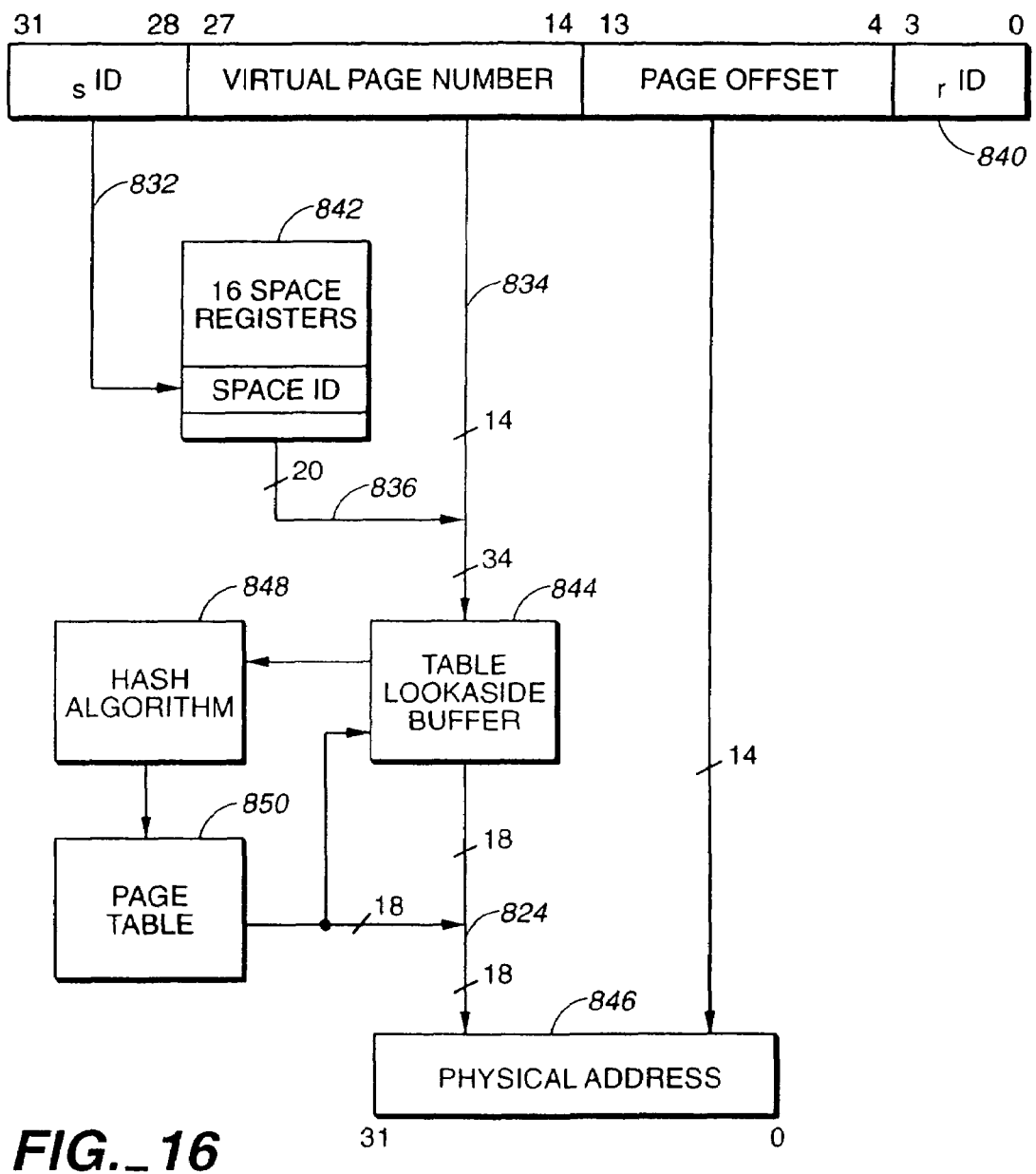
FIG._16

HIGH-PERFORMANCE, SUPERSCALAR-BASED COMPUTER SYSTEM WITH OUT-OF-ORDER INSTRUCTION EXECUTION

CROSS REFERENCE TO RELATED APPLICATIONS

This application is a continuation of application Ser. No. 10/660,671, filed Sep. 12, 2003, now allowed, which is a continuation of application Ser. No. 09/852,293, filed May 10, 2001, now U.S. Pat. No. 6,647,485, which is a continuation of application Ser. No. 09/436,986, filed Nov. 9, 1999, now U.S. Pat. No. 6,256,720, which is a continuation of application Ser. No. 09/338,563, filed Jun. 23, 1999, now U.S. Pat. No. 6,038,654, which is a continuation of application Ser. No. 08/946,078, filed Oct. 7, 1997, now U.S. Pat. No. 6,092,181, which is a continuation of application Ser. No. 08/602,021, filed Feb. 15, 1996, now U.S. Pat. No. 5,689,720, which is a continuation of application Ser. No. 07/817,810, filed Jan. 8, 1992, now U.S. Pat. No. 5,539,911, which is a continuation of application Ser. No. 07/727,006, filed Jul. 8, 1991, now abandoned. Each of the above-referenced applications is incorporated by reference in its entirety herein.

The present application is related to the following applications, all assigned to the Assignee of the present application:

1. High-Performance, Superscalar-Based Computer System with Out-of-Order Instruction Execution and Concurrent Results Distribution, invented by Nguyen et al., application Ser. No. 08/397,016, filed Mar. 1, 1995, now U.S. Pat. No. 5,560,032, which is a continuation of application Ser. No. 07/817,809, filed Jan. 8, 1992, which is a continuation of application Ser. No. 07/727,058, filed Jul. 8, 1991;

2. RISC Microprocessor Architecture with Isolated Architectural Dependencies, invented by Nguyen et al., application Ser. No. 08/292,177, filed Aug. 18, 1994, now abandoned, which is a continuation of application Ser. No. 07/817,807, filed Jan. 8, 1992, which is a continuation of application Ser. No. 07/726,744, filed Jul. 8, 1991;

3. RISC Microprocessor Architecture Implementing Multiple Typed Register Sets, invented by Garg et al., application Ser. No. 07/726,773, filed Jul. 8, 1991, now U.S. Pat. No. 5,493,687;

4. RISC Microprocessor Architecture Implementing Fast Trap and Exception State, invented by Nguyen et al., application Ser. No. 08/345,333, filed Nov. 21, 1994, now U.S. Pat. No. 5,481,685, which is a continuation of application Ser. No. 08/171,968, filed Dec. 23, 1993, which is a continuation of application Ser. No. 07/817,811, filed Jan. 8, 1992, which is a continuation of application Ser. No. 07/726,942, filed Jul. 8, 1991;

5. Page Printer Controller Including a Single Chip Superscalar Microprocessor with Graphics Functional Units, invented by Lentz et al., application Ser. No. 08/267,646, filed Jun. 28, 1994, now U.S. Pat. No. 5,394,515, which is a continuation of application Ser. No. 07/817,813, filed Jan. 8, 1992, which is a continuation of application Ser. No. 07/726,929, filed Jul. 8, 1991; and 6. Microprocessor Architecture with a Switch Network for Data Transfer between Cache, Memory Port, and IOU, invented by Lentz et al., application Ser. No. 07/726,893, filed Jul. 8, 1991, now U.S. Pat. No. 5,440,752.

BACKGROUND OF THE INVENTION

1. Field of the Invention

The present invention is generally related to the design of RISC type microprocessor architectures and, in particular, to RISC microprocessor architectures that are capable of executing multiple instructions concurrently.

2. Background

Recently, the design of microprocessor architectures have matured from the use of Complex Instruction Set Computer (CISC) to simpler Reduced Instruction Set Computer (RISC) Architectures. The CISC architectures are notable for the provision of substantial hardware to implement and support an instruction execution pipeline. The typical conventional pipeline structure includes, in fixed order, instruction fetch, instruction decode, data load, instruction execute and data store stages. A performance advantage is obtained by the concurrent execution of different portions of a set of instructions through the respective stages of the pipeline. The longer the pipeline, the greater the number of execution stages available and the greater number of instructions that can be concurrently executed.

Two general problems limit the effectiveness of CISC pipeline architectures. The first problem is that conditional branch instructions may not be adequately evaluated until a prior condition code setting instruction has substantially completed execution through the pipeline.

Thus, the subsequent execution of the conditional branch instruction is delayed, or stalled, resulting in several pipeline stages remaining inactive for multiple processor cycles. Typically, the condition codes are written to a condition code register, also referred to as a processor status register (PSR), only at completion of processing an instruction through the execution stage. Thus, the pipeline must be stalled with the conditional branch instruction in the decode stage for multiple processor cycles pending determination of the branch condition code. The stalling of the pipeline results in a substantial loss of through-put. Further, the average through-put of the computer will be substantially dependent on the mere frequency of conditional branch instructions occurring closely after the condition code setting instructions in the program instruction stream.

A second problem arises from the fact that instructions closely occurring in the program instruction stream will tend to reference the same registers of the processor register file. Data registers are often used as the destination or source of data in the store and load stages of successive instructions. In general, an instruction that stores data to the register file must complete processing through at least the execution stage before the load stage processing of a subsequent instruction can be allowed to access the register file. Since the execution of many instructions require multiple processor cycles in the single execution stage to produce store data, the entire pipeline is typically stalled for the duration of an execution stage operation. Consequently, the execution through-put of the computer is substantially dependent on the internal order of the instruction stream being executed.

A third problem arises not so much from the execution of the instructions themselves, but the maintenance of the hardware supported instruction execution environment, or state-of-the-machine, of the microprocessor itself. Contemporary CISC microprocessor hardware sub-systems can detect the occurrence of trap conditions during the execution of instructions. Traps include hardware interrupts, software traps and exceptions. Each trap requires execution of a corresponding trap handling routines by the processor. On detection of the trap, the execution pipeline must be cleared to allow the immediate execution of the trap handling routine. Simultaneously, the state-of-the-machine must be established as of the precise point of occurrence of the trap; the precise point occurring at the conclusion of the first currently executing instruction for interrupts and traps and immediately prior to an instruction that fails due to a exception. Subsequently, the state-of-the-machine and, again depending on the nature of the trap the executing instruction itself must be restored at the completion of the handling routine. Consequently, with each trap or related event, a latency is introduced by the clearing of the pipeline at both the inception and conclusion of the handling routine and storage and return of the precise state-of-the-machine with corresponding reduction in the through-put of the processor.

These problems have been variously addressed in an effort to improve the potential through-put of CISC architectures. Assumptions can be made about the proper execution of conditional branch instructions, thereby allowing pipeline execution to tentatively proceed in advance of the final determination of the branch condition code. Assumptions can also be made as to whether a register will be modified, thereby allowing subsequent instructions to also be tentatively executed. Finally, substantial additional hardware can be provided to minimize the occurrence of exceptions that require execution of handling routines and thereby reduce the frequency of exceptions that interrupt the processing of the program instruction stream.

These solutions, while obviously introducing substantial additional hardware complexities, also introduce distinctive problems of their own. The continued execution of instructions in advance of a final resolution of either a branch condition or register file store access require that the state-of-the-machine be restorable to any of multiple points in the program instruction stream including the location of the conditional branch, each modification of a register file, and for any occurrence of an exception; potentially to a point prior to the fully completed execution of the last several instructions. Consequently, even more supporting hardware is required and, further, must be particularly designed not to significantly increase the cycle time of any pipeline stage.

RISC architectures have sought to avoid many of the foregoing problems by drastically simplifying the hardware implementation of the microprocessor architecture. In the extreme, each RISC instruction executes in only three pipelined program cycles including a load cycle, an execution cycle, and a store cycle. Through the use of load and store data bypassing, conventional RISC architectures can essentially execute a single instruction per cycle in the three stage pipeline.

Whenever possible, hardware support in RISC architectures is minimized in favor of software routines for performing the required functions. Consequently, the RISC architecture holds out the hope of substantial flexibility and high speed through the use of a simple load/store instruction set executed by an optimally matched pipeline. And in practice, RISC architectures have been found to benefit from the balance between a short, high-performance pipeline and the need to execute substantially greater numbers of instructions to implement all required functions.

The design of the RISC architecture generally avoids or minimizes the problems encountered by CISC architectures with regard to branches, register references and exceptions. The pipeline involved in a RISC architecture is short and optimized for speed. The shortness of the pipeline minimizes the consequences of a pipeline stall or clear as well as minimizing the problems in restoring the state-of-the-machine to an earlier execution point.

However, significant through-put performance gains over the generally realized present levels cannot be readily achieved by the conventional RISC architecture. Consequently, alternate, so-called superscalar architectures, have been variously proposed. These architectures generally attempt to execute multiple instructions concurrently and thereby proportionately increase the through-put of the processor. Unfortunately, such architectures are, again, subject to similar, if not the same conditional branch, register referencing, and exception handling problems as encountered by CISC architectures.

BRIEF SUMMARY OF THE INVENTION

Thus, a general purpose of the present invention is to provide a high-performance, RISC based, superscalar processor architecture capable of substantial performance gains over conventional CISC and RISC architectures and that is further suited for microprocessor implementation.

This purpose is obtained in the present invention through the provision of a microprocessor architecture capable of the concurrent execution of instructions obtained from an instruction store. The microprocessor architecture includes an instruction prefetch unit for fetching instruction sets from the instruction store. Each instruction set includes a plurality of fixed length instructions. An instruction FIFO is provided for buffering instruction sets in a plurality of instruction set buffers including a first buffer and a second buffer. An instruction execution unit, including a register file and a plurality of functional units, is provided with an instruction control unit capable of examining the instruction sets within the first and second buffers and issuing any of these instructions for execution by available functional units. Multiple data paths between the functional units and the register file allow multiple independent accesses to the register file as necessary for the concurrent execution of the respective instructions.

The register file includes an additional set of data registers used for the temporary storage of register data. These temporary data registers are utilized by the instruction execution control unit to receive data processed by the functional units in the out-of-order execution of instructions. The data stored in the temporary data registers is selectively held, then cleared or retired to the register file when, and if, the precise state-of-the-machine advances to the instruction's location in the instruction stream; where all prior in-order instructions have been completely executed and retired.

Finally, the prefetching of instruction sets from the instruction store is facilitated by multiple prefetch paths allowing for prefetching of the main program instruction stream, a target conditional branch instruction stream and a procedural instruction stream. The target conditional branch prefetch path enables both possible instruction streams for a conditional branch instruction, main and target, to be simultaneously prefetched. The procedural instruction prefetch path allows a supplementary instruction stream, effective for allowing execution of an extended procedures implementing a singular instruction found in the main or target instruction streams; the procedural prefetch path enables these extended procedures to be fetched and executed without clearing at least the main prefetch buffers.

Consequently, an advantage of the present invention is that it provides an architecture that realizes extremely high performance through-put utilizing a fundamentally RISC type core architecture.

Another advantage of the present invention is that it provides for the execution of multiple instructions per cycle.

A further advantage of the present invention is that it provides for the dynamic selection and utilization of functional units necessary to optimally execute multiple instructions concurrently.

Still another advantage of the present invention is that it provides for a register file unit that integrally incorporates a mechanism for supporting a precise state-of-the-machine return capability.

Yet another advantage of the present invention is that it incorporates multiple register files within the register file unit that are generalized, typed and capable of multiple register file functions including operation as multiple independent and parallel integer register files, operation of a register file as both a floating point and integer file and operation of a dedicated boolean register file.

A still further advantage of the present invention is that load and store operations and the handling of exceptions and interrupts can be performed in a precise manner through the use of a precise state-of-the-machine return capability including efficient instruction cancellation mechanisms and a load/store order synchronizer.

A yet still further advantage of the present invention is the provision for dedicated register file unit support of trap states so as to minimize latency and enhance processing throughput.

Yet still another advantage of the present invention is the provision for main and target branch instruction prefetch queues whereby even incorrect target branch stream execution ahead minimally impacts the overall processing throughput obtainable by the present invention. Further, the procedural instruction prefetch queue allows an efficient manner of intervening in the execution of the main or target branch instruction streams to allow the effective implementation of new instructions through the execution of procedural routines and, significantly, the externally provided revision of procedural routines implementing built-in procedural instructions.

BRIEF DESCRIPTION OF THE DRAWINGS/FIGURES

These and other advantages and features of the present invention will become better understood upon consideration of the following detailed description of the invention when considered in connection of the accompanying drawings, in which like reference numerals designate like parts throughout the figures thereof, and wherein:

FIG. 1 is a simplified block diagram of the preferred microprocessor architecture implementing the present invention;

FIG. 2 is a detailed block diagram of the instruction fetch unit constructed in accordance with the present invention;

FIG. 3 is a block diagram of the program counter logic unit constructed in accordance with the present invention;

FIG. 4 is a further detailed block diagram of the program counter data and control path logic;

FIG. 5 is a simplified block diagram of the instruction execution unit of the present invention;

FIG. 6A is a simplified block diagram of the register file architecture utilized in a preferred embodiment of the present invention;

FIG. 6B is a graphic illustration of the storage register format of the temporary buffer register file and utilized in a preferred embodiment of the present invention;

FIG. 6C is a graphic illustration of the primary and secondary instruction sets as present in the last two stages of the instruction FIFO unit of the present invention;

FIGS. 7A, 7B and 7C provide a graphic illustration of the reconfigurable states of the primary integer register set as provided in accordance with a preferred embodiment of the present invention;

FIG. 8 is a graphic illustration of a reconfigurable floating point and secondary integer register set as provided in accordance with the preferred embodiment of the present invention;

FIG. 9 is a graphic illustration of a tertiary boolean register set as provided in a preferred embodiment of the present invention;

FIG. 10 is a detailed block diagram of the primary integer processing data path portion of the instruction execution unit constructed in accordance with the preferred embodiment of the present invention;

FIG. 11 is a detailed block diagram of the primary floating point data path portion of the instruction execution unit constructed in accordance with a preferred embodiment of the present invention;

FIG. 12 is a detailed block diagram of the boolean operation data path portion of the instruction execution unit as constructed in accordance with the preferred embodiment of the present invention;

FIG. 13 is a detailed block diagram of a load/store unit constructed in accordance with the preferred embodiment of the present invention;

FIG. 14 is a timing diagram illustrating the preferred sequence of operation of a preferred embodiment of the present invention in executing multiple instructions in accordance with the present invention;

FIG. 15 is a simplified block diagram of the virtual memory control unit as constructed in accordance with the preferred embodiment of the present invention;

FIG. 16 is a graphic representation of the virtual memory control algorithm as utilized in a preferred embodiment of the present invention; and FIG. 17 is a simplified block diagram of the cache control unit as utilized in a preferred embodiment of the present invention.

DETAILED DESCRIPTION OF THE INVENTION

Table of Contents

I. Microprocessor Architecture Overview
II. Instruction Fetch Unit
   A. IFU Data Path
   B. IFU Control Path
   C. IFU/IEU Control Interface
   D. PC Logic Unit Detail
      1. PF and ExPC Control/Data Unit Detail
      2. PC Control Algorithm Detail
   E. Interrupt and Exception Handling
      1. Overview
      2. Asynchronous Interrupts
      3. Synchronous Exceptions
      4. Handler Dispatch and Return
      5. Nesting
      6. List of Traps
III. Instruction Execution Unit
   A. IEU Data Path Detail
      1. Register File Detail
      2. Integer Data Path Detail
      3. Floating Point Data Path Detail
      4. Boolean Register Data Path Detail
   B. Load/Store Control Unit
   C. IEU Control Path Detail 1. EDecode Unit Detail
2. Carry Checker Unit Detail
3. Data Dependency Checker Unit Detail
4. Register Rename Unit Detail
5. Instruction Issuer Unit Detail
6. Done Control Unit Detail
7. Retirement Control Unit Detail
8. Control Flow Control Unit Detail
9. Bypass Control Unit Detail
IV. Virtual Memory Control Unit
V. Cache Control Unit
VI. Summary/Conclusion I. Microprocessor Architectural Overview The architecture 100 of the present invention is generally shown in FIG. 1. An Instruction Fetch Unit (IFU) 102 and an Instruction Execution Unit (IEU) 104 are the principal operative elements of the architecture 100. A Virtual Memory Unit (VMU) 108, Cache Control Unit (CCU) 106, and Memory Control Unit (MCU) 110 are provided to directly support the function of the IFU 102 and IEU 104. A Memory Array Unit (MAU) 112 is also provided as a generally essential element for the operation of the architecture 100, though the MAU 112 does not directly exist as an integral component of the architecture 100. That is, in the preferred embodiments of the present invention, the IFU 102, IEU 104, VMU 108, CCU 106, and MCU 110 are fabricated on a single silicon die utilizing a conventional 0.8 micron design rule low-power CMOS process and comprising some 1,200,000 transistors. The standard processor or system clock speed of the architecture 100 is 40 MHz. However, in accordance with a preferred embodiment of the present invention, the internal processor clock speed is 160 MHz.

The IFU 102 is primarily responsible for the fetching of instructions, the buffering of instructions pending execution by the IEU 104, and, generally, the calculation of the next virtual address to be used for the fetching of next instructions.

In the preferred embodiments of the present invention, instructions are each fixed at a length of 32 bits. Instruction sets, or "buckets" of four instructions, are fetched by the IFU 102 simultaneously from an instruction cache 132 within the CCU 106 via a 128 bit wide instruction bus 114. The transfer of instruction sets is coordinated between the IFU 102 and CCU 106 by control signals provided via a control bus 116. The virtual address of a instruction set to be fetched is provided by the IFU 102 via an IFU combined arbitration, control and address bus 118 onto a shared arbitration, control and address bus 120 further coupled between the EEU 104 and VMU 108. Arbitration for access to the VMU 108 arises from the fact that both the IFU 102 and IEU 104 utilize the VMU 108 as a common, shared resource. In the preferred embodiment of the architecture 100, the low order bits defining an address within a physical page of the virtual address are transferred directly by the IFU 102 to the Cache Control Unit 106 via the control lines 116. The virtualizing, high order bits of the virtual address supplied by the IFU 102 are provided by the address portion of the buses 118, 120 to the VMU 108 for translation into a corresponding physical page address. For the IFU 102, this physical page address is transferred directly from the VMU 108 to the Cache Control Unit 106 via the address control lines 122 one-half internal processor cycle after the translation request is placed with the VMU 108.

The instruction stream fetched by the IFU 102 is, in turn, provided via an instruction stream bus 124 to the IEU 104. Control signals are exchanged between the IFU 102 and the IEU 104 via controls lines 126. In addition, certain instruction fetch addresses, typically those requiring access to the register file present within the IEU 104, are provided back to the IFU via a target address return bus within the control lines 126.

The IEU 104 stores and retrieves data with respect to a data cache 134 provided within the CCU 106 via an 80-bit wide bi-directional data bus 130. The entire physical address for IEU data accesses is provided via an address portion of the control bus 128 to the CCU 106. The control bus 128 also provides for the exchange of control signals between the IEU 104 and CCU 106 for managing data transfers. The IEU 104 utilizes the VMU 108 as a resource for converting virtual data address into physical data addresses suitable for submission to the CCU 106. The virtualizing portion of the data address is provided via the arbitration, control and address bus 120 to the VMU 108. Unlike operation with respect to the IFU 102, the VMU 108 returns the corresponding physical address via the bus 120 to the IEU 104. In the preferred embodiments of the architecture 100, the IEU 104 requires the physical address for use in ensuring that load/store operations occur in proper program stream order.

The CCU 106 performs the generally conventional high-level function of determining whether physical address defined requests for data can be satisfied from the instruction and data caches 132, 134, as appropriate. Where the access request can be properly fulfilled by access to the instruction or data caches 132, 134, the CCU 106 coordinates and performs the data transfer via the data buses 114, 128.

Where a data access request cannot be satisfied from the instruction or data caches 132, 134, the CCU 106 provides the corresponding physical address to the MCU 110 along with sufficient control information to identify whether a read or write access of the MAU 112 is desired, the source or destination cache 132, 134 of the CCU 106 for each request, and additional identifying information to allow the request operation to be correlated with the ultimate data request as issued by the IFU 102 or IEU 104.

The MCU 110 preferably includes a port switch unit 142 that is coupled by a unidirectional data bus 136 with the instruction cache 132 of the CCU 106 and a bi-directional data bus 138 to the data cache 134. The port switch 142 is, in essence, a large multiplexer allowing a physical address obtained from the control bus 140 to be routed to any one of a number of ports $P_0$-$P_N$ $146_{0-n}$ and the bi-directional transfer of data from the ports to the data buses 136, 138. Each memory access request processed by the MCU 110 is associated with one of the ports $146_{0-n}$ for purposes of arbitrating for access to the main system memory bus 162 as required for an access of the MAU 112. Once a data transfer connection has been established, the MCU provides control information via the control bus 140 to the CCU 106 to initiate the transfer of data between either the instruction or data cache 132, 134 and MAU 112 via the port switch 142 and the corresponding one of the ports $146_{0-n}$. In accordance with the preferred embodiments of the architecture 100 the MCU 110 does not actually store or latch data in transit between the CCU 106 and MAU 112. This is done to minimize latency in the transfer and to obviate the need for tracking or managing data that may be uniquely present in the MCU 110.

II. Instruction Fetch Unit

The primary elements of the Instruction Fetch Unit 102 are shown in FIG. 2. The operation and interrelationship of these elements can best be understood by considering their participation in the IFU data and control paths.

A. IFU Data Path

The IFU data path begins with the instruction bus 114 that receives instruction sets for temporary storage in a prefetch buffer 260. An instruction set from the prefetch buffer 260 is passed through an IDecode unit 262 and then to an IFIFO unit 264. Instruction sets stored in the last two stages of the instruction FIFO 264 are continuously available, via the data buses 278, 280, to the IEU 104.

The prefetch buffer unit 260 receives a single instruction set at a time from the instruction bus 114. The full 128 bit wide instruction set is generally written in parallel to one of four 128 bit wide prefetch buffer locations in a Main Buffer (MBUF) 188 portion of the prefetch buffer 260. Up to four additional instruction sets may be similarly written into two 128 bit wide Target Buffer (TBUF) 190 prefetch buffer locations or to two 128 bit wide Procedural Buffer (EBUF) 192 prefetch buffer locations. In the preferred architecture 100, an instruction set in any one of the prefetch buffer locations within the MBUF 188, TBUF 190 or EBUF 192 may be transferred to the prefetch buffer output bus 196. In addition, a direct fall through instruction set bus 194 is provided to connect the instruction bus 114 directly with the prefetch buffer output bus 196, thereby bypassing the MBUF, TBUF and EBUF 188, 190, 192.

In the preferred architecture 100, the MBUF 188 is utilized to buffer instruction sets in the nominal or main instruction stream. The TBUF 190 is utilized to buffer instruction sets fetched from a tentative target branch instruction stream. Consequently, the prefetch buffer unit 260 allows both possible instruction streams following a conditional branch instruction to be prefetched. This facility obviates the latency for further accesses to at least the CCU 106, if not the substantially greater latency of a MAU 112, for obtaining the correct next instruction set for execution following a conditional branch instruction regardless of the particular instruction stream eventually selected upon resolution of the conditional branch instruction. In the preferred architecture 100 invention, the provision of the MBUF 188 and TBUF 190 allow the instruction fetch unit 102 to prefetch both potential instruction streams and, as will be discussed below in relationship to the instruction execution unit 104, to further allow execution of the presumed correct instruction stream. Where, upon resolution of the conditional branch instruction, the correct instruction stream has been prefetched into the MBUF 188, any instruction sets in the TBUF 190 may be simply invalidated. Alternately, where instruction sets of the correct instruction stream are present in the TBUF 190, the instruction prefetch buffer unit 260 provides for the direct, lateral transfer of those instruction sets from the TBUF 190 to respective buffer locations in the MBUF 188. The prior MBUF 188 stored instruction sets are effectively invalidated by being overwritten by the TBUF 190 transferred instruction sets. Where there is no TBUF instruction set transferred to an MBUF location, that location is simply marked invalid.

Similarly, the EBUF 192 is provided as another, alternate prefetch path through the prefetch buffer 260. The EBUF 192 is preferably utilized in the prefetching of an alternate instruction stream that is used to implement an operation specified by a single instruction, a "procedural" instruction, encountered in the MBUF 188 instruction stream. In this manner, complex or extended instructions can be implemented through software routines, or procedures, and processed through the prefetch buffer unit 260 without disturbing the instruction streams already prefetched into the MBUF 188. Although the present invention generally permits handling of procedural instructions that are first encountered in the TBUF 190, prefetching of the procedural instruction stream is held until all prior pending conditional branch instructions are resolved. This allows conditional branch instructions occurring in the procedural instruction stream to be consistently handled through the use of the TBUF 190. Thus, where a branch is taken in the procedural stream, the target instruction sets will have been prefetched into the TBUF 190 and can be simply laterally transferred to the EBUF 192.

Finally, each of the MBUF 188, TBUF 190 and EBUF 192 are coupled to the prefetch buffer output bus 196 so as to provide any instruction set stored by the prefetch unit onto the output bus 196. In addition, a flow through bus 194 is provided to directly transfer an instruction set from the instruction bus 114 directly to the output bus 196.

In the preferred architecture 100, the prefetch buffers within the MBUF 188, TBUF 190, EBUF 192 do not directly form a FIFO structure. Instead, the provision of an any buffer location to output bus 196 connectivity allows substantial freedom in the prefetch ordering of instruction sets retrieved from the instruction cache 132. That is, the instruction fetch unit 102 generally determines and requests instruction sets in the appropriate instruction stream order of instructions. However, the order in which instruction sets are returned to the IFU 102 is allowed to occur out-of-order as appropriate to match the circumstances where some requested instruction sets are available and accessible from the CCU 106 alone and others require an access of the MAU 112.

Although instruction sets may not be returned in order to the prefetch buffer unit 260, the sequence of instruction sets output on the output bus 196 must generally conform to the order of instruction set requests issued by the IFU 102; the in-order instruction stream sequence subject to, for example, tentative execution of a target branch stream.

The IDecode unit 262 receives the instruction sets, generally one per cycle, IFIFO unit 264 space permitting, from the prefetch buffer output bus 196. Each set of four instructions that make up a single instruction set is decoded in parallel by the IDecode unit 262. While relevant control flow information is extracted via lines 318 for the benefit of the control path portion of the IFU 102, the contents of the instruction set is not altered by the IDecode unit 262.

Instruction sets from the IDecode Unit 162 are provided onto a 128 bit wide input bus 198 of the IFIFO unit 264. Internally, the IFIFO unit 264 consists of a sequence of master/slave registers 200, 204, 208, 212, 216, 220, 224. Each register is coupled to its successor to allow the contents of the master registers 200, 208, 216 to be transferred during a first half internal processor cycle of FIFO operation to the slave registers 204, 212, 220 and then to the next successive master register 208, 216, 224 during the succeeding half-cycle of operation. The input bus 198 is connected to the input of each of the master registers 200, 208, 216, 224 to allow loading of an instruction set from the IDecode unit 262 directly in to a master register during the second half-cycle of FIFO operation. However, loading of a master register from the input bus 198 need not occur simultaneously with a FIFO shift of data within the IFIFO unit 264. Consequently, the IFIFO unit 264 can be continuously filled from the input bus 198 regardless of the current depth of instruction sets stored within the instruction FIFO unit 264 and, further, independent of the FIFO shifting of data through the IFIFO unit 264.

Each of the master/slave registers 200, 204, 208, 212, 216, 220, 224, in addition to providing for the full parallel storage of a 128 bit wide instruction set, also provides for the storage of several bits of control information in the respective control registers 202, 206, 210, 214, 218, 222, 226. The preferred set of control bits include exception miss and exception modify, (VMU), no memory (MCU), branch bias, stream, and offset (IFU). This control information originates from the control path portion of the IFU 102 simultaneous with the loading of an IFIFO master register with a new instruction set from the input bus 198. Thereafter, the control register information is shifted in parallel concurrently with the instruction sets through the IFIFO unit 264.

Finally, in the preferred architecture 100, the output of instruction sets from the IFIFO unit 264 is obtained simultaneously from the last two master registers 216, 224 on the I_Bucket_0 and I_Bucket_1 instruction set output buses 278, 280. In addition, the corresponding control register information is provided on the IBASV0 and IBASV1 control field buses 282, 284. These output buses 278, 282, 280, 284 are all provided as the instruction stream bus 124 to the IEU 104.

B. IFU Control Path

The control path for the IFU 102 directly supports the operation of the prefetch buffer unit 260, IDecode unit 262 and IFIFO unit 264. A prefetch control logic unit 266 primarily manages the operation of the prefetch buffer unit 260. The prefetch control logic unit 266 and IFU 102 in general, receives the system clock signal via the clock line 290 for synchronizing IFU operations with those of the IEU 104, CCU 106 and VMU 108. Control signals appropriate for the selection and writing of instruction sets into the MBUF 188, TBUF 190 and EBUF 192 are provided on the control lines 304.

A number of control signals are provided on the control lines 316 to the prefetch control logic unit 266. Specifically, a fetch request control signal is provided to initiate a prefetch operation. Other control signals provided on the control line 316 identify the intended destination of the requested prefetch operation as being the MBUF 188, TBUF 190 or EBUF 192. In response to a prefetch request, the prefetch control logic unit 266 generates an ID value and determines whether the prefetch request can be posted to the CCU 106. Generation of the ID value is accomplished through the use of a circular four-bit counter.

The use of a four-bit counter is significant in three regards. The first is that, typically a maximum of nine instruction sets may be active at one time in the prefetch buffer unit 260; four instruction sets in the MBUF 188, two in the TBUF 190, two in the EBUF 192 and one provided directly to the IDecode unit 262 via the flow through bus 194. Secondly, instruction sets include four instructions of four bytes each. Consequently, the least significant four bits of any address selecting an instruction set for fetching are superfluous. Finally, the prefetch request ID value can be easily associated with a prefetch request by insertion as the least significant four bits of the prefetch request address;

thereby reducing the total number of address lines required to interface with the CCU 106.

To allow instruction sets to be returned by the CCU 106 out-of-order with respect to the sequence of prefetch requests issued by the IFU 102, the architecture 100 provides for the return of the ID request value with the return of instruction sets from the CCU 106. However, the out-of-order instruction set return capability may result in exhaustion of the sixteen unique IDs. A combination of conditional instructions executed out-of-order, resulting in additional prefetches and instruction sets requested but not yet returned can lead to potential re-use of an ID value. Therefore, the four-bit counter is preferably held, and no further instruction set prefetch requests issued, where the next ID value would be the same as that associated with an as yet outstanding fetch request or another instruction set then pending in the prefetch buffer 260.

The prefetch control logic unit 266 directly manages a prefetch status array 268 which contains status storage locations logically corresponding to each instruction set prefetch buffer location within the MBUF 188, TBUF 190 and EBUF 192. The prefetch control logic unit 266, via selection and data lines 306, can scan, read and write data to the status register array 268. Within the array 268, a main buffer register 308 provides for storage of four, four-bit ID values (MB ID), four single-bit reserved flags (MB RES) and four single-bit valid flags (MB VAL), each corresponding by logical bit-position to the respective instruction set storage locations within the MBUF 180. Similarly, a target buffer register 310 and extended buffer register 312 each provide for the storage of two four-bit ID values (TB ID, EB ID), two single-bit reserved flags (TB RES, EB RES), and two single-bit valid flags (TB VAL, EB VAL). Finally, a flow through status register 314 provides for the storage of a single four-bit ID value (FT ID), a single reserved flag bit (FT RES), and a single valid flag bit (FT VAL).

The status register array 268 is first scanned and, as appropriate, updated by the prefetch control logic unit 266 each time a prefetch request is placed with the CCU 106 and subsequently scanned and updated each time an instruction set is returned. Specifically, upon receipt of the prefetch request signal via the control lines 316, the prefetch control logic unit 266 increments the current circular counter generated ID value, scans the status register array 268 to determine whether the ID value is available for use and whether a prefetch buffer location of the type specified by the prefetch request signal is available, examines the state of the CCU IBUSY control line 300 to determine whether the CCU 106 can accept a prefetch request and, if so, asserts a CCU IREAD control signal on the control line 298, and places the incremented ID value on the CCU ID out bus 294 to the CCU 106. A prefetch storage location is available for use where both of the corresponding reserved and valid status flags are false. The prefetch request ID is written into the ID storage location within the status register array 268 corresponding to the intended storage location within the MBUF 188, TBUF 190, or EBUF 192 concurrent with the placement of the request with the CCU 106. In addition, the corresponding reserved status flag is set true.

When the CCU 106 is able to return a previously requested instruction set to the IFU 102, the CCU IREADY signal is asserted on control line 302 and the corresponding instruction set ID is provided on the CCU ID control lines 296. The prefetch control logic unit 266 scans the ID values and reserved flags within the status register array 268 to identify the intended destination of the instruction set within the prefetch buffer unit 260. Only a single match is possible. Once identified, the instruction set is written via the bus 114 into the appropriate location within the prefetch buffer unit 260 or, if identified as a flow through request, provided directly to the IDecode unit 262. In either case, the valid status flag in the corresponding status register array is set true.

The PC logic unit 270, as will be described below in greater detail, tracks the virtual address of the MBUF 188, TBUF 190 and EBUF 192 instruction streams through the entirety of the IFU 102. In performing this function, the PC logic block 270 both controls and operates from the IDecode unit 262. Specifically, portions of the instructions decoded by the IDecode unit 262 potentially relevant to a change in the program instruction stream flow are provided on the bus 318 to a control flow detection unit 274 and directly to the PC logic block 270. The control flow detection unit 274 identifies each instruction in the decoded instruction set that constitutes a control flow instruction including conditional and unconditional branch instructions, call type instructions, software traps procedural instructions and various return instructions. The control flow detection unit 274 provides a control signal, via lines 322, to the PC logic unit 270 to identify the location and specific nature of the control flow instructions within the instruction set present in the IDecode unit 262. The PC logic unit 270, in turn, determines the target address of the control flow instruction, typically from data provided within the instruction and transferred to the PC logic unit via lines 318. Where, for example, a branch logic bias has been selected to execute ahead for conditional branch instructions, the PC logic unit 270 will begin to direct and separately track the prefetching of instruction sets from the conditional branch instruction target address. Thus, with the next assertion of a prefetch request on the control lines 316, the PC logic unit 270 will further assert a control signal, via lines 316, selecting the destination of the prefetch to be the TBUF 190, assuming that prior prefetch instruction sets were directed to the MBUF 188 or EBUF 192. Once the prefetch control logic unit 266 determines that a prefetch request can be supplied to the CCU 106, the prefetch control logic unit 266 provides an enabling signal, again via lines 316, to the PC logic unit 270 to enable the provision of a page offset portion of the target address (CCU PADDR [13:4]) via the address lines 324 directly to the CCU 106. At the same time, the PC logic unit 270, where a new virtual to physical page translation is required further provides a VMU request signal via control line 328 and the virtualizing portion of the target address (VMU VADDR [31:14]) via the address lines 326 to the VMU 108 for translation into a physical address. Where a page translation is not required, no operation by the VMU 108 is required. Rather, the previous translation result is maintained in an output latch coupled to the bus 122 for immediate use by the CCU 106.

Operational errors in the VMU 108 in performing the virtual to physical translation requested by the PC logic unit 270 are reported via the VMU exception and VMU miss control lines 332, 334. The VMU miss control line 334 reports a translation lookaside buffer (TLB) miss. The VMU exception control signal, on VMU exception line 332, is raised for all other exceptions. In both cases, the PC logic unit handles the error condition by storing the current execution point in the instruction stream and then prefetching, as if in response to an unconditional branch, a dedicated exception handling routine instruction stream for diagnosing and handling the error condition. The VMU exception and miss control signals identify the general nature of the exception encountered, thereby allowing the PC logic unit 270 to identify the prefetch address of a corresponding exception handling routine.

The IFIFO control logic unit 272 is provided to directly support the IFIFO unit 264. Specifically, the PC logic unit 270 provides a control signal via the control lines 336 to signal the IFIFO control logic unit 272 that an instruction set is available on the input bus 198 from the IDecode unit 262. The IFIFO control unit 272 is responsible for selecting the deepest available master register 200, 208, 216, 224 for receipt of the instruction set. The output of each of the master control registers 202, 210, 218, 226 is provided to the IFIFO control unit 272 via the control bus 338. The control bits stored by each master control register includes a two-bit buffer address (IF_Bx_ADR), a single stream indicator bit (IF_Bx_STRM), and a single valid bit (IF_Bx_VLD). The two bit buffer address identifies the first valid instruction within the corresponding instruction set. That is, instruction sets returned by the CCU 106 may not be aligned such that the target instruction of a branch operation, for example, is located in the initial instruction location within the instruction set. Thus, the buffer address value is provided to uniquely identify the initial instruction within an instruction set that is to be considered for execution.

The stream bit is used essentially as a marker to identify the location of instruction sets containing conditional control flow instructions, and giving rise to potential control flow changes, in the stream of instructions through the IFIFO unit 264. The main instruction stream is processed through the MBUF 188 generally with a stream bit value of 0. On the occurrence of a relative conditional branch instruction, for example, the corresponding instruction set is marked with a stream bit value of 1. The conditional branch instruction is detected by the IDecode unit 262. Up to four conditional control flow instructions may be present in the instruction set. The instruction set is then stored in the deepest available master register of the IFIFO unit 264.

In order to determine the target address of the conditional branch instruction, the current IEU 104 execution point address (DPC), the relative location of the conditional instruction containing instruction set as identified by the stream bit, and the conditional instruction location offset in the instruction set, as provided by the control flow detector 274, are combined with the relative branch offset value as obtained from a corresponding branch instruction field via control lines 318. The result is a branch target virtual address that is stored by the PC logic unit 270. The initial instruction sets of the target instruction stream may then be prefetched into the TBUF 190 utilizing this address.

Depending on the preselected branch bias selected for the PC logic unit 270, the IFIFO unit 264 will continue to be loaded from either the MBUF 188 or TBUF 190. If a second instruction set containing one or more conditional flow instructions is encountered, the instruction set is marked with a stream bit value of 0. Since a second target stream cannot be fetched, the target address is calculated and stored by the PC logic unit 270, but no prefetch is performed. In addition, no further instruction sets can be processed through the IDecode unit 262, or at least none that are found to contain a conditional flow control instruction.

The PC logic unit 270, in the preferred embodiments of the present invention, can manage up to eight conditional flow instructions occurring in up to two instruction sets. The target addresses for each of the two instruction sets marked by stream bit changes are stored in an array of four address registers with each target address positioned logically with respect to the location of the corresponding conditional flow instruction in the instruction set.

Once the branch result of the first in-order conditional flow instruction is resolved, the PC logic unit 270 will direct the prefetch control unit 260, via control signals on lines 316, to transfer the contents of the TBUF 190 to the MBUF 188, if the branch is taken, and to mark invalid the contents of the TBUF 190. Any instruction sets in the IFIFO unit 264 from the incorrect instruction stream, target stream if the branch is not taken and main stream if the branch is taken, are cleared from the IFIFO unit 264. If a second or subsequent conditional flow control instruction exists in the first stream bit marked instruction set, that instruction is handled in a consistent manner: the instruction sets from the target stream are prefetched, instruction sets from the MBUF 188 or TBUF 190 are processed through the IDecode unit 262 depending on the branch bias, and the IFIFO unit 264 is cleared of incorrect stream instruction sets when the conditional flow instruction finally resolves.

If a secondary conditional flow instruction set remains in the IFIFO unit 264 once the IFIFO unit 264 is cleared of incorrect stream instruction sets, and the first conditional flow instruction set contains no further conditional flow instructions, the target addresses of the second stream bit marked instruction set are promoted to the first array of address registers. In any case, a next instruction set containing conditional flow instructions can then be evaluated through the IDecode unit 262. Thus, the toggle usage of the stream bit allows potential control flow changes to be marked and tracked through the IFIFO unit 264 for purposes of calculating branch target addresses and for marking the instruction set location above which to clear where the branch bias is subsequently determined to have been incorrect for a particular conditional flow control instruction.

Rather than actually clearing instruction sets from the master registers, the IFIFO control logic unit 272 simply resets the valid bit flag in the control registers of the corresponding master registers of the IFIFO unit 264. The clear operation is instigated by the PC logic unit 270 in a control signal provided on lines 336. The inputs of each of the master control registers 202, 210, 218, 226 are directly accessible by the IFIFO control logic unit 272 via the status bus 230. In the preferred architecture 100, the bits within these master control registers 202, 210, 218, 226 may be set by the IFIFO control unit 272 concurrent with or independent of a data shift operation by the IFIFO unit 264. This capability allows an instruction set to be written into any of the master registers 200, 208, 216, 224, and the corresponding status information to be written into the master control registers 202, 210, 218, 226 asynchronously with respect to the operation of the IEU 104.

Finally, an additional control line on the control and status bus 230 enables and directs the FIFO operation of the IFIFO unit 264. An IFIFO shift is performed by the IFIFO control logic unit 272 in response to the shift request control signal provided by the PC logic unit 270 via the control lines 336. The IFIFO control unit 272, based on the availability of a master register 200, 208, 216, 224 to receive an instruction set provides a control signal, via lines 316, to the prefetch control unit 266 to request the transfer of a next appropriate instruction set from the prefetch buffers 260. On transfer of the instruction set, the corresponding valid bit in the array 268 is reset.

C. IFU/IEU Control Interface

The control interface between the IFU 102 and IEU 104 is provided by the control bus 126. This control bus 126 is coupled to the PC logic unit 270 and consists of a number of control, address and specialized data lines. Interrupt request and acknowledge control signals, as passed via the control lines 340, allow the IFU 102 to signal and synchronize interrupt operations with the IEU 104. An externally generated interrupt signal is provided on a line 292 to the logic unit 270. In response, an interrupt request control signal, provided on lines 340, causes the IEU 104 to cancel tentatively executed instructions. Information regarding the nature of an interrupt is exchanged via interrupt information lines 341. When the IEU 104 is ready to begin receiving instruction sets prefetched from the interrupt service routine address determined by the PC logic unit 270, the IEU 104 asserts an interrupt acknowledge control signal on the lines 340. Execution of the interrupt service routine, as prefetched by the IFU 102, will then commence.

An IFIFO read (IFIFO RD) control signal is provided by the IEU 104 to signal that the instruction set present in the deepest master register 224 has been completely executed and that a next instruction set is desired. Upon receipt of this control signal, the PC logic unit 270 directs the IFIFO control logic unit 272 to perform a IFIFO shift operation on the IFIFO unit 264.

A PC increment request and size value (PC INC/SIZE) is provided on the control lines 344 to direct the PC logic unit 270 to update the current program counter value by a corresponding size number of instructions. This allows the PC logic unit 270 to maintain a point of execution program counter (DPC) that is precise to the location of the first in-order executing instruction in the current program instruction stream.

A target address (TARGET ADDR) is returned on the address lines 346 to the PC logic unit 270. The target address is the virtual target address of a branch instruction that depends on data stored within the register file of the IEU 104. Operation of the IEU 104 is therefore required to calculate the target address.

Control flow result (CF RESULT) control signals are provided on the control lines 348 to the PC logic unit 270 to identify whether any currently pending conditional branch instruction has been resolved and whether the result is either a branch taken or not taken. Based on these control signals, the PC logic unit 270 can determine which of the instruction sets in the prefetch buffer 260 and IFIFO unit 264 must be cancelled, if at all, as a consequence of the execution of the conditional flow instruction.

A number of IEU instruction return type control signals (IEU Return) are provided on the control lines 350 to alert the IFU 102 to the execution of certain instructions by the IEU 104. These instructions include a return from procedural instruction, return from trap, and return from subroutine call. The return from trap instruction is used equally in hardware interrupt and software trap handling routines. The subroutine call return is also used in conjunction with jump-and-link type calls. In each case, the return control signals are provided to alert the IFU 102 to resume its instruction fetching operation with respect to the previously interrupted instruction stream. Origination of the signals from the IEU 104 allows the precise operation of the system 100 to be maintained; the resumption of an "interrupted" instruction stream is performed at the point of execution of the return instruction.

A current instruction execution PC address (Current IF_PC) is provided on an address bus 352 to the IEU 104. This address value, the DPC, identifies the precise instruction being executed by the IEU 104. That is, while the IEU 104 may tentatively execute ahead instructions past the current IF_PC address, this address must be maintained for purposes of precise control of the architecture 100 with respect to the occurrence of interrupts, exceptions, and any other events that would require knowing the precise state-of-the-machine. When the IEU 104 determines that the precise state-of-the-machine in the currently executing instruction stream can be advanced, the PC Inc/Size signal is provided to the IFU 102 and immediately reflected back in the current IF_PC address value.

Finally, an address and bi-directional data bus 354 is provided for the transfer of special register data. This data may be programmed into or read from special registers within the IFU 102 by the IEU 104. Special register data is generally loaded or calculated by the IEU 104 for use by the IFU 102.

D. PC Logic Unit Detail

A detailed diagram of the PC Logic unit 270 including a PC control unit 362, interrupt control unit 363, prefetch PC control unit 364 and execution PC control unit 366, is shown in FIG. 3. The PC control unit 362 provides timing control over the prefetch and execution PC control units 364, 366 in response to control signals from the prefetch control logic unit 266, IFIFO control logic unit 272, and the IEU 104, via the interface bus 126. The Interrupt Control Unit 363 is responsible for managing the precise processing of interrupts and exceptions, including the determination of a prefetch trap address offset that selects an appropriate handling routine to process a respective type of trap. The prefetch PC control unit 364 is, in particular, responsible for managing program counters necessary to support the prefetch buffers 188, 190, 192, including storing return addresses for traps handling and procedural routine instruction flows. In support of this operation, the prefetch PC control unit 364 is responsible for generating the prefetch virtual address including the CCU PADDR address on the physical address bus lines 324 and the VMU VMADDR address on the address lines 326. Consequently, the prefetch PC control unit 364 is responsible for maintaining the current prefetch PC virtual address value.

The prefetch operation is generally initiated by the IFIFO control logic unit 272 via a control signal provided on the control lines 316. In response, the PC control unit 362 generates a number of control signals provided on the control lines 372 to operate the prefetch PC control unit 364 to generate the PADDR and, as needed, the VMADDR addresses on the address lines 324, 326. An increment signal, having a value of 0 to four, may be also provided on the control lines 374 depending on whether the PC control unit 362 is re-executing an instruction set fetch at the present prefetch address, aligning for the second in a series of prefetch requests, or selecting the next full sequential instruction set for prefetch. Finally, the current prefetch address PF_PC is provided on the bus 370 to the execution PC control unit 366.

New prefetch addresses originate from a number of sources. A primary source of addresses is the current IF_PC address provided from the execution PC control unit 366 via bus 352. Principally, the IF_PC address provides a return address for subsequent use by the prefetch PC control unit 364 when an initial call, trap or procedural instruction occurs. The IF_PC address is stored in registers in the prefetch PC control unit 364 upon each occurrence of these instructions. In this manner, the PC control unit 362, on receipt of a IEU return signal, via control lines 350, need merely select the corresponding return address register within the prefetch PC control unit 364 to source a new prefetch virtual address, thereby resuming the original program instruction stream.

Another source of prefetch addresses is the target address value provided on the relative target address bus 382 from the execution PC control unit 366 or on the absolute target address bus 346 provided from the IEU 104. Relative target addresses are those that can be calculated by the execution PC control unit 366 directly. Absolute target addresses must be generated by the IEU 104, since such target addresses are dependent on data contained in the IEU register file. The target address is routed over the target address bus 384 to the prefetch PC control unit 364 for use as a prefetch virtual address. In calculating the relative target address, an operand portion of the corresponding branch instruction is also provided on the operand displacement portion of the bus 318 from the IDecode unit 262.

Another source of prefetch virtual addresses is the execution PC control unit 366. A return address bus 352' is provided to transfer the current IF_PC value (DPC) to the prefetch PC control unit 364. This address is utilized as a return address where an interrupt, trap or other control flow instruction such as a call has occurred within the instruction stream. The prefetch PC control unit 364 is then free to prefetch a new instruction stream. The PC control unit 362 receives an IEU return signal, via lines 350, from the IEU 104 once the corresponding interrupt or trap handling routine or subroutine has been executed. In turn, the PC control unit 362 selects, via one of the PFPC control signals on line 372 and based on an identification of the return instruction executed as provided via lines 350, a register containing the current return virtual address. This address is then used to continue the prefetch operation by the PC logic unit 270.

Finally, another source of prefetch virtual addresses is from the special register address and data bus 354. An address value, or at least a base address value, calculated or loaded by the IEU 104 is transferred as data via the bus 354 to the prefetch PC control unit 364. The base addresses include the base addresses for the trap address table, a fast trap table, and a base procedural instruction dispatch table. The bus 354 also allows many of the registers in the prefetch and execution PC control units 364, 366 to be read to allow corresponding aspects of the state-of-the-machine to be manipulated through the IEU 104.

The execution PC control unit 366, subject to the control of the PC control unit 362 is primarily responsible for calculating the current IF_PC address value. In this role, the execution PC control unit 366 responds to control signals provided by the PC control unit 362 on the ExPC control lines 378 and increment/size control signals provided on the control lines 380 to adjust the IF_PC address. These control signals are generated primarily in response to the IFIFO read control signal provided on line 342 and the PC increment/size value provided on the control lines 344 from the IEU 104.

1. PF and ExPC Control/Data Unit Detail

FIG. 4 provides a detailed block diagram of the prefetch and execution PC control units 364, 366. These units primarily consist of registers, incrementors and the like, selectors and adder blocks. Control for managing the transfer of data between these blocks is provided by the PC Control Unit 362 via the PFPC control lines 372, the ExPC control lines 378 and the Increment Control lines 374, 380. For purposes of clarity, those specific control lines are not shown in the block diagram of FIG. 4. However, it should be understood that these control signals are provided to the blocks shown as described herein.

Central to the prefetch PC control unit 364 is a prefetch selector (PF_PC SEL) 390 that operates as a central selector of the current prefetch virtual address. This current prefetch address is provided on the output bus 392 from the prefetch selector to an incrementor unit 394 to generate a next prefetch address. This next prefetch address is provided on the incrementor output bus 396 to a parallel array of registers MBUF PFnPC 398, TBUF PFnPC 400, and EBUF PFnPC 402. These registers 398, 400, 402 effectively store the next instruction prefetch address. However, in accordance with the preferred embodiment of the present invention, separate prefetch addresses are held for the MBUF 188, TBUF 190, and EBUF 192. The prefetch addresses, as stored by the MBUF, TBUF and EBUF PFnPC registers 398, 400, 402 are respectively provided by the address buses 404, 408, 410 to the prefetch selector 390. Thus, the PC control unit 362 can direct an immediate switch of the prefetch instruction stream merely by directing the selection, by the prefetch selector 390, of another one of the prefetch registers 398, 400, 402. Once that address value has been incremented by the incrementor 394, if a next instruction set in the stream is to be prefetched, the value is returned to the appropriate one of the prefetch registers 398, 400, 402. Another parallel array of registers, for simplicity shown as the single special register block 412, is provided to store a number of special addresses. The register block 412 includes a trap return address register, a procedural instruction return address register, a procedural instruction dispatch table base address register, a trap routine dispatch table base address register, and a fast trap routine table base address register. Under the control of the PC control unit 362, these return address registers may receive the current IF_PC execution address via the bus 352'. The address values stored by the return and base address registers within the register block 412 may be both read and written independently by the IEU 104. The register are selected and values transferred via the special register address and data bus 354.

A selector within the special register block 412, controlled by the PC control unit 362, allows the addresses stored by the registers of the register block 412 to be put on the special register output bus 416 to the prefetch selector 390. Return addresses are provided directly to the prefetch selector 390. Base address values are combined with the offset value provided on the interrupt offset bus 373 from the interrupt control unit 363. Once sourced to the prefetch selector 390 via the bus 373', a special address can be used as the initial address for a new prefetch instruction stream by thereafter continuing the incremental loop of the address through the incrementor 394 and one of the prefetch registers 398, 400, 402.

Another source of addresses to the prefetch selector 390 is an array of registers within the target address register block 414. The target registers within the block 414 provide for storage of, in the preferred embodiment, eight potential branch target addresses. These eight storage locations logically correspond to the eight potentially executable instructions held in the lowest two master registers 216, 224 of the IFIFO unit 264. Since any, and potentially all of the those instructions could be conditional branch instructions, the target register block 414 allows for their precalculated target addresses to be stored awaiting use for fetching of a target instruction stream through the TBUF 190. In particular, if a conditional branch bias is set such that the PC Control Unit 362 immediately begins prefetching of a target instruction stream, the target address is immediately fed through the target register block 414 via the address bus 418 to the prefetch selector 390. Once incremented by the incrementor 394, the address is stored back to the TBUF PFnPC 400 for use in subsequent prefetch operations of the target instruction stream. If additional branch instructions occur within the target instruction stream, the target addresses of such secondary branches are calculated and stored in the target register array 414 pending use upon resolution of the first conditional branch instruction.

A calculated target address as stored by the target register block 414, is transferred from a target address calculation unit within the execution PC control unit 366 via the address lines 382 or from the IEU 104 via the absolute target address bus 346.

The Address value transferred through the prefetch PF_PC selector 390 is a full thirty-two bit virtual address value. The page size, in the preferred embodiment of the present invention is fixed at 16 KBytes, corresponding to the maximum page offset address value [13:0]. Therefore, a VMU page translation is not required unless there is a change in the current prefetch virtual page address [27:14]. A comparator in the prefetch selector 390 detects this circumstance. A VMU translation request signal (VMXLAT) is provided via line 372' to the PC control unit 362 when there is a change in the virtual page address, either due incrementing across a page boundary or a control flow branch to another page address. In turn, the PC control unit 362 directs the placement of the VMU VMADDR address on lines 326, in addition to the CCU PADDR on lines 324, both via a buffer unit 420, and the appropriate control signals on the VMU control lines 326, 328, 330 to obtain a VMU virtual to physical page translation. Where a page translation is not required, the current physical page address [31:14] is maintained by a latch at the output of the VMU unit 108 on the bus 122.

The virtual address provided onto the bus 370 is incremented by the incrementor 394 in response to a signal provided on the increment control line 374. The incrementor 394 increments by a value representing an instruction set (four instructions or sixteen bytes) in order to select a next instruction set. The low-order four bits of a prefetch address as provided to the CCU unit 106 are zero. Therefore the actual target address instruction in a first branch target instruction set may not be located in the first instruction location. However, the low-order four bits of the address are provided to the PC control unit 362 to allow the proper first branch instruction location to be known by the IFU 102. The detection and handling, by returning the low order bits [3:2] of a target address as the two-bit buffer address, to select the proper first instruction for execution in a non-aligned target instruction set, is performed only for the first prefetch of a new instruction stream, i:., any first non-sequential instruction set address in an instruction stream. The non-aligned relationship between the address of the first instruction in an instruction set and the prefetch address used in prefetching the instruction set can and is thereafter ignored for the duration of the current sequential instruction stream.

The remainder of the functional blocks shown in FIG. 4 comprise the execution PC control unit 366. In accordance with the preferred embodiment of the present invention, the execution PC control unit 366 incorporates its own independently functioning program counter incrementor. Central to this function is an execution selector (DPC SEL) 430. The address output by the execution selector 430, on the address bus 352', is the present execution address (DPC) of the architecture 100. This execution address is provided to an adder unit 434. The increment/size control signals provided on the lines 380 specify an instruction increment value of from one to four that the adder unit 434 adds to the address obtained from the selector 430. As the adder 432 additionally performs an output latch function, the incremented next execution address is provided on the address lines 436 directly back to the execution selector 430 for use in the next execution increment cycle.

The initial execution address and all subsequent new stream addresses are obtained through a new stream register unit 438 via the address lines 440. The new stream register unit 438 allows the new current prefetch address, as provided on the PFPC address bus 370 from the prefetch selector 390 to be passed on to the address bus 440 directly or stored for subsequent use. That is, where the prefetch PC control unit 364 determines to begin prefetching at a new virtual address, the new stream address is temporarily stored by the new stream register unit 438. The PC control unit 362, by its participation in both the prefetch and execution increment cycles, holds the new stream address in the new stream register 438 unit until the execution address has reached the program execution point corresponding to the control flow instruction that instigated the new instruction stream. The new stream address is then output from the new stream register unit 438 to the execution selector 430 to initiate the independent generation of execution addresses in the new instruction stream.

In accordance with the preferred embodiments of the present invention, the new stream register unit 438 provides for the buffering of two control flow instruction target addresses. By the immediate availability of the new stream address, there is essentially no latency in the switching of the execution PC control unit 366 from the generation of a current sequence of execution addresses to a new stream sequence of execution addresses.

Finally, an IF_PC selector (IF_PC SEL) 442 is provided to ultimately issue the current IF_PC address on the address bus 352 to the IEU 104. The inputs to the IF_PC selector 442 are the output addresses obtained from either the execution selector 430 or new stream register unit 438. In most instances, the IF_PC selector 442 is directed by the PC control unit 362 to select the execution address output by the execution selector 430. However, in order to further reduce latency in switching to a new virtual address used to initiate execution of a new instruction stream, the selected address provided from the new stream register unit 438 can be bypassed via bus 440 directly to the IF_PC selector 442 for provision as the current IF_PC execution address.

The execution PC control unit 366 is capable of calculating all relative branch target addresses. The current execution point address and the new stream register unit 438 provided address are received by a control flow selector (CF_PC) 446 via the address buses 352', 440. Consequently, the PC control unit 362 has substantial flexibility in selecting the exact initial address from which to calculate a target address. This initial, or base, address is provided via address bus 454 to a target address ALU 450. A second input value to the target ALU 450 is provided from a control flow displacement calculation unit 452 via bus 458. Relative branch instructions, in accordance with the preferred architecture 100, incorporate a displacement value in the form of an immediate mode constant that specifies a relative new target address. The control flow displacement calculation unit 452 receives the operand displacement value initially obtained via the IDecode unit operand output bus 318. Finally, an offset register value is provided to the target address ALU 450 via the lines 456. The offset register 448 receives an offset value via the control lines 378' from the PC control unit 362. The magnitude of the offset value is determined by the PC control unit 362 based on the address offset between the base address provided on the address lines 454 and the address of the current branch instruction for which the relative target address is being calculated. That is, the PC control unit 362, through its control of the IFIFO control logic unit 272 tracks the number of instructions separating the instruction at the current execution point address (requested by CP_PC) and the instruction that is currently being processed by the IDecode unit 262 and, therefore, being processed by the PC logic unit 270 to determine the target address for that instruction.

Once the relative target address has been calculated by the target address ALU 450, the target address is written into a corresponding one of the target registers 414 via the address bus 382.

2. PC Control Algorithm Detail

1. Main Instruction Stream Processing: MBUF PFnPC 1.1. The address of the next main flow prefetch instruction is stored in the MBUF PFnPC.

1.2. In the absence of a control flow instruction, a 32 bit incrementor adjusts the address value in the MBUF PFnPC by sixteen bytes (×16) with each prefetch cycle.

1.3. When an unconditional control flow instruction is IDecoded, all prefetched data fetched subsequent to the instruction set will be flushed and the MBUF PFnPC is loaded, through the target register unit, PF_PC selector and incrementor, with the new main instruction stream address. The new address is also stored in the new stream registers.

1.3.1. The target address of a relative unconditional control flow is calculated by the IFU from register data maintained by the IFU and from operand data following the control flow instruction.

1.3.2. The target address of an absolute unconditional control flow instruction is eventually calculated by the IEU from a register reference, a base register value, and an index register value.

1.3.2.1. Instruction prefetch cycling stalls until the target address is returned by the IEU for absolute address control flow instruction; instruction execution cycling continues.

1.4. The address of the next main flow prefetch instruction set, resulting from an unconditional control flow instruction, is bypassed through the target address register unit, PF_PC selector and incrementor and routed for eventual storage in the MBUF PFnPC; prefetching continues at 1.2.

2. Procedural Instruction Stream Processing: EBUF PFnPC 2.1. A procedural instruction may be prefetched in the main or branch target instruction stream. If fetched in a target stream, stall prefetching of the procedural stream until the conditional control flow instruction resolves and the procedural instruction is transferred to the MBUF. This allows the TBUF to be used in handling of conditional control flows that occur in the procedural instruction stream.

2.1.1. A procedural instruction should not appear in a procedural instruction stream, i.e., procedural instructions should not be nested: a return from procedural instruction will return execution to the main instruction flow. In order to allow nesting, an additional, dedicated return from nested procedural instruction would be required. While the architecture can readily support such an instruction, the need for a nested procedural instruction capability will not likely improve the performance of the architecture.

2.1.2. In a main instruction stream, a procedural instruction stream that, in turn, includes first and second conditional control flow instruction containing instruction sets will stall prefetching with respect to the second conditional control flow instruction set until any conditional control flow instructions in the first such instruction set are resolved and the second conditional control flow instruction set has been transferred to the MBUF.

2.2. Procedural instructions provide a relative offset, included as an immediate mode operand field of the instruction, to identify the procedural routine starting address:

2.2.1. The offset value provided by the procedural instruction is combined with a value contained in a procedural base address (PBR) register maintained in the IFU. This PBR register is readable and writable via the special address and data bus in response to the execution of a special register move instruction.

2.3. When a procedural instruction is encountered, the next main instruction stream IF_PC address is stored in the uPC return address register and the procedure-in-progress bit in the processor status register (PSR) is set.

2.4. The starting address of the procedural stream is routed from the PBR register (plus the procedural instruction operand offset value) to the PF_PC selector.

2.5. The starting address of the procedural stream is simultaneously provided to the new stream register unit and to the incrementor for incrementing (×16); the incremented address is then stored in the EBUF PFnPC.

2.6. In the absence of a control flow instruction, a 32 bit incrementor adjusts address value (×16) in the EBUF PFnPC with each procedural instruction prefetch cycle.

2.7. When an unconditional control flow instruction is IDecoded, all prefetched data fetched subsequent to the branch instruction will be flushed and the EBUF PFnPC is loaded with the new procedural instruction stream address.

2.7.1. The target address of a relative unconditional control flow instruction is calculated by the IFU from IFU maintained register data and from the operand data provided within an immediate mode operand field of the control flow instruction.

2.7.2. The target address of an absolute unconditional branch is calculated by the IEU from a register reference, a base register value, and an index register value.

2.7.2.1. Instruction prefetch cycling stalls until the target address is returned by the IEU for absolute address branches; execution cycling continues.

2.8. The address of the next procedural flow prefetch instruction set is stored in the EBUF PFnPC and prefetching continues at 1.2.

2.9. When a return from procedure instruction is IDecoded, prefetching continues from the address stored in the uPC register, which is then incremented (×16) and returned to the MBUF PFnPC register for subsequent prefetches.

3. Branch Instruction Stream Processing: TBUF PFNPC.

3.1. When a conditional control flow instruction, occurring in a first instruction set in the MBUF instruction stream, is IDecoded, the target address is determined by the IFU if the target address is relative to the current address or by the IEU for absolute addresses.

3.2. For "branch taken bias":

3.2.1. If the branch is to an absolute address, stall instruction prefetch cycling until the target address is returned by the IEU; execution cycling continues.

3.2.2. Load the TBUF PFnPC with the branch target address by transfer through the PF_PC selector and incrementor.

3.2.3. Target instruction stream instructions are prefetched into the TBUF and then routed into the IFIFO for subsequent execution; if the IFIFO and TBUF becomes full, stall prefetching.

3.2.4. The 32 bit incrementor adjusts (×16) the address value in the TBUF PFnPC with each prefetch cycle.

3.2.5. Stall the prefetch operation on IDecode of a conditional control flow instruction, occurring in a second instruction set in the target instruction stream until the all conditional branch instructions in the first (primary) set are resolved (but go ahead and calculate the relative target address and store in target registers).

3.2.6. If conditional branch in the first instruction set resolves to "taken":

3.2.6.1. Flush instruction sets following the first conditional flow instruction set in the MBUF or EBUF, if the source of the branch was the EBUF instruction stream as determined from the procedure-in-progress bit.

3.2.6.2. Transfer the TBUF PFnPC value to MBUF PFnPC or EBUF based on the state of the procedure-in-progress bit.

3.2.6.3. Transfer the prefetched TBUF instructions to the MBUF or EBUF based on the state of procedure-in-progress bit.

3.2.6.4. If a second conditional branch instruction set has not been IDecoded, continue MBUF or EBUF prefetching operations based on the state of the procedure-in-progress bit.

3.2.6.5. If a second conditional branch instruction has been IDecoded, begin processing that instruction (go to step 3.3.1).

3.2.7. If the conditional control for instruction(s) in the first conditional instruction set resolves to "not taken":

3.2.7.1. Flush the IFIFO and IEU of instruction sets and instructions, from the target instruction stream.

3.2.7.2. Continue MBUF or EBUF prefetching operations.

3.3. For "branch not taken bias":

3.3.1. Stall prefetch of instructions into the MBUF; execution cycling continues.

3.3.1.1. If the conditional control flow instruction in the first conditional instruction set is relative, calculate the target address and store in the target registers.

3.3.1.2. If the conditional control flow instructions in the first conditional instruction set is absolute, wait for the IEU to calculate the target address and return the address to the target registers.

3.3.1.3. Stall the prefetch operation on IDecode of a conditional control flow instruction in a second instruction set until the conditional control flow instruction(s) in the first conditional instruction set instruction is resolved.

3.3.2. Once the target address of the first conditional branch is calculated, load into TBUF PFNPC and also begin prefetching instructions into the TBUF concurrent with execution of the main instruction stream. Target instruction sets are not loaded into the IFIFO (the branch target instructions are thus on hand when each conditional control flow instruction in the first instruction set resolves).

3.3.3. If a conditional control flow instruction in the first set resolves to "taken":

3.3.3.1. Flush the MBUF or EBUF, if the source of the branch was the EBUF instruction stream, as determined from the state of the procedure-in-progress bit, and the IFIFO and IEU of instructions from the main stream following the first conditional branch instruction set.

3.3.3.2. Transfer the TBUF PFnPC value to MBUF PFnPC or EBUF, as determined from the state of the procedure-in-progress bit.

3.3.3.3. Transfer the prefetched TBUF instructions to the MBUF or EBUF, as determined from the state of the procedure-in-progress bit.

3.3.3.4. Continue MBUF or EBUF prefetching operations, as determined from the state of the procedure-in-progress bit.

3.3.4. If a conditional control flow instruction in the first set resolves to "not taken":

3.3.4.1. Flush the TBUF of instruction sets from the target instruction stream.

3.3.4.2. If a second conditional branch instruction has not been IDecoded, continue MBUF or EBUF, as determined from the state of the procedure-in-progress bit, prefetching operations.

3.3.4.3. If a second conditional branch instruction has been IDecoded, begin processing that instruction (go to step 3.4.1).

4. Interrupts, Exceptions and Trap Instructions.

4.1. Traps generically include:

4.1.1. Hardware Interrupts.

4.1.1.1. Asynchronously (external) occurring events, internal or external.

4.1.1.2. Can occur at any time and persist.

4.1.1.3. Serviced in priority order between atomic (ordinary) instructions and may suspend procedural instructions.

4.1.1.4. The starting address of an interrupt handler is determined as the vector number offset into a predefined table of trap handler entry points.

4.1.2. Software Trap Instructions.

4.1.2.1. Synchronously (internal) occurring instructions.

4.1.2.2. A software instruction that executes as an exception.

4.1.2.3. The starting address of the trap handler is determined from the trap number offset combined with a base address value stored in the TBR or FTB register.

4.1.3. Exceptions.

4.1.3.1. Events occurring synchronously with an instruction.

4.1.3.2. Handled at the time the instruction is executed.

4.1.3.3. Due to consequences of the exception, the excepted instruction and all subsequent executed instructions are cancelled.

4.1.3.4. The starting address of the exception handler is determined from the trap number offset into a predefined table of trap handler entry point.

4.2. Trap instruction stream operations occur in-line with the then currently executing instruction stream.

4.3. Traps may nest, provided the trap handling routine saves the xPC address prior to a next allowed trap—failure to do so will corrupt the state of the machine if a trap occurs prior to completion of the current trap operation.

5. Trap Instruction Stream Processing: xPC.

5.1. When a trap is encountered:

5.1.1. If an asynchronous interrupt, the execution of the currently executing instruction(s) is suspended.

5.1.2. If a synchronous exception, the trap is processed upon execution of the excepted instruction.

5.2. When a trap is processed:

5.2.1. Interrupts are disabled.

5.2.2. The current IF_PC address is stored in the xPC trap state return address register.

5.2.3. The IFIFO and the MBUF prefetch buffers at and subsequent to the IF_PC address are flushed.

5.2.4. Executed instructions at and subsequent to the address IF_PC and the results of those instructions are flushed from the IEU.

5.2.5. The MBUF PFnPC is loaded with the address of the trap handler routine.

5.2.5.1. Source of a trap address either the TBR or FTB register, depending on the type of trap as determined by the trap number, which are provided in the set of special registers.

5.2.6. Instructions are prefetched and dropped into the IFIFO for execution in a normal manner.

5.2.7. The instructions of the trap routine are then executed.

5.2.7.1. The trap handling routine may provide for the xPC address to be saved to a predefined location and interrupts re-enabled; the xPC register is read/write via a special register move instruction and the special register address and data bus.

5.2.8. The trap state must be exited by the execution of a return from trap instruction.

5.2.8.1. If prior saved, the xPC address must be restored from its predefined location before executing the return from trap instruction.

5.3. When a return from trap is executed:

5.3.1. Interrupts are enabled.

5.3.2. The xPC address is returned to the current instruction stream register MBUF or EBUF PFnPC, as determined from the state of the procedure-in-progress bit, and prefetching continues from that address.

5.3.3. The xPC address is restored to the IF_PC register through the new stream register.

E. Interrupt and Exception Handling

1. Overview

Interrupts and exceptions will be processed, as long as they are enabled, regardless of whether the processor is executing from the main instruction stream or a procedural instruction stream. Interrupts and exceptions are serviced in priority order, and persist until cleared. The starting address of a trap handler is determined as the vector number offset into a predefined table of trap handler addresses as described below.

Interrupts and exceptions are of two basic types in the present embodiment, those which occur synchronously with particular instructions in the instruction stream, and those which occur asynchronously with particular instructions in the instruction stream. The terms interrupt, exception, trap and fault are used interchangeably herein. Asynchronous interrupts are generated by hardware, either on-chip or off-chip, which does not operate synchronously with the instruction stream. For example, interrupts generated by an on-chip timer/counter are asynchronous, as are hardware interrupts and non-maskable interrupts (NMI) provided from off-chip. When an asynchronous interrupt occurs, the processor context is frozen, all traps are disabled, certain processor status information is stored, and the processor vectors to an interrupt handler corresponding to the particular interrupt received. After the interrupt handler completes its processing, program execution continues with the instruction following the last completed instruction in the stream which was executing when the interrupt occurred.

Synchronous exceptions are those that occur synchronously with instructions in the instruction stream. These exceptions occur in relation to particular instructions, and are held until the relevant instruction is to be executed. In the preferred embodiments, synchronous exceptions arise during prefetch, during instruction decode, or during instruction execution. Prefetch exceptions include, for example, TLB miss or other VMU exceptions. Decode exceptions arise, for example, if the instruction being decoded is an illegal instruction or does not match the current privilege level of the processor. Execution exceptions arise due to arithmetic errors, for example, such as divide by zero. Whenever these exceptions occur, the preferred embodiments maintain them in correspondence with the particular instruction which caused the exception, until the time at which that instruction is to be retired. At that time, all prior completed instructions are retired, any tentative results from the instruction which caused the exception are flushed, as are the tentative results of any following tentatively executed instructions. Control is then transferred to an exception handler corresponding to the highest priority exception which occurred for that instruction.

Software trap instructions are detected at the IDecode stage by CF_DET 274 (FIG. 2) and are handled. similarly to both unconditional call instructions and other synchronous traps. That is, a target address is calculated and prefetch continues to the then-current prefetch queue (EBUF or MBUF). At the same time, the exception is also noted in correspondence with the instruction and is handled when the instruction is to be retired. All other types of synchronous exceptions are merely noted and accumulated in correspondence with the particular instruction which caused it and are handled at execution time.

2. Asynchronous Interrupts

Asynchronous interrupts are signaled to the PC logic unit 270 over interrupt lines 292. As shown in FIG. 3, these lines are provided to the interrupt logic unit 363 in the PC logic unit 270, and comprise an NMI line, an IRQ line and a set of interrupt level lines (LVL). The NMI line signals a non-maskable interrupt, and derives from an external source. It is the highest priority interrupt except for hardware reset. The IRQ line also derives from an external source, and indicates when an external device is requesting a hardware interrupt. The preferred embodiments permit up to 32 user-defined externally supplied hardware interrupts and the particular external device requesting the interrupt provides the number of the interrupt (0-31) on the interrupt level lines (LVL). The memory error line is activated by the MCU 110 to signal various kinds of memory errors. Other asynchronous interrupt lines (not shown) are also provided to the interrupt logic unit 363, including lines for requesting a timer/counter interrupt, a memory I/O error interrupt, a machine check interrupt and a performance monitor interrupt. Each of the asynchronous interrupts, as well as the synchronous exceptions described below, have a corresponding predetermined trap number associated with them, 32 of these trap numbers being associated with the 32 available hardware interrupt levels. A table of these trap numbers is maintained in the interrupt logic unit 363. The higher the trap number, in general, the higher the priority of the trap.

When one of the asynchronous interrupts is signaled to the interrupt logic unit 363, the interrupt control unit 363 sends out an interrupt request to the IEU 104 over INT REQ/ACK lines 340. Interrupt control unit 363 also sends a suspend prefetch signal to PC control unit 362 over lines 343, causing the PC control unit 262 to stop prefetching instructions. The IEU 104 either cancels all then-executing instructions, and flushing all tentative results, or it may allow some or all instructions to complete. In the preferred embodiments, any then-executing instructions are canceled, thereby permitting the fastest response to asynchronous interrupts. In any event, the DPC in the execution PC control unit 366 is updated to correspond to the last instruction which has been completed and retired, before the IEU 104 acknowledges the interrupt. All other prefetched instructions in MBUF, EBUF, TBUF and IFIFO 264 are also cancelled.

Only when the IEU 104 is ready to receive instructions from an interrupt handler does it send an interrupt acknowledge signal on INT REQ/ACK lines 340 back to the interrupt control unit 363. The interrupt control unit 363 then dispatches to the appropriate trap handler as described below.

3. Synchronous Exceptions

For synchronous exceptions, the interrupt control unit 363 maintains a set of four internal exception bits (not shown) for each instruction set, one bit corresponding to each instruction in the set. The interrupt control unit 363 also maintains an indication of the particular trap numbers, if any detected for each instruction.

If the VMU signals a TLB miss or another VMU exception while a particular instruction set is being prefetched, this information is transmitted to the PC logic unit 270, and in particular to the interrupt control unit 363, over the VMU control lines 332 and 334. When the interrupt control unit 363 receives such a signal, it signals the PC control unit 362 over line 343 to suspend further prefetches. At the same time, the interrupt control unit 363 sets the VM_Miss or VM_Excp bit, as appropriate, associated the prefetch buffer to which the instruction set was destined. The interrupt control unit 363 then sets all four internal exception indicator bits corresponding to that instruction set, since none of the instructions in the set are valid, and stores the trap number for the particular exception received in correspondence with each of the four instructions in the faulty instruction set. The shifting and executing of instructions prior to the faulty instruction set then continues as usual until the faulty set reaches the lowest level in the IFIFO 264.

Similarly, if other synchronous exceptions are detected during the shifting of an instruction through the prefetch buffers 260, the IDecode unit 262 or the IFIFO 264, this information is also transmitted to the interrupt control unit 363 which sets the internal exception indicator bit corresponding to the instruction generating the exception and stores the trap number in correspondence with that exception. As with prefetch synchronous exceptions, the shifting and executing of instructions prior to the faulty instruction then continues as usual until the faulty set reaches the lowest level in the IFIFO 264.

In the preferred embodiments, the only type of exception which is detected during the shifting of an instruction through the prefetch buffers 260, the IDecode unit 262 or the IFIFO 264 is a software trap instruction. Software trap instructions are detected at the IDecode stage by CF_DET unit 274. While in some embodiments other forms of synchronous exceptions may be detected in the IDecode unit 262, it is preferred that the detection of any other synchronous exceptions wait until the instruction reaches the execution unit 104. This avoids the possibility that certain exceptions, such as arising from the handling of privileged instruction, might be signaled on the basis of a processor state which could change before the effective in-order-execution of the instruction. Exceptions which do not depend on the processor state, such as illegal instruction, could be detected in the IDecode stage, but hardware is minimized if the same logic detects all pre-execution synchronous exceptions (apart from VMU exceptions). Nor is there any time penalty imposed by waiting until instructions reach the execution unit 104, since the handling of such exceptions is rarely time critical.

As mentioned, software trap instructions are detected at the IDecode stage by the CF_DET unit 274. The internal exception indicator bit corresponding to that instruction in the interrupt logic unit 363 is set and the software trap number, which can be any number from 0 to 127 and which is specified in an immediate mode operand field of the software trap instruction, is stored in correspondence with the trap instruction. Unlike prefetch synchronous exceptions, however, since software traps are treated as both a control flow instruction and as a synchronous exception, the interrupt control unit 363 does not signal PC control unit 362 to suspend prefetches when a software trap instruction is detected. Rather, at the same time the instruction is shifting through the IFIFO 264, the IFU 102 prefetches the trap handler into the MBUF instruction stream buffer.

When an instruction set reaches the lowest level of the IFIFO 264, the interrupt logic unit 363 transmits the exception indicator bits for that instruction set as a 4-bit vector to the IEU 104 over the SYNCH_INT_INFO lines 341 to indicate which, if any, of the instructions in the instruction set have already been determined to be the source of a synchronous exception. The IEU 104 does not respond immediately, but rather permits all the instructions in the instruction set to be scheduled in the normal course. Further exceptions, such as integer arithmetic exceptions, may be generated during execution. Exceptions which depend on the current state of the machine, such as due to the execution of a privileged instruction, are also detected at this time, and in order to ensure that the state of the machine is current with respect to all previous instructions in the instruction stream, all instructions which have a possibility of affecting the PSR (such as special move and returns from trap instructions) are forced to execute in order. Only when an instruction that is the source of a synchronous exception of any sort is about to be retired, is the occurrence of the exception signaled to the interrupt logic unit 363.

The IEU 104 retires all instructions which have been tentatively executed and which occur in the instruction stream prior to the first instruction which has a synchronous exception, and flushes the tentative results from any tentatively executed instructions which occur subsequently in the instruction stream. The particular instruction that caused the exception is also flushed since that instruction will typically be re-executed upon return from trap. The IF_PC in the execution PC control unit 366 is then updated to correspond to the last instruction actually retired, and the before any exception is signaled to the interrupt control unit 363.

When the instruction that is the source of an exception is retired, the IEU 104 returns to the interrupt logic unit 363, over the SYNCH_INT_INFO lines 341, both a new 4-bit vector indicating which, if any, instructions in the retiring instruction set (register 224) had a synchronous exception, as well as information indicating the source of the first exception in the instruction set. The information in the 4-bit exception vector returned by IEU 104 is an accumulation of the 4-bit exception vectors provided to the IEU 104 by the interrupt logic unit 363, as well as exceptions generated in the IEU 104. The remainder of the information returned from the IEU 104 to interrupt control unit 363, together with any information already stored in the interrupt control unit 363 due to exceptions detected on prefetch or IDecode, is sufficient for the interrupt control unit 363 to determine the nature of the highest priority synchronous exception and its trap number.

4. Handler Dispatch and Return

After an interrupt acknowledge signal is received over lines 340 from the IEU, or after a non-zero exception vector is received over lines 341, the current DPC is temporarily stored as a return address in an xPC register, which is one of the special registers 412 (FIG. 4). The current processor status register (PSR) is also stored in a previous PSR (PPSR) register, and the current compare state register (CSR) is saved in a prior compare state register (PCSR) in the special registers 412.

The address of a trap handler is calculated as a trap base register address plus an offset. The PC logic unit 270 maintains two base registers for traps, both of which are part of the special registers 412 (FIG. 4), and both of which are initialized by special move instructions executed previously. For most traps, the base register used to calculate the address of the handler is a trap base register TBR.

The interrupt control unit 363 determines the highest priority interrupt or exception currently pending and, through a look-up table, determines the trap number associated therewith. This is provided over a set of INT_OFFSET lines 373 to the prefetch PC control unit 364 as an offset to the selected base register. Advantageously, the vector address is calculated by merely concatenating the offset bits as low-order bits to the higher order bits obtained from the TBR register. This avoids any need for the delays of an adder. (As used herein, the $2^i$ bit is referred to as the i'th order bit.) For example, if traps are numbered from 0 through 255, represented as an 8 bit value, the handler address may be calculated by concatenating the 8 bit trap number to the end of a 22-bit TBR stored value. Two low-order zero bits may be appended to the trap number to ensure that the trap handler address always occurs on a word boundary. The concatenated handler address thus constructed is provided as one of the inputs, 373; to the prefetch selector PF_PC Sel 390 (FIG. 4), and is selected as the next address from which instructions are to be prefetched.

The vector handler address for traps using the TBR register are all only one word apart. Thus, the instruction at the trap handler address must be a preliminary branch instruction to a longer trap handling routine. Certain traps require very careful handling, however, to prevent degradation of system performance. TLB traps, for example, must be executed very quickly. For this reason, the preferred embodiments include a fast trap mechanism designed to allow the calling of small trap handlers without the cost of this preliminary branch. In addition, fast trap handlers can be located independently in memory, in on-chip ROM, for example, to eliminate memory system penalties associated with RAM locations.

In the preferred embodiments, the only traps which result in fast traps are the VMU exceptions mentioned above. Fast traps are numbered separately from other traps, and have a range from 0 to 7. However, they have the same priority as MMU exceptions. When the interrupt control unit 363 recognizes a fast trap as the highest priority trap then pending, it causes a fast trap base register (FTB) to be selected from the special registers 412 and provided on the lines 416 to be combined with the trap offset. The resulting vector address provided to the prefetch selector PF_PC Sel 390, via lines 373', is then a concatenation of the high-order 22 bits from the FTB register, followed by three bits representing the fast trap number, followed by seven bits of 0's. Thus, each fast trap address is 128 bytes, or 32 words apart. When called, the processor branches to the starting word and may execute programs within the block or branch out of it. Execution of small programs, such as standard TLB handling routines which may be implemented in 32 instructions or less, is faster than ordinary traps because the preliminary branch to the actual exception handling routine is obviated.

It should be noted that although all instructions have the same length of 4 bytes (i.e., occupy four address locations) in the preferred embodiments, it should be noted that the fast trap mechanism is also useful in microprocessors whose instructions are variable in length. In this case, it will be appreciated that the fast trap vector addresses be separated by enough space to accommodate at least two of the shortest instructions available on the microprocessor, and preferably about 32 average-sized instructions. Certainly, if the microprocessor includes a return from trap instruction, the vector addresses should be separated by at least enough space to permit that instruction to be preceded by at least one other instruction in the handler.

Also on dispatch to a trap handler, the processor enters both a kernel mode and an interrupted state. Concurrently, a copy of the compare state register (CSR) is placed in the prior carry state register (PCSR) and a copy of the PSR is stored in the prior PSR (PPSR) register. The kernel and interrupted states modes are represented by bits in the processor status register (PSR).

Whenever the interrupted_state bit in the current PSR is set, the shadow registers or trap registers RT[24] through RT[31], as described above and as shown in FIG. 7B, become visible. The interrupt handler may switch out of kernel mode merely by writing a new mode into the PSR, but the only way to leave the interrupted state is by executing a return from trap (RTT) instruction.

When the IEU 104 executes an RTT instruction, PCSR is restored to CSR register and PPSR register is restored to the PSR register, thereby automatically clearing the interrupt-_state bit in the PSR register. The PF_PC SEL selector 390 also selects special register xPC in the special register set 412 as the next address from which to prefetch. xPC is restored to either the MBUF PFnPC or the EBUF PFnPC as appropriate, via incrementor 394 and bus 396. The decision as to whether to restore xPC into the EBUF or MBUF PFnPC is made according to the "procedure_in_progress" bit of the PSR, once restored.

It should be noted that the processor does not use the same special register xPC to store the return address for both traps and procedural instructions. The return address for a trap is stored in the special register xPC, as mentioned, but the address to return to after a procedural instruction is stored in a different special register, uPC. Thus, the interrupted state remains available even while the processor is executing an emulation stream invoked by a procedural instruction. On the other hand, exception handling routines should not include any procedural instructions since there is no special register to store an address for return to the exception handler after the emulation stream is complete.

5. Nesting

Although certain processor status information is automatically backed up on dispatch to a trap handler, in particular CSR, PSR, the return PC, and in a sense the "A" register set ra[24] through ra[31], other context information is not protected. For example, the contents of a floating point status register (FSR) is not automatically backed up. If a trap handler intends to alter these registers, it must perform its own backup.

Because of the limited backup which is performed automatically on a dispatch to a trap handler, nesting of traps is not automatically permitted. A trap handler should back up any desired registers, clear any interrupt condition, read any information necessary for handling the trap from the system registers and process it as appropriate. Interrupts are automatically disabled upon dispatch to the trap handler. After processing, the handler can then restore the backed up registers, re-enable interrupts and execute the RTT instruction to return from the interrupt.

If nested traps are to be allowed, the trap handler should be divided into first and second portions. In the first portion, while interrupts are disabled, the xPC should be copied, using a special register move instruction, and pushed onto the stack maintained by the trap handler. The address of the beginning of the second portion of the trap handler should then be moved using the special register move instruction into the xPC, and a return from trap instruction (RTT) executed. The RTT removes the interrupted state (via the restoration of PPSR into PSR) and transfers control to the address in the xPC, which now contains the address of the second portion of the handler. The second portion may enable interrupts at this point and continue to process the exception in an interruptable mode. It should be noted that the shadow registers RT[24] through RT[31] are visible only in the first portion of this handler, and not in the second portion. Thus, in the second portion, the handler should preserve any of the "A" register values where these register values are likely to be altered by the handler. When the trap handling procedure is finished, it should restore all backed up registers, pop the original xPC off the trap handler stack and move it back into the xPC special register using a special register move instruction, and execute another RTT. This returns, control to the appropriate instruction in the main or emulation instruction stream.

6. List of Traps

The following Table I sets forth the trap numbers, priorities and handling modes of traps which are recognized in the preferred embodiments:

TABLE I

| Trap # | Handling Mode | Asynch/ Synch | Trap Name |
| --- | --- | --- | --- |
| 0-127 | normal | Synch | Trap instruction |
| 128 | normal | Synch | FP exception |
| 129 | normal | Synch | Integer arithmetic exceptions |
| 130 | normal | Synch | MMU (except TLB miss or modified) |
| 135 | normal | Synch | Unaligned memory address |
| 136 | normal | Synch | Illegal instruction |
| 137 | normal | Synch | Privileged instruction |
| 138 | normal | Synch | Debug exception |
| 144 | normal | Asynch | Performance monitor |
| 145 | normal | Asynch | Timer/Counter |
| 146 | normal | Asynch | Memory I/O error |
| 160-191 | normal | Asynch | Hardware interrupt |
| 192-253 | reserved | | |
| 254 | normal | Asynch | Machine check |
| 255 | normal | Asynch | NMI |
| 0 | fast trap | Synch | Fast MMU TLB miss |
| 1 | fast trap | Synch | Fast MMU TBL modified |
| 2-3 | fast trap | Synch | Fast MMU (reserved) |
| 4-7 | fast trap | Synch | Fast (reserved) |

II. Instruction Execution Unit

The combined control and data path portions of IEU 104 are shown in FIG. 5. The primary data path begins with the instruction/operand data bus 124 from the IFU 102. As a data bus, immediate operands are provided to an operand alignment unit 470 and passed on to a register file (REG FILE) 472. Register data is provided from the register file 472 through a bypass unit 474, via a register file output bus 476, to a parallel array of functional computing elements (FUO-n) 4780-n, via a distribution bus 480. Data generated by the functional units 4780-n is provided back to the bypass unit 474 or the register file 472, or both, via an output bus 482.

A load/store unit 484 completes the data path portion of the IEU 104. The load/store unit 484 is responsible for managing the transfer of data between the IEU 104 and CCU 106. Specifically, load data obtained from the data cache 134 of the CCU 106 is transferred by the load/store unit 484 to an input of the register file 472 via a load data bus 486. Data to be stored to the data cache 134 of the CCU 106 is received from the functional unit distribution bus 480.

The control path portion of the IEU 104 is responsible for issuing, managing, and completing the processing of information through the IEU data path. In the preferred embodiments of the present invention the IEU control path is capable of managing the concurrent execution of multiple instructions and the IEU data path provides for multiple independent data transfers between essentially all data path elements of the IEU 104. The IEU control path operates in response to instructions received via the instruction/operand bus 124. Specifically, instruction sets are received by the EDecode unit 490. In the preferred embodiments of the present invention, the EDecode 490 receives and, decodes both instruction sets held by the IFIFO master registers 216, 224. The results of the decoding of all eight instructions is variously provided to a carry checker (CRY CHKR) unit 492, dependency checker (DEP CHKR) unit 494, register renaming unit (REG RENAME) 496, instruction issuer (ISSUER) unit 498 and retirement control unit (RETIRE CTL) 500.

The carry checker unit 492 receives decoded information about the eight pending instructions from the EDecode unit 490 via control lines 502. The function of the carry checker 492 is to identify those ones of the pending instructions that either affect the carry bit of the processor status word or are dependent on the state of the carry bit. This control information is provided via control lines 504 to the instruction issuer unit 498.

Decoded information identifying the registers of the register file 472 that are used by the eight pending instructions as provided directly to the register renaming unit 496 via control lines 506. This information is also provided to the dependency checker unit 494. The function of the dependency checker unit 494 is to determine which of the pending instructions reference registers as the destination for data and which instructions, if any, are dependant on any of those destination registers. Those instructions that have register dependencies are identified by control signals provided via the control lines 508 to the register rename unit 496.

Finally, the EDecode unit 490 provides control information identifying the particular nature and function of each of the eight pending instructions to the instruction issuer unit 498 via control lines 510. The issuer unit 498 is responsible for determining the data path resources, particularly of the availability of particular functional units, for the execution of pending instructions. In accordance with the preferred embodiments of the architecture 100, instruction issuer unit 498 allows for the out-of-order execution of any of the eight pending instructions subject to the availability of data path resources and carry and register dependency constraints. The register rename unit 496 provides the instruction issuing unit 498 with a bit map, via control lines 512 of those instructions that are suitably unconstrained to allow execution. Instructions that have already been executed (done) and those with register or carry dependencies are logically removed from the bit map.

Depending on the availability of required functional units 4780-n, the instruction issuer unit 498 may initiate the execution of multiple instructions during each system clock cycle. The status of the functional units 4780-n are provided via a status bus 514 to the instruction issuer unit 498. Control signals for initiating, and subsequently managing the execution of instructions are provided by the instruction issuer unit 498 on the control lines 516 to the register rename unit 496 and selectively to the functional units 4780-n. In response, the register rename unit 496 provides register selection signals on a register file access control bus 518. The specific registers enabled via the control signals provided on the bus 518 are determined by the selection of the instruction being executed and by the determination by the register rename unit 496 of the registers referenced by that particular instruction.

A bypass control unit (BYPASS CTL) 520 generally controls the operation of the bypass data routing unit 474 via control signals on control lines 524. The bypass control unit 520 monitors the status of each of the functional units 4780-n and, in conjunction with the register references provided from the register rename unit 496 via control lines 522, determines whether data is to be routed from the register file 472 to the functional units 4780-n or whether data being produced by the functional units 4780-n can be immediately routed via the bypass unit 474 to the functional unit distribution bus 480 for use in the execution of a newly issued instruction selected by the instruction issuer unit 498. In either case, the instruction issuer unit 498 directly controls the routing of data from the distribution bus 480 to the functional units 4780-n by selectively enabling specific register data to each of the functional units 4780-n.

The remaining units of the IEU control path include a retirement control unit 500, a control flow control (CF CTI) unit 528, and a done control (DONE CTL) unit 540. The retirement control unit 500 operates to void or confirm the execution of out-of-order executed instructions. Where an instruction has been executed out-of-order, that instruction can be confirmed or retired once all prior instructions have also been retired. Based on an identification of which of the current set of eight pending instructions have been executed provided on the control lines 532, the retirement control unit 500 provides control signals on control lines 534 coupled to the bus 518 to effectively confirm the result data stored by the register file 472 as the result of the prior execution of an out-of-order executed instruction.

The retirement control unit 500 provides the PC increment/size control signals on control lines 344 to the IFU 102 as it retires each instruction. Since multiple instructions may be executed out-of-order, and therefore ready for simultaneous retirement, the retirement control unit 500 determines a size value based on the number of instructions simultaneously retired. Finally, where all instructions of the IFIFO master register 224 have been executed and retired, the retirement control unit 500 provides the IFIFO read control signal on the control line 342 to the IFU 102 to initiate an IFIFO unit 264 shift operation, thereby providing the EDecode unit 490 with an additional four instructions as instructions pending execution.

The control flow control unit 528 performs the somewhat more specific function of detecting the logical branch result of each conditional branch instruction. The control flow control unit 528 receives an 8 bit vector identification of the currently pending conditional branch instructions from the EDecode unit 490 via the control lines 510. An 8 bit vector instruction done control signal is similarly received via the control lines 532 or 542 from the done control unit 540. This done control signal allows the control flow control unit 528 to identify when a conditional branch instruction is done at least to a point sufficient to determine a conditional control flow status. The control flow status result for the pending conditional branch instructions are stored by the control flow control unit 528 as they are executed. The data necessary to determine the conditional control flow instruction outcome is obtained from temporary status registers in the register file 472 via the control lines 530. As each conditional control flow instruction is executed, the control flow control unit provides a new control flow result signal on the control lines 348 to the IFU 102. This control flow result signal preferably includes two 8 bit vectors defining whether the status results, by respective bit position, of the eight potentially pending control flow instruction are known and the corresponding status result states, also given by bit position correspondence.

Lastly, the done control unit 540 is provided to monitor the operational execution state of each of the functional units 4780-n. As any of the functional units 4780-n signal completion of an instruction execution operation, the done control unit 540 provides a corresponding done control signal on the control lines 542 to alert the register rename unit 496, instruction issuer unit 498, retirement control unit 500 and bypass control unit 520.

The parallel array arrangement of the functional units 4780-n enhances the control consistency of the IEU 104. The particular nature of the individual functional units 4780-n must be known by the instruction issuer unit 498 in order for instructions to be properly recognized and scheduled for execution. The functional units 4780-n are responsible for determining and implementing their specific control flow operation necessary to perform their requisite function. Thus, other than the instruction issuer 498, none of the IEU control units need to have independent knowledge of the control flow processing of an instruction. Together, the instruction issuer unit 498 and the functional units 4780-n provide the necessary control signal prompting of the functions to be performed by the remaining control flow managing units 496, 500, 520, 528, 540. Thus, alteration in the particular control flow operation of a functional unit 4780-n does not impact the control operation of the IEU 104. Further, the functional augmentation of an existing functional unit 4780-n and even the addition of one or more new functional units 4780-n, such as an extended precision floating point multiplier and extended precision floating point ALU, a fast fourier computation functional unit, and a trigonometric computational unit, require only minor modification of the instruction issuer unit 498. The required modifications must provide for recognition of the particular instruction, based on the corresponding instruction field isolated by the EDecode unit 490, a correlation of the instruction to the required functional unit 4780-n. Control over the selection of register date, routing of data, instruction completion and retirement remain consistent with the handling of all other instructions executed with respect to all other ones of the functional units 4780-n.

A. IEU Data Path Detail

The central element of the IEU data path is the register file 472. Within the IEU data path, however, the present invention provides for a number of parallel data paths optimized generally for specific functions. The two principal data paths are integer and floating point. Within each parallel data path, a portion of the register file 472 is provided to support the data manipulations occurring within that data path.

1. Register File Detail

The preferred generic architecture of a data path register file is shown in FIG. 6A. The data path register file 550 includes a temporary buffer 552, a register file array 554, an input selector 559, and an output selector 556. Data ultimately destined for the register file array 554 is typically first received by the temporary buffer 552 through a combined data input bus 558'. That is, all data directed to the data path register file 550 is multiplexed by the input selector 559 from a number of input buses 558, preferably two, onto the input bus 558'. Register select and enable control signals provided on the control bus 518 select the register location for the received data within the temporary buffer 552. On retirement of an instruction that produced data stored in the temporary buffer, control signals again provided on the control bus 518 enable the transfer of the data from the temporary buffer 552 to a logically corresponding register within the register file array 554 via the data bus 560. However, prior to retirement of the instruction, data stored in the registers of the temporary buffer 552 may be utilized in the execution of subsequent instructions by routing the temporary buffer stored data to the output data selector 556 via a bypass portion of the data bus 560. The selector 556, controlled by a control signal provided via the control bus 518 selects between data provided from the registers of the temporary buffer 552 and of the register file array 554. The resulting data is provided on the register file output bus 563. Also, where an executing instruction will be retired on completion, i:., the instruction has been executed in-order, the input selector 559 can be directed to route the result data directly to the register file array 554 via bypass extension 558''.

In accordance with the preferred embodiments of the present invention, each data path register file 550 permits two simultaneous register operations to occur. Thus, the input bus 558 provides for two full register width data values to be written to the temporary buffer 552. Internally, the temporary buffer 552 provides a multiplexer array permitting the simultaneous routing of the input data to any two registers within the temporary buffer 552. Similarly, internal multiplexers allow any five registers of the temporary buffer 552 to be selected to output data onto the bus 560. The register file array 554 likewise includes input and output multiplexers allowing two registers to be selected to receive, on bus 560, or five to source, via bus 562, respective data simultaneously. Finally, the register file output selector 556 is preferably implemented to allow any five of the ten register data values received via the buses 560, 562 to be simultaneously output on the register file output bus 563.

The register set within the temporary buffer is generally shown in FIG. 6B. The register set 552' consists of eight single word (32 bit) registers I0RD, I1RD . . . I7RD. The register set 552' may also be used as a set of four double word registers I0RD, I0RD+1 (I4RD), I1RD, I1RD+1 (I5RD) . . . I3RD, I3RD+1 (I7RD).

In accordance with the present invention, rather than provide duplicate registers for each of the registers within the register file array 554, the registers in the temporary buffer register set 552 are referenced by the register rename unit 496 based on the relative location of the respective instructions within the two IFIFO master registers 216, 224. Each instruction implemented by the architecture 100 may reference for output up to two registers, or one double word register, for the destination of data produced by the execution of the instruction. Typically, an instruction will reference only a single output register. Thus, for an instruction two ($I_2$) of the eight pending instructions, positionally identified as shown in FIG. 6C and that references a single output register, the data destination register I2RD will be selected to receive data produced by the execution of the instruction. Where the data produced by the instruction $I_2$ is used by a subsequent instruction, for example, $I_5$, the data stored in the I2RD register will be transferred out via the bus 560 and the resultant data stored back to the temporary buffer 552 into the register identified as I5RD. Notably, instruction $I_5$ is dependent on instruction $I_2$. Instruction $I_5$ cannot be executed until the result data from $I_2$ is available. However, as can be seen, instruction $I_5$ can execute prior to the retirement of instruction $I_2$ by obtaining its required input data from the instruction $I_2$ data location of the temporary buffer 552'.

Finally, as instruction $I_2$ is retired, the data from the register I2RD is written to the register location within the register file array 554 as determined by the logical position of the instruction at the point of retirement. That is, the retirement control unit 500 determines the address of the destination registers in the register file array from the register reference field data provided from the EDecode unit 490 on the control lines 510. Once instructions $I_{0-3}$ have been retired, the values in I4RD-I7RD are shifted into I0RD-I3RD simultaneous with a shift of the IFIFO unit 264.

A complication arises where instruction I2 provides a double word result value. In accordance with a preferred embodiment of the present invention, a combination of locations I2RD and I6RD is used to store the data resulting from instruction $I_2$ until that instruction is retired or otherwise cancelled. In the preferred embodiment, execution of instructions $I_{4-7}$ are held where a double word output reference by any of the instructions $I_{0-3}$ is detected by the register rename unit 496. This allows the entire temporary buffer 552' to be used as a single bank of double word registers. Once instructions $I_{0-3}$ have been retired, the temporary buffer 552' can again be used as two banks of single word registers. Further, the execution of any instruction $I_{4-7}$ is held where a double word output register is required until the instruction has been shifted into a corresponding $I_{0-3}$ location.

The logical organization of the register file array 554 is shown in FIGS. 7A and 7B. In accordance with the preferred embodiments of the present invention, the register file array 554 for the integer data path consists of 4032-bit wide registers. This set of registers, constituting a register set "A", is organized as a base register set ra[0..23] 565, a top set of general purpose registers ra[24..31] 566, and a shadow register set of eight general purpose trap registers rt[24..31]. In normal operation, the general purpose registers ra[0..31] 565, 566 constitutes the active "A" register set of the register file array for the integer data path.

As shown in FIG. 7B the trap registers rt[24..31] 567 may be swapped into the active register set "A" to allow access along with the active base set of registers ra[0..23] 565. This configuration of the "A" register set is selected upon the acknowledgement of an interrupt or the execution of an exception trap handling routine. This state of the register set "A" is maintained until expressly returned to the state shown in FIG. 7A by the execution of an enable interrupts instruction or execution of a return from trap instruction.

In the preferred embodiment of the present invention as implemented by the architecture 100, the floating point data path utilizes an extended precision register file array 572 as generally shown in FIG. 8. The register file array 572 consists of 32 registers, rf[0..31], each having a width of 64 bits. The floating point register file 572 may also be logically referenced as a "B" set of integer registers rb[0..31]. In the architecture 100, this "B" set of registers is equivalent to the low-order 32 bits of each of the floating point registers rf[0..31].

Representing a third data path, a boolean operator register set 574 is provided, as shown in FIG. 9, to store the logical result of boolean combinatorial operations. This "C" register set 574 consists of 32 single bit registers, rc[0..31]. The operation of the boolean register set 574 is unique in that the results of boolean operations can be directed to any instruction selected register of the boolean register set 574. This is in contrast to utilizing a single processor status word register that stores single bit flags for conditions such as equal, not equal, greater than and other simple boolean status values.

Both the floating point register set 572 and the boolean register set 574 are complimented by temporary buffers architecturally identical to the integer temporary buffer 552 shown in FIG. 6B. The essential difference is that the width of the temporary buffer registers is defined to be identical to those of the complimenting register file array 572, 574; in the preferred implementation, 64 bits and one bit, respectively.

A number of additional special registers are at least logically present in the register file 472. The registers that are physically present in the register file 472, as shown in FIG. 7C, include a kernel stack pointer 568, processor state register (PSR) 569, previous processor state register (PPSR) 570, and an array of eight temporary processor state registers (tPSR [0..7]) 571. The remaining special registers are distributed throughout various parts of the architecture 100. The special address and data bus 354 is provided to select and transfer data between the special registers and the "A" and "B" sets of registers. A special register move instruction is provided to select a register from either the "A" or "B" register set, the direction of transfer and to specify the address identifier of a special register.

The kernel stack pointer register and temporary processor state registers differ from the other special registers. The kernel stack pointer may be accessed through execution of a standard register to register move instruction when in kernel state. The temporary processor state registers are not directly accessible. Rather, this array of registers is used to implement an inheritance mechanism for propagating the value of the processor state register for use by out-of-order executing instructions. The initial propagation value is that of the processor state register: the value provided by the last retired instruction. This initial value is propagated forward through the temporary processor state registers so that any out-of-order executing instruction has access to the value in the positionally corresponding temporary processor state register. The specific nature of an instruction defines the condition code bits, if any, that the instruction is dependent on and may change. Where an instruction is unconstrained by dependencies, register or condition code as determined by the register dependency checker unit 494 and carry dependency checker 492, the instruction can be executed out-of-order. Any modification of the condition code bits of the processor state register are directed to the logically corresponding temporary processor state register. Specifically, only those bits that may change are applied to the value in the temporary processor state register and propagated to all higher order temporary processor state registers. Consequently, every out-of-order executed instruction executes from a processor state register value modified appropriately by any intervening PSR modifying instructions. Retirement of an instruction only transfers the corresponding temporary processor state registers value to the PSR register 569.

The remaining special registers are described in Table II.

TABLE II

Special Registers

| Reg | Special Move R/W | Description: |
|---|---|---|
| PC | R | Program Counters: in general, PCs maintain the next address of the currently executing program instruction stream. |
| IF_PC | R/W | IFU Program Counter: the IF_PC maintains the precise next execution address. |
| PFnPCs | R | Prefetch Program Counters.: the MBUF, TBUF and EBUF PFnPCs maintain the next prefetch instruction addresses for the respective prefetch instruction streams. |
| uPC | R/W | Micro-Program Counter: maintains the address of the instruction following a procedural instruction. This is the address of the first instruction to be executed upon return from a procedural routine. |
| xPC | R/W | Interrupt/Exception Program Counter: holds the return address of an interrupt or and exception. The return address is the address of the IF_PC at the time of the trap. |
| TBR | W | Trap Base Register: base address of a vector table used for trap handling routine dispatching. Each entry is one word long. The trap number, provided by Interrupt Logic Unit 363, is used as an index into the table pointed to by this address. |
| FTB | W | Fast Trap Base Register: base address of an immediate trap handling routine table. Each table entry is 32 words and is used to directly implement a trap handling routine. The trap number, provided by Interrupt Logic Unit 363, times 32 is used as an offset into the table pointed to by this address. |
| PBR | W | Procedural Base Register: base address of a vector table used for procedural routine dispatching. Each entry is one word long, aligned on four word boundaries. The procedure number, provided as a procedural instruction field, is used as an index into the table pointed to by this address. |
| PSR | R/W | Processor State Register: maintains the processor status word. Status data bits include: carry, overflow, zero, negative, processor mode, current interrupt level, procedural routine being executed, divide by 0, overflow exception, hardware function enables, procedural enable, interrupt enable. |
| PPSR | R/W | Previous Processor State Register: loaded from the PSR on successful completion of an instruction or when an interrupt or trap is taken. |

TABLE II-continued

Special Registers

| Reg | Special Move R/W | Description: |
|---|---|---|
| CSR | RW | Compare State (Boolean) Register: the boolean register set accessible as a single word. |
| PCSR | R/W | Previous Compare State Register: loaded from the CSR on successful completion of an instruction or when an interrupt or trap is taken. |

2. Integer Data Path Detail

The integer data path of the IEU 104, constructed in accordance with the preferred embodiment of the present invention, is shown in FIG. 10. For purposes of clarity, the many control path connections to the integer data path 580 are not shown. Those connections are defined with respect to FIG. 5.

Input data for the data path 580 is obtained from the alignment units 582, 584 and the integer load/store unit 586. Integer immediate data values, originally provided as an instruction embedded data field are obtained from the operand unit 470 via a bus 588. The alignment unit 582 operates to isolate the integer data value and provide the resulting value onto the output bus 590 to a multiplexer 592. A second input to the multiplexer 592 is the special register address and data bus 354.

Immediate operands obtained from the instruction stream are also obtained from the operand unit 470 via the data bus 594. These values are again right justified by the alignment unit 584 before provision onto an output bus 596.

The integer load/store unit 586 communicates bi-directionally via the external data bus 598 with the CCU 106. Inbound data to the IEU 104 is transferred by the integer load/store unit 586 onto the input data bus 600 to an input latch 602. Data output from the multiplexer 592 and latch 602 are provided on the multiplexer input buses 604, 606 of a multiplexer 608. Data from the functional unit output bus 482' is also received by the multiplexer 608. This multiplexer 608, in the preferred embodiments of the architecture 100, provides for two simultaneous data paths to the output multiplexer buses 610. Further, the transfer of data through the multiplexer 608 can be completed within each half cycle of the system clock. Since most instructions implemented by the architecture 100 utilize a single destination register, a maximum of four instructions can provide data to the temporary buffer 612 during each system clock cycle.

Data from the temporary buffer 612 can be transferred to an integer register file array 614, via temporary register output buses 616 or to a output multiplexer 620 via alternate temporary buffer register buses 618. Integer register array output buses 622 permit the transfer of integer register data to the multiplexer 620. The output buses connected to the temporary buffer 612 and integer register file array 614 each permit five register values to be output simultaneously. That is, two instructions referencing a total of up to five source registers can be issued simultaneously. The temporary buffer 612, register file array 614 and multiplexer 620 allow outbound register data transfers to occur every half system clock cycle. Thus, up to four integer and floating point instructions may be issued during each clock cycle.

The multiplexer 620 operates to select outbound register data values from the register file array 614 or directly from the temporary buffer 612. This allows out-of-order executed instructions with dependencies on prior out-of-order executed instructions to be executed by the IEU 104. This facilitates the twin goals of maximizing the execution through-put capability of the IEU integer data path by the out-of-order execution of pending instructions while precisely segregating out-of-order data results from data results produced by instructions that have been executed and retired. Whenever an interrupt or other exception condition occurs that requires the precise state of the machine to be restored, the present invention allows the data values present in the temporary buffer 612 to be simply cleared. The register file array 614 is therefore left to contain precisely those data values produced only by the execution of instructions completed and retired prior to the occurrence of the interrupt or other exception condition.

The up to five register data values selected during each half system clock cycle operation of the multiplexer 620 are provided via the multiplexer output buses 624 to an integer bypass unit 626. This bypass unit 626 is, in essence, a parallel array of multiplexers that provide for the routing of data presented at any of its inputs to any of its outputs. The bypass unit 626 inputs include the special register addressed data value or immediate integer value via the output bus 604 from the multiplexer 592, the up to five register data values provided on the buses 624, the load operand data from the integer load/store unit 586 via the double integer bus 600, the immediate operand value obtained from the alignment unit 584 via its output bus 596, and, finally, a bypass data path from the functional unit output bus 482'. This bypass data path, and the data bus 482', provides for the simultaneous transfer of four register values per system clock cycle.

Data is output by the bypass unit 626 onto an integer bypass bus 628 that is connected to the floating point data path, to two operand data buses providing for the transfer out of up to five register data values simultaneously, and a store data bus 632 that is used to provide data to the integer load/store unit 586.

The functional unit distribution bus 480 is implemented through the operation of a router unit 634. Again, the router unit 634 is implemented by a parallel array of multiplexers that permit five register values received at its inputs to be routed to the functional units provided in the integer data path. Specifically, the router unit 634 receives the five register data values provided via the buses 630 from the bypass unit 626, the current IF_PC address value via the address bus 352 and the control flow offset value determined by the PC control unit 362 and as provided on the lines 378'. The router unit 634 may optionally receive, via the data bus 636 an operand data value sourced from a bypass unit provided within the floating point data path.

The register data values received by the router unit 634 may be transferred onto the special register address and data bus 354 and to the functional units 640, 642, 644. Specifically, the router unit 634 is capable of providing up to three register operand values to each of the functional units 640, 642, 644 via router output buses 646, 648, 650. Consistent with the general architecture of the architecture 100, up to two instructions could be simultaneously issued to the functional units 640, 642, 644. The preferred embodiment of the present invention provides for three dedicated integer functional units, implementing respectively a programmable shift function and two arithmetic logic unit functions.

An ALU0 functional unit 644, ALU1 functional unit 642 and shifter functional unit 640 provide respective output register data onto the functional unit bus 482'. The output data produced by the ALU0 and shifter functional unit 644, 640 are also provided onto a shared integer functional unit bus 650 that is coupled into the floating point data path. A similar floating point functional unit output value data bus 652 is provided from the floating point data path to the functional unit output bus 482'.

The ALU0 functional unit 644 is used also in the generation of virtual address values in support of both the prefetch operations of the IFU 102 and data operations of the integer load/store unit 586. The virtual address value calculated by the ALU0 functional unit 644 is provided onto an output bus 654 that connects to both the target address bus 346 of the IFU 102 and to the CCU 106 to provide the execution unit physical address (EX PADDR). A latch 656 is provided to store the virtualizing portion of the address produced by the ALU0 functional unit 644. This virtualizing portion of the address is provided onto an output bus 658 to the VMU 108.

3. Floating Point Data Path Detail

Referring now to FIG. 11, the floating point data path 660 is shown. Initial data is again received from a number of sources including the immediate integer operand bus 588, immediate operand bus 594 and the special register address data bus 354. The final source of external data is a floating point load/store unit 662 that is coupled to the CCU 106 via the external data bus 598.

The immediate integer operand is received by an alignment unit 664 that functions to right justify the integer data field before submission to a multiplexer 666 via an alignment output data bus 668. The multiplexer 666 also receives the special register address data bus 354. Immediate operands are provided to a second alignment unit 670 for right justification before being provided on an output bus 672. Inbound data from the floating point load/store unit 662 is received by a latch 674 from a load data bus 676. Data from the multiplexer 666, latch 674 and a functional unit data return bus 482" is received on the inputs of a multiplexer 678. The multiplexer 678 provides for selectable data paths sufficient to allow two register data values to be written to a temporary buffer 680, via the multiplexer output buses 682, each half cycle of the system clock. The temporary buffer 680 incorporates a register set logically identical to the temporary buffer 552' as shown in FIG. 6B. The temporary buffer 680 further provides for up to five register data values to be read from the temporary buffer 680 to a floating point register file array 684, via data buses 686, and to an output multiplexer 688 via output data buses 690. The multiplexer 688 also receives, via data buses 692, up to five register data values from the floating point register file array 684 simultaneously. The multiplexer 688 functions to select up to five register data values for simultaneous transfer to a bypass unit 694 via data buses 696. The bypass unit 694 also receives the immediate operand value provided by the alignment unit 670 via the data bus 672, the output data bus 698 from the multiplexer 666, the load data bus 676 and a data bypass extension of the functional unit data return bus 482". The bypass unit 694 operates to select up to five simultaneous register operand data values for output onto the bypass unit output buses 700, a store data bus 702 connected to the floating point load/store unit 662, and the floating point bypass bus 636 that connects to the router unit 634 of the integer data path 580.

A floating point router unit 704 provides for simultaneous selectable data paths between the bypass unit output buses 700 and the integer data path bypass bus 628 and functional unit input buses 706, 708, 710 coupled to the respective functional units 712, 714, 716. Each of the input buses 706, 708, 710, in accordance with the preferred embodiment of the architecture 100, permits the simultaneous transfer of up to three register operand data values to each of the functional unit 712, 714, 716. The output buses of these functional units 712, 714, 716 are coupled to the functional unit data return bus 482" for returning data to the register file input multiplexer 678. The integer data path functional unit output bus 650 may also be provided to connect to the functional unit data return bus 482". The architecture 100 does provide for a connection of the functional unit output buses of a multiplier functional unit 712 and a floating point ALU 714 to be coupled via the floating point data path functional unit bus 652 to the functional unit data return bus 482' of the integer data path 580.

4. Boolean Register Data Path Detail

The boolean operations data path 720 is shown in FIG. 12. This data path 720 is utilized in support of the execution of essentially two types of instructions. The first type is an operand comparison instruction where two operands, selected from the integer register sets, floating point register sets or provided as immediate operands, are compared by subtraction in one of the ALU functional units of the integer and floating point data paths. Comparison is performed by a subtraction operation by any of the ALU functional units 642, 644, 714, 716 with the resulting sign and zero status bits being provided to a combined input selector and comparison operator unit 722. This unit 722, in response to instruction identifying control signals received from the EDecode unit 490, selects the output of an ALU functional unit 642, 644, 714, 716 and combines the sign and zero bits to extract a boolean comparison result value. An output bus 723 allows the results of the comparison operation to be transferred simultaneously to an input multiplexer 726 and a bypass unit 742. As in the integer and floating point data paths, the bypass unit 742 is implemented as a parallel array of multiplexers providing multiple selectable data paths between the inputs of the bypass unit 742 to multiple outputs. The other inputs of the bypass unit 742 include a boolean operation result return data bus 724 and two boolean operands on data buses 744. The bypass unit 742 permits boolean operands representing up to two simultaneously executing boolean instructions to be transferred to a boolean operation functional unit 746, via operand buses 748. The bypass unit 742 also permits transfer of up to two single bit boolean operand bits (CF0, CF1) to be simultaneously provided on the control flow result control lines 750, 752.

The remainder of the boolean operation data path 720 includes the input multiplexer 726 that receives as its inputs, the comparison and the boolean operation result values provided on the comparison result bus 723 and a boolean result bus 724. The bus 724 permits up to two simultaneous boolean result bits to be transferred to the multiplexer 726. In addition, up to two comparison result bits may be transferred via the bus 723 to the multiplexer 726. The multiplexer 726 permits any two single bits presented at the multiplexer inputs to be transferred via the multiplexer output buses 730 to a boolean operation temporary buffer 728 during each half cycle of the system clock. The temporary buffer 728 is logically equivalent to the temporary buffer 552' as shown in FIG. 6B, though differing in two significant respects. The first respect is that each register entry in the temporary buffer 728 consists of a single bit. The second distinction is that only a single register is provided for each of the eight pending instruction slots, since the result of a boolean operation is, by definition, fully defined by a single result bit.

The temporary buffer 728 provides up to four output operand values simultaneously. This allows the simultaneous execution of two boolean instructions, each requiring access to two source registers. The four boolean register values may be transferred during each half cycle of the system clock onto the operand buses 736 to a multiplexer 738 or to a boolean register file array 732 via the boolean operand data buses 734. The boolean register file array 732, as logically depicted in FIG. 9, is a single 32 bit wide data register that permits any separate combination of up to four single bit locations to be modified with data from the temporary buffer 728 and read from the boolean register file array 732 onto the output buses 740 during each half cycle of the system clock. The multiplexer 738 provides for any two pairs of boolean operands received at its inputs via the buses 736, 740 to be transferred onto the operand output buses 744 to the bypass unit 742.

The boolean operation functional unit 746 is capable of performing a wide range of boolean operations on two source values. In the case of comparison instructions, the source values are a pair of operands obtained from any of the integer and floating point register sets and any immediate operand provided to the IEU 104, and, for a boolean instruction, any two of boolean register operands. Tables III and IV identify the logical comparison operations provided by the preferred embodiment of the architecture 100. Table V identifies the direct boolean operations provided by the preferred implementation of the architecture 100. The instruction condition codes and function codes specified in the Tables III-V represent a segment of the corresponding instructions. The instruction also provides an identification of the source pair of operand registers and the destination boolean register for storage of the corresponding boolean operation result.

TABLE III

Integer Comparison

| Condition* | Symbol | Instruction Condition Code |
|---|---|---|
| rs1 greater than rs2 | > | 0000 |
| rs1 greater than or equal to rs2 | >= | 0001 |
| rs1 less than rs2 | < | 0010 |
| rs1 less than or equal to rs2 | <= | 0011 |
| rs1 unequal to rs2 | != | 0100 |
| rs1 equal to rs2 | == | 0101 |
| reserved |  | 0110 |
| unconditional |  | 1111 |

*rs = register source

TABLE IV

Floating Point Comparison

| Condition | Symbol | Instruction Cond. Code |
|---|---|---|
| rs1 greater than rs2 | > | 0000 |
| rs1 greater than or equal to rs2 | >= | 0001 |
| rs1 less than rs2 | < | 0010 |
| rs1 less than or equal to rs2 | <= | 0011 |
| rs1 unequal to rs2 | != | 0100 |
| rs1 equal to rs2 | == | 0101 |
| unordered | ? | 1000 |
| unordered or rs1 greater than rs2 | ?> | 1001 |
| unordered, rs1 greater than or equal to rs2 | ?>= | 1010 |
| unordered or rs1 less than rs2 | ?< | 1011 |
| unordered or rs1 less than or equal to rs2 | ?<= | 1100 |
| unordered or rs1 equal to rs2 | ?= | 1101 |
| reserved |  | 1110-1111 |

TABLE V

Boolean Operation

| Operation* | Symbol | Instruction Function Code |
|---|---|---|
| 0 | Zero | 0000 |
| bs1 & bs2 | AND | 0001 |
| bs1 & ~bs2 | ANN2 | 0010 |
| bs1 | bs1 | 0011 |
| ~bs1 & bs2 | ANN1 | 0100 |
| bs2 | bs2 | 0101 |
| bs1 ^ bs2 | XOR | 0110 |
| bs1 | bs2 | OR | 0111 |
| ~bs1 and ~bs2 | NOR | 1000 |
| ~bs1 ^ bs2 | XNOR | 1001 |
| ~bs2 | NOT2 | 1010 |
| bs1 | ~bs2 | ORN2 | 1011 |
| ~bs1 | NOT1 | 1100 |
| ~bs1 | bs2 | ORN1 | 1101 |
| ~bs1 | ~bs2 | NAND | 1110 |
| 1 | ONE | 1111 |

*bs = boolean source register

B. Load Store Control Unit

An exemplary load/store unit 760 is shown in FIG. 13. Although separately shown in the data paths 580, 660, the load/store units 586, 662 are preferably implemented as a single shared load/store unit 760. The interface from a respective data path 580, 660 is via an address bus 762 and load and store data buses 764 (600, 676), 766 (632, 702).

The address utilized by the load/store unit 760 is a physical address as opposed to the virtual address utilized by the IFU 102 and the remainder of the IEU 104. While the IFU 102 operates on virtual addresses, relying on coordination between the CCU 106 and VMU 108 to produce a physical address, the IEU 104 requires the load/store unit 760 to operate directly in a physical address mode. This requirement is necessary to insure data integrity in the presence of out-of-order executed instructions that may involve overlapping physical address data load and store operations and in the presence of out-of-order data returns from the CCU 106 to the load/store unit 760. In order to insure data integrity, the load/store unit 760 buffers data provided by store instructions until the store instruction is retired by the IEU 104. Consequently, store data buffered by the load store unit 760 may be uniquely present only in the load/store unit 760. Load instructions referencing the same physical address as executed but not retired store instructions are delayed until the store instruction is actually retired. At that point the store data may be transferred to the CCU 106 by the load/store unit 760 and then immediately loaded back by the execution of a CCU data load operation.

Specifically, full physical addresses are provided from the VMU 108 onto the load/store address bus 762. Load addresses are, in general, stored in load address registers $768_{3-0}$. Store addresses are latched into store address registers $770_{3-0}$. A load/store control unit 774 operates in response to control signals received from the instruction issuer unit 498 in order to coordinate latching of load and store addresses into the registers $768_{3-0}$, $770_{3-0}$. The load/store control unit 774 provides control signals on control lines 778 for latching load addresses and on control lines 780 for latching store addresses. Store data is latched simultaneous with the latching of store addresses in logically corresponding slots of the store data register set $782_{3-0}$. A 4×4×32 bit wide address comparator unit 772 is simultaneously provided with each of the addresses in the load and store address registers $768_{3-0}$, $770_{3-0}$. The execution of a full matrix address comparison during each half cycle of the system clock is controlled by the load/store control unit 774 via control lines 776. The existence and logical location of a load address that matches a store address is provided via control signals returned to the load store control unit 774 via control lines 776.

Where a load address is provided from the VMU 108 and there are no pending stores, the load address is bypassed directly from the bus 762 to an address selector 786 concurrent with the initiation of a CCU load operation. However, where store data is pending, the load address will be latched in an available load address latch $768_{3-0}$. Upon receipt of a control signal from the retirement control unit 500, indicating that the corresponding store data instruction is retiring, the load/store control unit 774 initiates a CCU data transfer operation by arbitrating, via control lines 784 for access to the CCU 106. When the CCU 106 signals ready, the load/store control unit 774 directs the selector 786 to provide a CCU physical address onto the CCU PADDR address bus 788. This address is obtained from the corresponding store register $770_{3-0}$ via the address bus 790. Data from the corresponding store data register $782_{3-0}$ is provided onto the CCU data bus 792.

Upon issuance of load instruction by the instruction issuer 498, the load store control unit 774 enables one of the load address latches $768_{3-0}$ to latch the requested load address. The specific latch $768_{3-0}$ selected logically corresponds to the position of the load instruction in the relevant instruction set. The instruction issuer 498 provides the load/store control unit 774 with a five bit vector identifying the load instruction within either of the two possible pending instruction sets. Where the comparator 772 does not identify a matching store address, the load address is routed via an address bus 794 to the selector 786 for output onto the CCU PADDR address bus 788. Provision of the address is performed in concert with CCU request and ready control signals being exchanged between the load/store control unit 774 and CCU 106. An execution ID value (ExID) is also prepared and issued by the load/store control unit 774 to the CCU 106 in order to identify the load request when the CCU 106 subsequently returns the requested data including ExID value. This ID value consists of a four bit vector utilizing unique bits to identify the respective load address latch $768_{3-0}$ from which the current load request is generated. A fifth bit is utilized to identify the instruction set that contains the load instruction. The ID value is thus the same as the bit vector provided with the load request from the instruction issuer unit 498.

On subsequent signal from the CCU 106 to the load/store control unit 774 of the availability of prior requested load data, the load/store control unit 774 enables an alignment unit to receive the data and provide it on the load data bus 764. An alignment unit 798 operates to right justify the load data.

Simultaneously with the return of data from the CCU 106, the load/store control unit 774 receives the ExID value from the CCU 106. The load/store control unit 774, in turn, provides a control signal to the instruction issuer unit 498 identifying that load data is being provided on the load data bus 764 and, further, returns a bit vector identifying the load instruction for which the load data is being returned.

C. IEU Control Path Detail

Referring again to FIG. 5, the operation of the IEU control path will now be described in detail with respect to the timing diagram provided in FIG. 14. The timing of the execution of instructions represented in FIG. 14 is exemplary of the operation of the present invention, and not exhaustive of execution timing permutations.

The timing diagram of FIG. 14 shows a sequence of processor system clock cycles, $P_{0-6}$. Each processor cycle begins with an internal T Cycle, $T_0$. There are two T cycles per processor cycle in a preferred embodiment of the present invention as provided for by the architecture 100.

In processor cycle zero, the IFU 102 and the VMU 108 operate to generate a physical address. The physical address is provided to the CCU 106 and an instruction cache access operation is initiated. Where the requested instruction set is present in the instruction cache 132, an instruction set is returned to the IFU 102 at about the mid-point of processor cycle one. The IFU 102 then manages the transfer of the instruction set through the prefetch unit 260 and IFIFO 264, whereupon the instruction set is first presented to the IEU 104 for execution.

1. EDecode Unit Detail

The EDecode unit 490 receives the full instruction set in parallel for decoding prior to the conclusion of processor cycle one. The EDecode unit 490, in the preferred architecture 100, is implemented as a pure combinatorial logic block that provides for the direct parallel decoding of all valid instructions that are received via the bus 124. Each type of instruction recognized by the architecture 100, including the specification of the instruction, register requirements and resource needs are identified in Table VI.

TABLE VI

Instruction/Specifications

| Instruction | Control and Operand Information* |
|---|---|
| Move Register to Register | Logical/Arithmetic Function Code: specifies Add, Subtract, Multiply, Shift, etc. Destination Register Set PSR only Source Register 1 Source Register 2 or Immediate constant value Register Set A/B select |
| Move Immediate to Register | Destination Register Immediate Integer or Floating Point constant value Register Set A/B select |
| Load/Store Register | Operation Function Code: specifies Load or Store, use immediate value, base and immediate value, or base and offset Source/Destination Register Base Register Index Register or Immediate constant value Register Set A/B select |
| Immediate Call Control Flow | Signed Immediate Displacement Operation Function Code: specifies branch type and triggering condition Base Register Index Register, Immediate constant displacement value, or Trap Number Register Set A/B select |
| Special Register Move | Operation Function Code: specifies move to/from special/integer register Special Register Address Identifier Source/Destination Register Register Set A/B select |
| Convert Integer Move | Operation Function Code: specifies type of floating point to integer conversion Source/Destination Register Register Set A/B select |
| Boolean Functions | Boolean Function Code: specifies And, Or, etc. Destination boolean register Source Register 1 Source Register 2 Register Set A/B select |
| Extended Procedure | Procedure specifier: specifies address offset from procedural base value Operation: value passed to procedure routine |
| Atomic Procedure | Procedure specifier: specifies address value |

*instruction includes these fields in addition to a field that decodes to identify the instruction.

The EDecode unit 490 decodes each instruction of an instruction set in parallel. The resulting identification of instructions, instruction functions, register references and function requirements are made available on the outputs of the EDecode unit 490. This information is regenerated and latched by the EDecode unit 490 during each half processor cycle until all instructions in the instruction set are retired. Thus, information regarding all eight pending instructions is constantly maintained at the output of the EDecode unit 490. This information is presented in the form of eight element bit vectors where the bits or sub-fields of each vector logically correspond to the physical location of the corresponding instruction within the two pending instruction sets. Thus, eight vectors are provided via the control lines 502 to the carry checker 492, where each vector specifies whether the corresponding instruction affects or is dependant on the carry bit of the processor status word. Eight vectors are provided via the control lines 510 to identify the specific nature of each instruction and the function unit requirements. Eight vectors are provided via the control lines 506 specifying the register references used by each of the eight pending instructions. These vectors are provided prior to the end of processor cycle one.

2. Carry Checker Unit Detail

The carry checker unit 492 operates in parallel with the dependency check unit 494 during the data dependency phase of operation shown in FIG. 14. The carry check unit 492 is implemented in the preferred architecture 100 as pure combinatorial logic. Thus, during each iteration of operation by the carry checker unit 492, all eight instructions are considered with respect to whether they modify the carry flag of the processor state register. This is necessary in order to allow the out-of-order execution of instructions that depend on the state of the carry bit as set by prior instructions. Control signals provided on the control lines 504 allow the carry check unit 492 to identify the specific instructions that are dependant on the execution of prior instructions with respect to the carry flag.

In addition, the carry checker unit 492 maintains a temporary copy of the carry bit for each of the eight pending instructions. For those instructions that do not modify the carry bit, the carry checker unit 492 propagates the carry bit to the next instruction forward in the order of the program instruction stream. Thus, an out-of-order executed instruction that modifies the carry bit can be executed and, further, a subsequent instruction that is dependant on such an out-of-order executed instruction may also be allowed to execute, though subsequent to the instruction that modifies the carry bit. Further, maintenance of the carry bit by the carry checker unit 492 facilitates out-of-order execution in that any exception occurring prior to the retirement of those instructions merely requires the carry checker unit 492 to clear the internal temporary carry bit register. Consequently, the processor status register is unaffected by the execution of out-of-order executed instructions. The temporary bit carry register maintained by the carry checker unit 492 is updated upon completion of each out-of-order executed instruction. Upon retirement of out-of-order executed instructions, the carry bit corresponding to the last retired instruction in the program instruction stream is transferred to the carry bit location of the processor status register.

3. Data Dependency Checker Unit Detail

The data dependency checker unit 494 receives the eight register reference identification vectors from the EDecode unit 490 via the control lines 506. Each register reference is indicated by a five bit value, suitable for identifying any one of 32 registers at a time, and a two bit value that identifies the register bank as located within the "A", "B" or boolean register sets. The floating point register set is equivalently identified as the "B" register set. Each instruction may have up to three register reference fields: two source register fields and one destination. Although some instructions, most notably the move register to register instructions, may specify a destination register, an instruction bit field recognized by the EDecode unit 490 may signify that no actual output data is to be produced. Rather, execution of the instruction is only for the purpose of determining an alteration of the value of the processor status register.

The data dependency checker 494, implemented again as pure combinatorial logic in the preferred architecture 100, operates to simultaneously determine dependencies between source register references of instructions subsequent in the program instruction stream and destination register references of relatively prior instructions. A bit array is produced by the data dependency checker 494 that identifies not only which instructions are dependant on others, but also the registers upon which each dependency arises.

The carry and register data dependencies are identified shortly after the beginning of the second processor cycle.

4. Register Rename Unit Detail

The register rename unit 496 receives the identification of the register references of all eight pending instructions via the control lines 506, and register dependencies via the control lines 508. A matrix of eight elements is also received via the control lines 532 that identify those instructions within the current set of pending instructions that have been executed (done). From this information, the register rename unit 496 provides an eight element array of control signals to the instruction issuer unit 498 via the control lines 512. The control information so provided reflects the determination made by the register rename unit 496 as to which of the currently pending instructions, that have not already been executed, are now available to be executed given the current set of identified data dependencies. The register rename unit 496 receives a selection control signal via the lines 516 that identifies up to six instructions that are to be simultaneously issued for execution: two integer, two floating point and two boolean.

The register rename unit 496 performs the additional function of selecting, via control signals provided on the bus 518 to the register file 472, the source registers for access in the execution of the identified instructions. Destination registers for out-of-order executed instructions are selected as being in the temporary buffers 612, 680, 728 of the corresponding data path. In-order executed instructions are retired on completion with result data being stored through to the register file arrays 614, 684, 732. The selection of source registers depends on whether the register has been prior selected as a destination and the corresponding prior instruction has not yet been retired. In such an instance, the source register is selected from the corresponding temporary buffer 612, 680, 728. Where the prior instruction has been retired, then the register of the corresponding register file array 614, 684, 732 is selected. Consequently, the register rename unit 496 operates to effectively substitute temporary buffer register references for register file register references in the case of out-of-order executed instructions.

As implemented in the architecture 100, the temporary buffers 612, 680, 728 are not duplicate register structures of their corresponding register file arrays. Rather, a single destination register slot is provided for each of eight pending instructions. Consequently, the substitution of a temporary buffer destination register reference is determined by the location of the corresponding instruction within the pending register sets. A subsequent source register reference is identified by the data dependency checker 494 with respect to the instruction from which the source dependency occurs. Therefore, a destination slot in the temporary buffer register is readily determinable by the register rename unit 496.

5. Instruction Issuer Unit Detail

The instruction issuer unit 498 determines the set of instructions that can be issued, based on the output of the register rename unit 496 and the function requirements of the instructions as identified by the EDecode unit 490. The instruction issuer unit 498 makes this determination based on the status of each of the functional units 4780-n as reported via control lines 514. Thus, the instruction issuer unit 498 begins operation upon receipt of the available set of instructions to issue from the register rename unit 496. Given that a register file access is required for the execution of each instruction, the instruction issuer unit 498 anticipates the availability of functional unit 4780-n that may be currently executing an instruction. In order to minimize the delay in identifying the instructions to be issued to the register rename unit 496, the instruction issuer unit 498 is implemented in dedicated combinatorial logic.

Upon identification of the instructions to issue, the register rename unit 496 initiates a register file access that continues to the end of the third processor cycle, P2. At the beginning of processor cycle P3, the instruction issuer unit 498 initiates operation by one or more of the functional units 4780-n, such as shown as "Execute 0", to receive and process source data provided from the register file 472.

Typically, most instructions processed by the architecture 100 are executed through a functional unit in a single processor cycle. However, some instructions require multiple processor cycles to complete, such as shown as "Execute 1", a simultaneously issued instruction. The Execute zero and Execute 1 instructions may, for example, be executed by an ALU and floating point multiplier functional units respectively. The ALU functional unit, as shown is FIG. 14, produces output data within one processor cycle and, by simple provision of output latching, available for use in executing another instruction during the fifth processor cycle, P4. The floating point multiply functional unit is preferably an internally pipelined functional unit. Therefore, another additional floating point multiply instruction can be issued in the next processor cycle. However, the result of the first instruction will not be available for a data dependant number of processor cycles; the instruction shown in FIG. 14 requires three processor cycles to complete processing through the functional unit.

During each processor cycle, the function of the instruction issuer unit 498 is repeated. Consequently, the status of the current set of pending instructions as well as the availability state of the full set of functional units 4780-n are reevaluated during each processor cycle. Under optimum conditions, the preferred architecture 100 is therefore capable of executing up to six instructions per processor cycle. However, a typical instruction mix will result in an overall average execution of 1.5 to 2.0 instructions per processor cycle.

A final consideration in the function of the instruction issuer 498 is its participation in the handling of traps conditions and the execution of specific instructions. The occurrence of a trap condition requires that the IEU 104 be cleared of all instructions that have not yet been retired. Such a circumstance may arise in response to an externally received interrupt that is relayed to the IEU 104 via the interrupt request/acknowledge control line 340, from any of the functional units 4780-n in response to an arithmetic fault, or, for example, the EDecode unit 490 upon the decoding of an illegal instruction. On the occurrence of the trap condition, the instruction issuer unit 498 is responsible for halting or voiding all unretired instructions currently pending in the IEU 104. All instructions that cannot be retired simultaneously will be voided. This result is essential to maintain the preciseness of the occurrence of the interrupt with respect to the conventional in-order execution of a program instruction stream. Once the IEU 104 is ready to begin execution of the trap handling program routine, the instruction issuer 498 acknowledges the interrupt via a return control signal along the control lines 340. Also, in order to avoid the possibility that an exception condition relative to one instruction may be recognized based on a processor state bit which would have changed before that instruction would have executed in a classical pure in-order routine, the instruction issuer 498 is responsible for ensuring that all instructions which can alter the PSR (such as special move and return from trap) are executed strictly in-order.

Certain instructions that alter program control flow are not identified by the IDecode unit 262. Instructions of this type include subroutine returns, returns from procedural instructions, and returns from traps. The instruction issuer unit 498 provides identifying control signals via the IEU return control lines 350 to the IFU 102. A corresponding one of the special registers 412 is selected to provide the IF_PC execution address that existed at the point in time of the call instruction, occurrence of the trap or encountering of a procedural instruction.

6. Done Control Unit Detail

The done control unit 540 monitors the functional units $478_{0-n}$ for the completion status of their current operations. In the preferred architecture 100, the done control unit 540 anticipates the completion of operations by each functional unit sufficient to provide a completion vector, reflecting the status of the execution of each instruction in the currently pending set of instructions, to the register rename unit 496, bypass control unit 520 and retirement control unit 500 approximately one half processor cycle prior to the execution completion of an instruction by a functional unit $478_{0-n}$. This allows the instruction issuer unit 498, via the register rename unit 496, to consider the instruction completing functional units as available resources for the next instruction issuing cycle. The bypass control unit 520 is allowed to prepare to bypass data output by the functional unit through the bypass unit 474. Finally, the retirement control unit 500 may operate to retire the corresponding instruction simultaneous with the transfer of data from the functional unit $478_{0-n}$ to the register file 472.

7. Retirement Control Unit Detail

In addition to the instruction done vector provided from the done control unit 540, the retirement control unit 500 monitors the oldest instruction set output from the EDecode output 490. As each instruction in instruction stream order is marked done by the done control unit 540, the retirement control unit 500 directs, via control signals provided on control lines 534, the transfer of data from the temporary buffer slot to the corresponding instruction specified register file register location within the register file 472. The PC Inc/Size control signals are provided on the control lines 344 for each one or more instruction simultaneously retired. Up to four instructions may be retired per processor cycle. Whenever an entire instruction set has been retired, an IFIFO read control signal is provided on the control line 342 to advance the IFIFO 264.

8. Control Flow Control Unit Detail

The control flow control unit 528 operates to continuously provide the IFU 102 with information specifying whether any control flow instructions within the current set of pending instructions have been resolved and, further, whether the branch result is taken or not taken. The control flow control unit 528 obtains, via control lines 510, an identification of the control flow branch instructions by the EDecode 490. The current set of register dependencies is provided via control lines 536 from the data dependency checker unit 494 to the control flow control unit 528 to allow the control flow control unit 528 to determine whether the outcome of a branch instruction is constrained by dependencies or is now known. The register references provided via bus 518 from the register rename unit 496 are monitored by the control flow control 528 to identify the boolean register that will define the branch decision. Thus, the branch decision may be determined even prior to the out-of-order execution of the control flow instruction.

Simultaneous with the execution of a control flow instruction, the bypass unit 472 is directed by the bypass control unit 520 to provide the control flow results onto control lines 530, consisting of the control flow zero and control flow one 1 control lines 750, 752, to the control flow control unit 528. Finally, the control flow control unit 528 continuously provides two vectors of eight bits each to the IFU 102 via control lines 348. These vectors define whether a branch instruction at the corresponding logical location corresponding to the bits within the vectors have been resolved and whether the branch result is taken or not taken.

In the preferred architecture 100, the control flow control unit 528 is implemented as pure combinatorial logic operating continuously in response to the input control signals to the control unit 528.

9. Bypass Control Unit Detail

The instruction issuer unit 498 operates closely in conjunction with the bypass control unit 520 to control the routing of data between the register file 472 and the functional units 478$_{0-n}$. The bypass control unit 520 operates in conjunction with the register file access, output and store phases of operation shown in FIG. 14. During a register file access, the bypass control unit 520 may recognize, via control lines 522, an access of a destination register within the register file 472 that is in the process of being written during the output phase of execution of an instruction. In this case, the bypass control unit 520 directs the selection of data provided on the functional unit output bus 482 to be bypassed back to the functional unit distribution bus 480. Control over the bypass unit 520 is provided by the instruction issuer unit 498 via control lines 532.

IV. Virtual Memory Control Unit

An interface definition for the VMU 108 is provided in FIG. 15. The VMU 108 consists principally of a VMU control logic unit 800 and a content addressable memory (CAM) 802. The general function of the VMU 108 is shown graphically in FIG. 16. There, a representation of a virtual address is shown partitioned into a space identifier (sID[31:28]), a virtual page number (VADDR[27:14]), page offset (PADDR[13:4]), and a request ID (rID[3:0]).

The algorithm for generating a physical address is to use the space ID to select one of 16 registers within a space table 842. The contents of the selected space register in combination with a virtual page number is used as an address for accessing a table look aside buffer (TLB) 844. The 34 bit address operates as a content address tag used to identify a corresponding buffer register within the buffer 844. On the occurrence of a tag match, an 18 bit wide register value is provided as the high order 18 bits of a physical address 846. The page offset and request ID are provided as the low order 14 bits of the physical address 846.

Where there is a tag miss in the table look aside buffer 844, a VMU miss is signaled. This requires the execution of a VMU fast trap handling routine that implements conventional hash algorithm 848 that accesses a complete page table data structure maintained in the MAU 112. This page table 850 contains entries for all memory pages currently in use by the architecture 100. The hash algorithm 848 identifies those entries in the page table 850 necessary to satisfy the current virtual page translation operation. Those page table entries are loaded from the MAU 112 to the trap registers of register set "A" and then transferred by special register move instructions to the table look aside buffer 844. Upon return from the exception handling routine, the instruction giving rise to the VMU miss exception is re-executed by the IEU 104. The virtual to physical address translation operation should then complete without exception.

The VMU control logic 800 provides a dual interface to both the IFU 102 and IEU 104. A ready signal is provided on control lines 822 to the IEU 104 to signify that the VMU 108 is available for an address translation. In the preferred embodiment, the VMU 108 is always ready to accept IFU 120 translation requests. Both the IFU and IEU 102, 104 may pose requests via control line 328, 804. In the preferred architecture 100, the IFU 102 has priority access to the VMU 108. Consequently, only a single busy control line 820 is provided to the IEU 104.

Both the IFU and IEU 102, 104 provide the space ID and virtual page number fields to the VMU control logic 800 via control lines 326, 808, respectively. In addition, the IEU 104 provides a read/write control signal via control signal 806 to define whether the address is to be used for a load or store operation as necessary to modify memory access protection attributes of the virtual memory referenced. The space ID and virtual page fields of the virtual address are passed to the CAM unit 802 to perform the actual translation operation. The page offset and ExID fields are eventually provided by the IEU 104 directly to the CCU 106. The physical page and request ID fields are provided on the address lines 836 to the CAM unit 802. The occurrence of a table look aside buffer match is signalled via the hit line and control output lines 830 to the VMU control logic unit 800. The resulting physical address, 18 bits in length, is provided on the address output lines 824.

The VMU control logic unit 800 generates the virtual memory miss and virtual memory exception control signals on lines 334, 332 in response to the hit and control output control signals on lines 830. A virtual memory translation miss is defined as failure to match a page table identifier in the table look aside buffer 844. All other translation errors are reported as virtual memory exceptions.

Finally, the data tables within the CAM unit 802 may be modified through the execution of special register to register move instructions by the IEU 104. Read/write, register select, reset, load and clear control signals are provided by the IEU 104 via control lines 810, 812, 814, 816, 818. Data to be written to the CAM unit registers is received by the VMU control logic unit 800 via the address bus 808 coupled to the special address data bus 354 from the IEU 104. This data is transferred via bus 836 to the CAM unit 802 simultaneous with control signals 828 that control the initialization, register selection, and read or write control signal. Consequently, the data registers within the CAM unit 802 may be readily written as required during the dynamic operation of the architecture 100 including read out for storage as required for the handling of context switches defined by a higher level operating system.

V. Cache Control Unit

The control on data interface for the CCU 106 is shown in FIG. 17. Again, separate interfaces are provided for the IFU 102 and IEU 104. Further, logically separate interfaces are provided by the CCU 106 to the MCU 110 with respect to instruction and data transfers.

The IFU interface consists of the physical page address provided on address lines 324, the VMU converted page address as provided on the address lines 824, and request IDs as transferred separately on control lines 294, 296. A unidirectional data transfer bus 114 is provided to transfer an entire instruction set in parallel to the IFU 102. Finally, the read/busy and ready control signals are provided to the CCU 106 via control lines 298, 300, 302.

Similarly, a complete physical address is provided by the IEU 102 via the physical address bus 788. The request ExIDs are separately provided from and to the load/store unit of the IEU 104 via control lines 796. An 80 bit wide bidirectional data bus is provided by the CCU 106 to the IEU 104. However, in the present preferred implementation of the architecture 100, only the lower 64 bits are utilized by the IEU 104. The availability and support within the CCU 106 of a full 80 bit data transfer bus is provided to support subsequent implementations of the architecture 100 that support, through modifications of the floating point data path 660, floating point operation in accordance with IEEE standard 754.

The IEU control interface, established via request, busy, ready, read/write and with control signals 784 is substantially the same as the corresponding control signals utilized by the IFU 102. The exception being the provision of a read/write control signal to differentiate between load and store operations. The width control signals specify the number of bytes being transferred during each CCU 106 access by the IEU 104; in contrast every access of the instruction cache 132 is a fixed 128 bit wide data fetch operation.

The CCU 106 implements a substantially conventional cache controller function with respect to the separate instruction and data caches 132, 134. In the preferred architecture 100, the instruction cache 132 is a high speed memory providing for the storage of 256 128 bit wide instruction sets. The data cache 134 provides for the storage of 1024 32 bit wide words of data. Instruction and data requests that cannot be immediately satisfied from the contents of the instruction and data caches 132, 134 are passed on to the MCU 110. For instruction cache misses, the 28 bit wide physical address is provided to the MCU 110 via the address bus 860. The request ID and additional control signals for coordinating the operation of the CCU 106 and MCU 110 are provided on control lines 862. Once the MCU 110 has coordinated the necessary read access of the MAU 112, two consecutive 64 bit wide data transfers are performed directly from the MAU 112 through to the instruction cache 132. Two transfers are required given that the data bus 136 is, in the preferred architecture 100, a 64 bit wide bus. As the requested data is returned through the MCU 110 the request ID maintained during the pendency of the request operation is also returned to the CCU 106 via the control lines 862.

Data transfer operations between the data cache 134 and MCU 110 are substantially the same as instruction cache operations. Since data load and store operations may reference a single byte, a full 32 bit wide physical address is provided to the MCU 110 via the address bus 864. Interface control signals and the request ExID are transferred via control lines 866. Bidirectional 64 bit wide data transfers are provided via the data cache bus 138.

VI. Summary/Conclusion

Thus, a high-performance RISC based microprocessor architecture has been disclosed. The architecture efficiently implements out-of-order execution of instructions, separate main and target instruction stream prefetch instruction transfer paths, and a procedural instruction recognition and dedicated prefetch path. The optimized instruction execution unit provides multiple optimized data processing paths supporting integer, floating point and boolean operations and incorporates respective temporary register files facilitating out-of-order execution and instruction cancellation while maintaining a readily established precise state-of-the-machine status.

It is therefore to be understood that while the foregoing disclosure describes the preferred embodiment of the present invention, other variations and modifications may be readily made by those of average skill within the scope of the present invention.

What is claimed is:

1. A superscalar microprocessor comprising:

a prefetch unit to prefetch a plurality of instructions from a memory in a predetermined program order;

a buffer placed subsequent to said prefetch unit to buffer said prefetched instructions, wherein the prefetched instructions are arranged in least two groups of instructions in the buffer;

a decoder to decode two or more instructions among said buffered instructions simultaneously;

a plurality of functional units to execute instructions simultaneously;

a register file used by the functional units in executing decoded instructions, said register file comprising a plurality of registers for storing out of order execution results, said registers being arranged in a plurality of groups, wherein a register used for storing a result of a particular instruction is determined by a position of that instruction in the buffer, and a mechanism to avoid two or more of said functional units simultaneously referring to a same one of said registers when executing instructions simultaneously;

a dependency check unit to determine a dependency among said decoded instructions in at least two groups of instructions from the buffer based on service conditions of said register and at least one flag of a processor state register; and a dispatch circuit to allocate out of order execution of said decoded instructions when said dependency check unit determines that there is no dependency among said decoded instructions, wherein the dispatch circuit is capable of allocating instructions from different groups for simultaneous execution.

2. A superscalar microprocessor comprising, on a single silicon chip:
  a prefetch unit that prefetches a plurality of instructions from an external memory in a predetermined program order;
  a buffer unit provided downstream of the prefetch unit, said buffer unit being provided to hold a plurality of instructions, wherein the plurality of instructions is arranged in at least two groups of instructions;
  a decoder unit provided downstream of the buffer unit, said decoder unit being provided to decode a plurality of instructions concurrently among the instructions held by the buffer;
  a plurality of functional units capable of executing instructions concurrently;
  a register file unit that has a plurality of registers which are used at the time of execution of decoded instructions by the functional units, said register file unit further having a plurality of temporary buffers for storing results of out-of-order execution of a plurality of instructions;
  a dependency checking unit that detects a dependency among the plurality of instructions decoded by the decoder unit based on at least use condition of the registers;
  an instruction issuing unit that issues an instruction, determined by the dependency checking unit to have no constraint on execution based on a dependency, for out-of-order execution to the plurality of functional units, wherein the instruction issuing unit is capable of issuing instructions from different groups concurrently; and
  a retiring unit that retires a group of instructions together, wherein, when retiring an instruction executed out of order, the retiring unit sets transfers an execution result from one of the temporary buffers to be one of the plurality of registers, and releases the one of the temporary buffers.

3. The superscalar microprocessor of claim 2, wherein the buffer unit comprises a FIFO buffer.

4. The superscalar microprocessor of claim 2, wherein each group of instructions includes up to four instructions and the buffer unit is capable of providing more than four instructions to the decoder unit.

5. The superscalar microprocessor of claim 2, wherein the instruction issuing unit is capable of issuing up to four instructions concurrently to the plurality of functional units.

6. The superscalar microprocessor of claim 2, wherein the buffer unit includes a plurality of instruction registers and each of the instruction registers has a capacity to store a group of instructions consisting of up to four instructions.

7. The superscalar microprocessor of claim 2, wherein the prefetch unit prefetches the instructions from a cache.

8. A superscalar microprocessor for executing instructions fetched from an instruction store, the superscalar microprocessor comprising:
  an instruction buffer for buffering a plurality of instructions;
  a split decoder coupled to a portion of the instruction buffer, the split decoder for detecting a branch instruction;
  a second buffer retaining a plurality of instructions placed after the split decoder, the second buffer being arranged such that the plurality of instructions are retained in a plurality of groups of instructions;
  a second decoder for concurrently decoding a plurality of instructions buffered in the second buffer;
  a dispatch means for concurrently dispatching a plurality of instructions buffered in the second buffer after concurrently decoding by the second decoder; and
  an execution unit, comprising:
    a plurality of functional units for executing a plurality of instructions dispatched from the dispatch means in an out of program order fashion;
    a register file for storing execution results from a plurality of the functional units, the register file having a plurality of temporary buffers for storing execution results of instructions executed in an out of program order fashion, the temporary buffers being arranged in a plurality of groups corresponding to the arrangement of the second buffer, wherein a result of executing an instruction dispatched from the second buffer is stored in a temporary buffer corresponding to the location of the instruction in the second buffer; and
    a data routing path, wherein the register file communicates with the functional units via the data routing path to provide the data to the functional units.

9. The superscalar microprocessor of claim 8, wherein the instruction buffer comprises a FIFO buffer.

10. The superscalar microprocessor of claim 8, wherein the second buffer is arranged such that each group of instructions consists of up to four instructions and wherein the second buffer is capable of providing more than four instructions to the dispatch means.

11. The superscalar microprocessor of claim 8, wherein the dispatch means is capable of dispatching up to four instructions to the execution unit concurrently.

12. The superscalar microprocessor of claim 8, wherein instructions are provided to the instruction buffer from a cache.

13. A data processing system comprising a microprocessor according to claim 8 and external memory.

14. A superscalar microprocessor comprising:
  a prefetch unit that prefetches an instruction group having a plurality of instructions from a memory according to a predetermined program order;
  a buffer disposed at a latter stage of said prefetch unit, said buffer having a plurality of entries, each entry for buffering one of a plurality of instruction groups;
  a decoder disposed at a latter stage of said buffer, said decoder for simultaneously decoding a plurality of instructions that are included in at least one instruction group;
  a plurality of functional units that execute instructions concurrently;
  a register file equipped with a register array having a plurality of registers that are used when executing decoded instructions by said functional units, said plurality of registers including a plurality of temporary buffers arranged in a plurality of groups of temporary buffers and a register array;
  a dependency relation check unit that detects a dependency relation among said plurality of instructions decoded by said decoder, on the basis of use conditions of at least said register array,
  an instruction issuance unit that allocates an instruction judged to have no dependency relation by said dependency relation check unit to said plurality of functional units to execute, wherein at least one of the plurality of instructions decoded by the decoder is executed out of the predetermined program order; and
  a retirement unit that retires instruction groups from the buffer, wherein, when the plurality of instructions included in an instruction group retired together, the entry of said buffer which corresponds to the instruction group is released.

15. A data processing apparatus comprising:
the superscalar microprocessor according to claim 14, and
a memory from which the superscalar microprocessor accesses data through a system memory bus.

16. The superscalar microprocessor according to claim 14, wherein when said retirement unit retires an instruction group from the buffer, said retirement unit also copies content of the register file from a group of said temporary buffers to registers in said register array.

17. A data processing apparatus comprising:
a superscalar microprocessor according to claim 16; and
a memory from which the superscalar microprocessor accesses data through a system memory bus.

18. The superscalar microprocessor of claim 14, wherein the superscalar microprocessor is RISC-based.

* * * * *